(12) United States Patent
Kim et al.

(10) Patent No.: US 12,476,848 B2
(45) Date of Patent: Nov. 18, 2025

(54) METHOD AND APPARATUS FOR GENERATING UW FOR CHANNEL ESTIMATION IN FREQUENCY DOMAIN IN WIRELESS COMMUNICATION SYSTEM

(71) Applicant: LG ELECTRONICS INC., Seoul (KR)

(72) Inventors: Minseog Kim, Seoul (KR); Sunam Kim, Seoul (KR); Sung Ho Park, Seoul (KR); Sung Ryong Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 393 days.

(21) Appl. No.: 18/005,045

(22) PCT Filed: Jul. 16, 2020

(86) PCT No.: PCT/KR2020/009391
§ 371 (c)(1),
(2) Date: Jan. 10, 2023

(87) PCT Pub. No.: WO2022/014751
PCT Pub. Date: Jan. 20, 2022

(65) Prior Publication Data
US 2023/0261906 A1 Aug. 17, 2023

(51) Int. Cl.
*H04L 25/02* (2006.01)
*H04L 27/26* (2006.01)
*H04L 5/00* (2006.01)

(52) U.S. Cl.
CPC ........ *H04L 25/0226* (2013.01); *H04L 25/022* (2013.01); *H04L 27/2607* (2013.01); *H04L 5/0007* (2013.01)

(58) Field of Classification Search
None
See application file for complete search history.

(56) References Cited

U.S. PATENT DOCUMENTS

| 10,104,631 B2* | 10/2018 | Lee | ......................... H04W 12/10 |
| 2019/0097859 A1* | 3/2019 | Bala | ..................... H04L 27/2613 |

(Continued)

FOREIGN PATENT DOCUMENTS

| KR | 10-1275851 | 6/2013 |
| KR | 10-2018-0100047 | 9/2018 |

(Continued)

OTHER PUBLICATIONS

PCT International Application No. PCT/KR2020/009391, International Search Report dated Mar. 26, 2021, 5 page.

(Continued)

*Primary Examiner* — Otis L Thompson, Jr.
(74) *Attorney, Agent, or Firm* — LEE, HONG, DEGERMAN, KANG & WAIMEY

(57) ABSTRACT

The present disclosure relates to a method for operating a terminal and a base station in a wireless communication system and an apparatus for supporting the same. As an example of the present disclosure, a method for operating a terminal in a wireless communication system may include: processing data symbols so that a first unique word (UW) discretely located in a frequency domain does not overlap with the data symbols; and transmitting a first unique word (UW)-orthogonal frequency division multiplexing (OFDM) symbol that adds the data symbols, which are processed not to overlap, and the first UW discretely located in the frequency domain.

14 Claims, 37 Drawing Sheets

(56) References Cited

U.S. PATENT DOCUMENTS

2019/0181928 A1* 6/2019 Pan .......................... H04B 7/02
2019/0288884 A1* 9/2019 Eroz ..................... H04L 1/0048
2020/0396698 A1* 12/2020 Bala ..................... H04L 5/0005

FOREIGN PATENT DOCUMENTS

WO     2017-117489     7/2017
WO     2019-091572     5/2019

OTHER PUBLICATIONS

Kim et al., "Comparison of Time and Frequency Resources of DFT-s-OFDM Systems Using the Zero-Tail and Unique Word," The Journal of Korean Institute of Communications and Information Sciences, vol. 41 No. 12, Dec. 2016, 1715-1720 (6 pages).

* cited by examiner

METHOD AND APPARATUS FOR GENERATING UW FOR CHANNEL ESTIMATION IN FREQUENCY DOMAIN IN WIRELESS COMMUNICATION SYSTEM

CROSS-REFERENCE TO RELATED APPLICATION(S)

This application is the National Stage filing under 35 U.S.C. 371 of International Application No. PCT/KR2020/009391, filed on Jul. 16, 2020, the contents of which is hereby incorporated by reference herein in its entirety.

BACKGROUND

Field

The present disclosure relates to a wireless communication system and, more particularly, to a method and apparatus for generating a UW for estimating a frequency domain channel in a wireless communication system.

Description of the Related Art

Radio access systems have come into widespread in order to provide various types of communication services such as voice or data. In general, a radio access system is a multiple access system capable of supporting communication with multiple users by sharing available system resources (bandwidth, transmit power, etc.). Examples of the multiple access system include a code division multiple access (CDMA) system, a frequency division multiple access (FDMA) system, a time division multiple access (TDMA) system, a single carrier-frequency division multiple access (SC-FDMA) system, etc.

In particular, as many communication apparatuses require a large communication capacity, an enhanced mobile broadband (eMBB) communication technology has been proposed compared to radio access technology (RAT). In addition, not only massive machine type communications (MTC) for providing various services anytime anywhere by connecting a plurality of apparatuses and things but also communication systems considering services/user equipments (UEs) sensitive to reliability and latency have been proposed. To this end, various technical configurations have been proposed.

SUMMARY

The present disclosure may provide a method and apparatus for transmitting a unique word (UW)-orthogonal frequency division multiplexing (OFDM) symbol in a wireless communication system.

The present disclosure may provide a method and apparatus for transmitting a unique word (UW)-orthogonal frequency division multiplexing (OFDM) symbol in a wireless communication system.

The present disclosure may provide a method and apparatus for transmitting a UW-OFDM symbol for channel estimation in a frequency domain in a wireless communication system.

The technical objects to be achieved in the present disclosure are not limited to the above-mentioned technical objects, and other technical objects that are not mentioned may be considered by those skilled in the art through the embodiments described below.

As an example of the present disclosure, a method for operating a transmitter in a wireless communication system may include: processing data symbols so that a first unique word (UW) discretely located in a frequency domain does not overlap with the data symbols; and transmitting a first unique word (UW)-orthogonal frequency division multiplexing (OFDM) symbol that adds the data symbols, which are processed not to overlap, and the first UW discretely located in the frequency domain.

As an example of the present disclosure, a method for operating a receiver in a wireless communication system may include: receiving a first UW-OFDM symbol that includes a first UW discretely located in a frequency domain and data symbols that are processed not to overlap with the first UW in a frequency domain; generating channel information based on the first UW that is discretely located in the frequency domain; and estimating the data symbols included in the first UW-OFDM symbol by using the channel information based on the first UW.

As an example of the present disclosure, a terminal in a wireless communication system may include a transceiver and a processor coupled with the transceiver. The processor may be configured to process data symbols so that a first unique word (UW) discretely located in a frequency domain does not overlap with the data symbols and to transmit a first unique word (UW)-orthogonal frequency division multiplexing (OFDM) symbol that adds the data symbols, which are processed not to overlap, and the first UW discretely located in the frequency domain.

As an example of the present disclosure, a terminal in a wireless communication system may include a transceiver and a processor coupled with the transceiver. The processor may be configured to receive a first UW-OFDM symbol that includes a first UW discretely located in a frequency domain and data symbols that are processed not to overlap with the first UW in a frequency domain, to generate channel information based on the first UW that is discretely located in the frequency domain, and to estimate the data symbols included in the first UW-OFDM symbol by using the channel information based on the first UW.

As an example of the present disclosure, a base station in a wireless communication system may include a transceiver and a processor coupled with the transceiver. The processor may be configured to process data symbols so that a first unique word (UW) discretely located in a frequency domain does not overlap with the data symbols and to transmit a first unique word (UW)-orthogonal frequency division multiplexing (OFDM) symbol that adds the data symbols, which are processed not to overlap, and the first UW discretely located in the frequency domain.

As an example of the present disclosure, a base station in a wireless communication system may include a transceiver and a processor coupled with the transceiver. The processor may be configured to receive a first UW-OFDM symbol that includes a first UW discretely located in a frequency domain and data symbols that are processed not to overlap with the first UW in a frequency domain, to generate channel information based on the first UW that is discretely located in the frequency domain, and to estimate the data symbols included in the first UW-OFDM symbol by using the channel information based on the first UW.

The above-described aspects of the present disclosure are only a part of the preferred embodiments of the present disclosure, and various embodiments reflecting technical features of the present disclosure may be derived and understood by those skilled in the art on the basis of the detailed description of the present disclosure provided below.

The following effects may be produced by embodiments based on the present disclosure.

According to the present disclosure, a frequency domain channel may be estimated by using a UW of UW-OFDM.

According to the present disclosure, a resource required for preamble transmission may be saved by using a UW for channel estimation in a frequency domain.

According to the present disclosure, by using interpolation, overhead of UW transmission may be minimized, while a data symbol, which can be transmitted in an OFDM symbol, may be maximized.

According to the present disclosure, overhead of UW transmission may be minimized by effectively responding to phase noise.

According to the present disclosure, a signal to noise ratio (SNR) of a UW signal may be improved in a time domain.

Effects obtained in the present disclosure are not limited to the above-mentioned effects, and other effects not mentioned above may be clearly derived and understood by those skilled in the art, to which a technical configuration of the present disclosure is applied, from the following description of embodiments of the present disclosure. That is, effects, which are not intended when implementing a configuration described in the present disclosure, may also be derived by those skilled in the art from the embodiments of the present disclosure.

BRIEF DESCRIPTION OF THE DRAWINGS

The accompanying drawings are provided to aid understanding of the present disclosure, and embodiments of the present disclosure may be provided together with a detailed description. However, the technical features of the present disclosure are not limited to a specific drawing, and features disclosed in each drawing may be combined with each other to constitute a new embodiment. Reference numerals in each drawing may mean structural elements.

DETAILED DESCRIPTION

Figure 1:
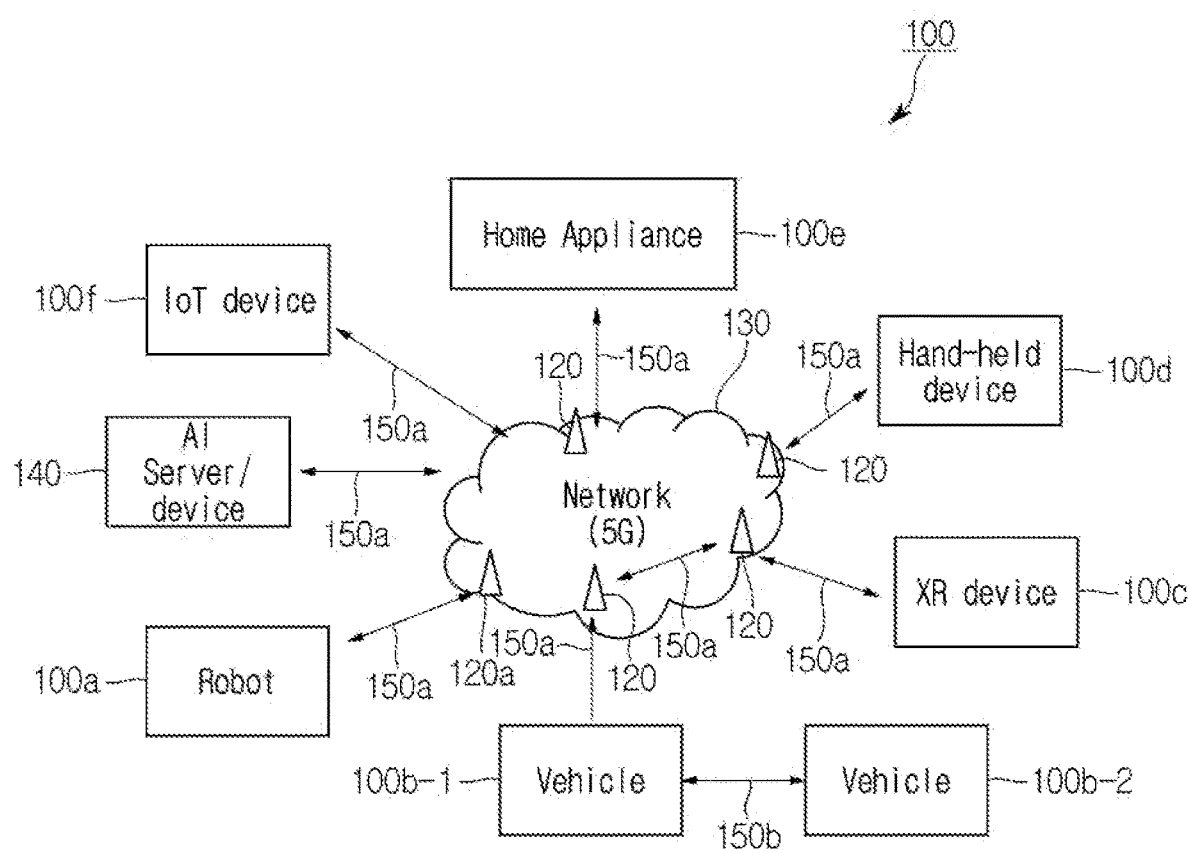
FIG. 1 is a view showing an example of a communication system applicable to the present disclosure.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the drawings, procedures or steps which render the scope of the present disclosure unnecessarily ambiguous will be omitted and procedures or steps which can be understood by those skilled in the art will be omitted.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a base station (BS) and a mobile station. A BS refers to a terminal node of a network, which directly communicates with a mobile station. A specific operation described as being performed by the BS may be performed by an upper node of the BS.

Namely, it is apparent that, in a network comprised of a plurality of network nodes including a BS, various operations performed for communication with a mobile station may be performed by the BS, or network nodes other than the BS. The term "BS" may be replaced with a fixed station, a Node B, an evolved Node B (eNode B or eNB), an advanced base station (ABS), an access point, etc.

In the embodiments of the present disclosure, the term terminal may be replaced with a UE, a mobile station (MS), a subscriber station (SS), a mobile subscriber station (MSS), a mobile terminal, an advanced mobile station (AMS), etc.

A transmitter is a fixed and/or mobile node that provides a data service or a voice service and a receiver is a fixed and/or mobile node that receives a data service or a voice service. Therefore, a mobile station may serve as a transmitter and a BS may serve as a receiver, on an uplink (UL). Likewise, the mobile station may serve as a receiver and the BS may serve as a transmitter, on a downlink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, 3GPP 5th generation (5G) new radio (NR) system, and a 3GPP2 system. In particular, the embodiments of the present disclosure may be supported by the standard specifications, 3GPP TS 36.211, 3GPP TS 36.212, 3GPP TS 36.213, 3GPP TS 36.321 and 3GPP TS 36.331.

In addition, the embodiments of the present disclosure are applicable to other radio access systems and are not limited to the above-described system. For example, the embodiments of the present disclosure are applicable to systems applied after a 3GPP 5G NR system and are not limited to a specific system.

That is, steps or parts that are not described to clarify the technical features of the present disclosure may be supported by those documents. Further, all terms as set forth herein may be explained by the standard documents.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

The embodiments of the present disclosure can be applied to various radio access systems such as code division multiple access (CDMA), frequency division multiple access (FDMA), time division multiple access (TDMA), orthogonal frequency division multiple access (OFDMA), single carrier frequency division multiple access (SC-FDMA), etc.

Hereinafter, in order to clarify the following description, a description is made based on a 3GPP communication system (e.g., LTE, NR, etc.), but the technical spirit of the present disclosure is not limited thereto. LTE may refer to technology after 3GPP TS 36.xxx Release 8. In detail, LTE technology after 3GPP TS 36.xxx Release 10 may be referred to as LTE-A, and LTE technology after 3GPP TS 36.xxx Release 13 may be referred to as LTE-A pro. 3GPP NR may refer to technology after TS 38.xxx Release 15. 3GPP 6G may refer to technology TS Release 17 and/or Release 18. "xxx" may refer to a detailed number of a standard document. LTE/NR/6G may be collectively referred to as a 3GPP system.

For background arts, terms, abbreviations, etc. used in the present disclosure, refer to matters described in the standard documents published prior to the present disclosure. For example, reference may be made to the standard documents 36.xxx and 38.xxx.

Communication System Applicable to the Present Disclosure

Without being limited thereto, various descriptions, functions, procedures, proposals, methods and/or operational flowcharts of the present disclosure disclosed herein are applicable to various fields requiring wireless communication/connection (e.g., 5G).

Hereinafter, a more detailed description will be given with reference to the drawings. In the following drawings/description, the same reference numerals may exemplify the same or corresponding hardware blocks, software blocks or functional blocks unless indicated otherwise.

FIG. 1 is a view showing an example of a communication system applicable to the present disclosure.

Referring to FIG. 1, the communication system 100 applicable to the present disclosure includes a wireless device, a base station and a network. The wireless device refers to a device for performing communication using radio access technology (e.g., 5G NR or LTE) and may be referred to as a communication/wireless/5G device. Without being limited thereto, the wireless device may include a robot 100a, vehicles 100b-1 and 100b-2, an extended reality (XR) device 100c, a hand-held device 100d, a home appliance 100e, an Internet of Thing (IoT) device 100f, and an artificial intelligence (AI) device/server 100g. For example, the vehicles may include a vehicle having a wireless communication function, an autonomous vehicle, a vehicle capable of performing vehicle-to-vehicle communication, etc. The vehicles 100b-1 and 100b-2 may include an unmanned aerial vehicle (UAV) (e.g., a drone). The XR device 100c includes an augmented reality (AR)/virtual reality (VR)/mixed reality (MR) device and may be implemented in the form of a head-mounted device (HMD), a head-up display (HUD) provided in a vehicle, a television, a smartphone, a computer, a wearable device, a home appliance, a digital signage, a vehicle or a robot. The hand-held device 100d may include a smartphone, a smart pad, a wearable device (e.g., a smart watch or smart glasses), a computer (e.g., a laptop), etc. The home appliance 100e may include a TV, a refrigerator, a washing machine, etc. The IoT device 100f may include a sensor, a smart meter, etc. For example, the base station 120 and the network 130 may be implemented by a wireless device, and a specific wireless device 120a may operate as a base station/network node for another wireless device.

The wireless devices 100a to 100f may be connected to the network 130 through the base station 120. AI technology is applicable to the wireless devices 100a to 100f, and the wireless devices 100a to 100f may be connected to the AI server 100g through the network 130. The network 130 may be configured using a 3G network, a 4G (e.g., LTE) network or a 5G (e.g., NR) network, etc. The wireless devices 100a to 100f may communicate with each other through the base station 120/the network 130 or perform direct communication (e.g., sidelink communication) without through the base station 120/the network 130. For example, the vehicles 100b-1 and 100b-2 may perform direct communication (e.g., vehicle to vehicle (V2V)/vehicle to everything (V2X) communication). In addition, the IoT device 100f (e.g., a sensor) may perform direct communication with another IoT device (e.g., a sensor) or the other wireless devices 100a to 100f.

Wireless communications/connections 150a, 150b and 150c may be established between the wireless devices 100a to 100f/the base station 120 and the base station 120/the base station 120. Here, wireless communication/connection may be established through various radio access technologies (e.g., 5G NR) such as uplink/downlink communication 150a, sidelink communication 150b (or D2D communication) or communication 150c between base stations (e.g., relay, integrated access backhaul (IAB). The wireless device and the base station/wireless device or the base station and the base station may transmit/receive radio signals to/from each other through wireless communication/connection 150a, 150b and 150c. For example, wireless communication/connection 150a, 150b and 150c may enable signal transmission/reception through various physical channels. To this end, based on the various proposals of the present disclosure, at least some of various configuration information setting processes for transmission/reception of radio signals, various signal processing procedures (e.g., channel encoding/decoding, modulation/demodulation, resource mapping/demapping, etc.), resource allocation processes, etc. may be performed.

Wireless Device Applicable to the Present Disclosure

Figure 2:
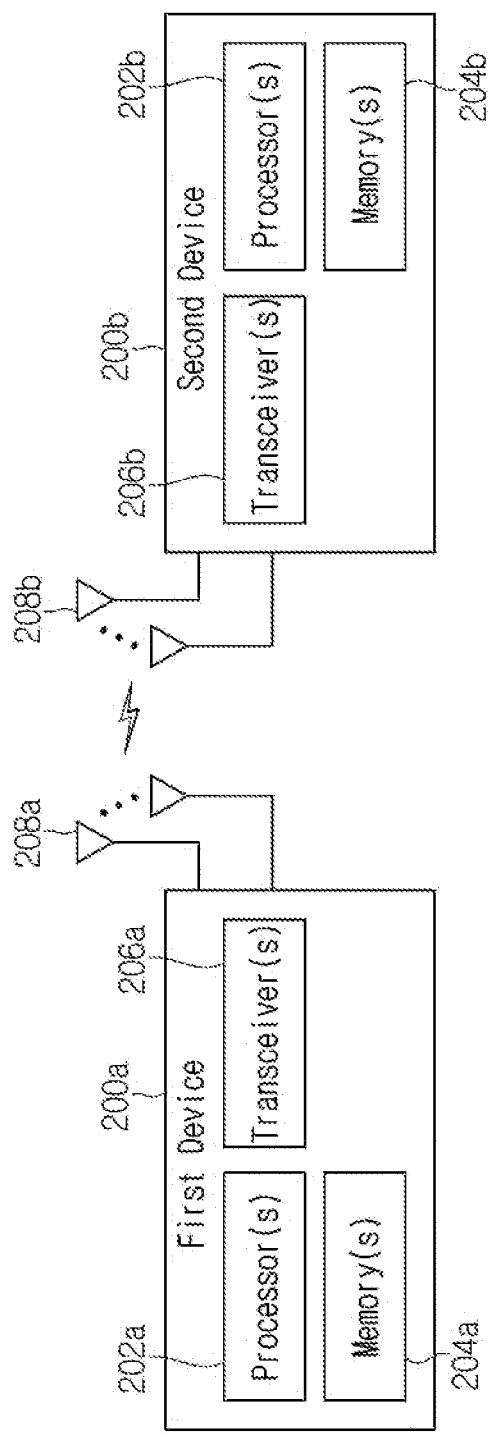
FIG. 2 is a view showing an example of a wireless apparatus applicable to the present disclosure.

FIG. 2 is a view showing an example of a wireless device applicable to the present disclosure.

Referring to FIG. 2, a first wireless device 200a and a second wireless device 200b may transmit and receive radio signals through various radio access technologies (e.g., LTE or NR). Here, {the first wireless device 200a, the second wireless device 200b} may correspond to {the wireless device 100x, the base station 120} and/or {the wireless device 100x, the wireless device 100x} of FIG. 1.

The first wireless device 200a may include one or more processors 202a and one or more memories 204a and may further include one or more transceivers 206a and/or one or more antennas 208a. The processor 202a may be configured to control the memory 204a and/or the transceiver 206a and to implement descriptions, functions, procedures, proposals, methods and/or operational flowcharts disclosed herein. For example, the processor 202a may process information in the memory 204a to generate first information/signal and then transmit a radio signal including the first information/signal through the transceiver 206a. In addition, the processor 202a may receive a radio signal including second information/signal through the transceiver 206a and then store information obtained from signal processing of the second information/signal in the memory 204a. The memory 204a may be coupled with the processor 202a, and store a variety of information related to operation of the processor 202a. For example, the memory 204a may store software code including instructions for performing all or some of the processes controlled by the processor 202a or performing the descriptions, functions, procedures, proposals, methods and/or operational flowcharts disclosed herein. Here, the processor 202a and the memory 204a may be part of a communication modem/circuit/chip designed to implement wireless communication technology (e.g., LTE or NR). The transceiver 206a may be coupled with the processor 202a to transmit and/or receive radio signals through one or more antennas 208a. The transceiver 206a may include a transmitter and/or a receiver. The transceiver 206a may be used interchangeably with a radio frequency (RF) unit. In the present disclosure, the wireless device may refer to a communication modem/circuit/chip.

The second wireless device 200b may include one or more processors 202b and one or more memories 204b and may further include one or more transceivers 206b and/or one or more antennas 208b. The processor 202b may be configured to control the memory 204b and/or the transceiver 206b and to implement the descriptions, functions, procedures, proposals, methods and/or operational flowcharts disclosed herein. For example, the processor 202b may process information in the memory 204b to generate third information/signal and then transmit the third information/signal through the transceiver 206b. In addition, the processor 202b may receive a radio signal including fourth information/signal through the transceiver 206b and then store information obtained from signal processing of the fourth information/signal in the memory 204b. The memory 204b may be coupled with the processor 202b to store a variety of information related to operation of the processor 202b. For example, the memory 204b may store software code including instructions for performing all or some of the processes controlled by the processor 202b or performing the descriptions, functions, procedures, proposals, methods and/or operational flowcharts disclosed herein. Herein, the processor 202b and the memory 204b may be part of a communication modem/circuit/chip designed to implement wireless communication technology (e.g., LTE or NR). The transceiver 206b may be coupled with the processor 202b to transmit and/or receive radio signals through one or more antennas 208b. The transceiver 206b may include a transmitter and/or a receiver. The transceiver 206b may be used interchangeably with a radio frequency (RF) unit. In the present disclosure, the wireless device may refer to a communication modem/circuit/chip.

Hereinafter, the wireless communication technology implemented in the wireless devices 200b and 200b of the present disclosure may include not only LTE, NR and 6G but also narrowband Internet of Things (NB-IoT) for low-power communication. At this time, for example, NB-IoT technology may be an example of low-power wide area network (LPWAN) technology and may be implemented in standards such as LTE Cat NB1 and/or LTE Cat NB2, without being limited to the above-described names. Additionally or alternatively, the wireless communication technology implemented in the wireless devices 200b and 200b of the present disclosure may perform communication based on LTE-M technology. At this time, for example, the LTE-M technology may be an example of LPWAN technology and may be called various names such as enhanced machine type communication (eMTC). For example, the LTE-M technology may be implemented in at least one of various standards such as 1) LTE CAT 0, 2) LTE Cat M1, 3) LTE Cat M2, 4) LTE non-BL(non-Bandwidth Limited), 5) LTE-MTC, 6) LTE Machine Type Communication and/or 7) LTE M, without being limited to the above-described names. Additionally or alternatively, the wireless communication technology implemented in the wireless devices 200b and 200b of the present disclosure may include at least one of ZigBee, Bluetooth or low-power wide area network considering low-power communication, without being limited to the above-described names. For example, ZigBee technology may generate personal area networks (PANs) related to small/low-power digital communication based on various standards such as IEEE 802.15.4 and may be called various names.

Hereinafter, hardware elements of the wireless devices 200b and 200b will be described in greater detail. Without being limited thereto, one or more protocol layers may be implemented by one or more processors 202b and 202b. For example, one or more processors 202b and 202b may implement one or more layers (e.g., functional layers such as PHY (physical), MAC (media access control), RLC (radio link control), PDCP (packet data convergence protocol), RRC (radio resource control), SDAP (service data adaptation protocol)). One or more 202b and 202b may generate one or more protocol data units (PDUs) and/or one or more service data unit (SDU) according to the descriptions, functions, procedures, proposals, methods and/or operational flowcharts disclosed herein. One or more processors 202b and 202b may generate messages, control information, data or information according to the descriptions, functions, procedures, proposals, methods and/or operational flowcharts disclosed herein. One or more processors 202b and 202b may generate PDUs, SDUs, messages, control information, data or information according to the functions, procedures, proposals and/or methods disclosed herein and provide the PDUs, SDUs, messages, control information, data or information to one or more transceivers 206a and 206b. One or more processors 202b and 202b may receive signals (e.g., baseband signals) from one or more transceivers 206b and 206b and acquire PDUs, SDUs, messages, control information, data or information according to the descriptions, functions, procedures, proposals, methods and/or operational flowcharts disclosed herein.

One or more processors 202b and 202b may be referred to as controllers, microcontrollers, microprocessors or microcomputers. One or more processors 202b and 202b may be implemented by hardware, firmware, software or a combination thereof. For example, one or more application specific integrated circuits (ASICs), one or more digital signal processors (DSPs), one or more digital signal processing devices (DSPDs), programmable logic devices (PLDs) or one or more field programmable gate arrays (FPGAs) may be included in one or more processors 202b and 202b. The descriptions, functions, procedures, proposals, methods and/or operational flowcharts disclosed herein may be implemented using firmware or software, and firmware or software may be implemented to include modules, procedures, functions, etc. Firmware or software configured to perform the descriptions, functions, procedures, proposals, methods and/or operational flowcharts disclosed herein may be included in one or more processors 202b and 202b or stored in one or more memories 204a and 204b to be driven by one or more processors 202b and 202b. The descriptions, functions, procedures, proposals, methods and/or operational flowcharts disclosed herein implemented using firmware or software in the form of code, a command and/or a set of commands.

One or more memories 204a and 204b may be coupled with one or more processors 202b and 202b to store various types of data, signals, messages, information, programs, code, instructions and/or commands. One or more memories 204a and 204b may be composed of read only memories (ROMs), random access memories (RAMs), erasable programmable read only memories (EPROMs), flash memories, hard drives, registers, cache memories, computer-readable storage mediums and/or combinations thereof. One or more memories 204a and 204b may be located inside and/or outside one or more processors 202b and 202b. In addition, one or more memories 204a and 204b may be coupled with one or more processors 202b and 202b through various technologies such as wired or wireless connection.

One or more transceivers 206a and 206b may transmit user data, control information, radio signals/channels, etc. described in the methods and/or operational flowcharts of the present disclosure to one or more other apparatuses. One or more transceivers 206a and 206b may receive user data, control information, radio signals/channels, etc. described in the methods and/or operational flowcharts of the present disclosure from one or more other apparatuses. For example, one or more transceivers 206a and 206b may be coupled with one or more processors 202*a* and 202*b* to transmit/receive radio signals. For example, one or more processors 202*a* and 202*b* may perform control such that one or more transceivers 206*a* and 206*b* transmit user data, control information or radio signals to one or more other apparatuses. In addition, one or more processors 202*a* and 202*b* may perform control such that one or more transceivers 206*a* and 206*b* receive user data, control information or radio signals from one or more other apparatuses. In addition, one or more transceivers 206*a* and 206*b* may be coupled with one or more antennas 208*a* and 208*b*, and one or more transceivers 206*a* and 206*b* may be configured to transmit/receive user data, control information, radio signals/channels, etc. described in the descriptions, functions, procedures, proposals, methods and/or operational flowcharts disclosed herein through one or more antennas 208*a* and 208*b*. In the present disclosure, one or more antennas may be a plurality of physical antennas or a plurality of logical antennas (e.g., antenna ports). One or more transceivers 206*a* and 206*b* may convert the received radio signals/channels, etc. from RF band signals to baseband signals, in order to process the received user data, control information, radio signals/channels, etc. using one or more processors 202*a* and 202*b*. One or more transceivers 206*a* and 206*b* may convert the user data, control information, radio signals/channels processed using one or more processors 202*a* and 202*b* from baseband signals into RF band signals. To this end, one or more transceivers 206*a* and 206*b* may include (analog) oscillator and/or filters.

Structure of Wireless Device Applicable to the Present Disclosure

Figure 3:
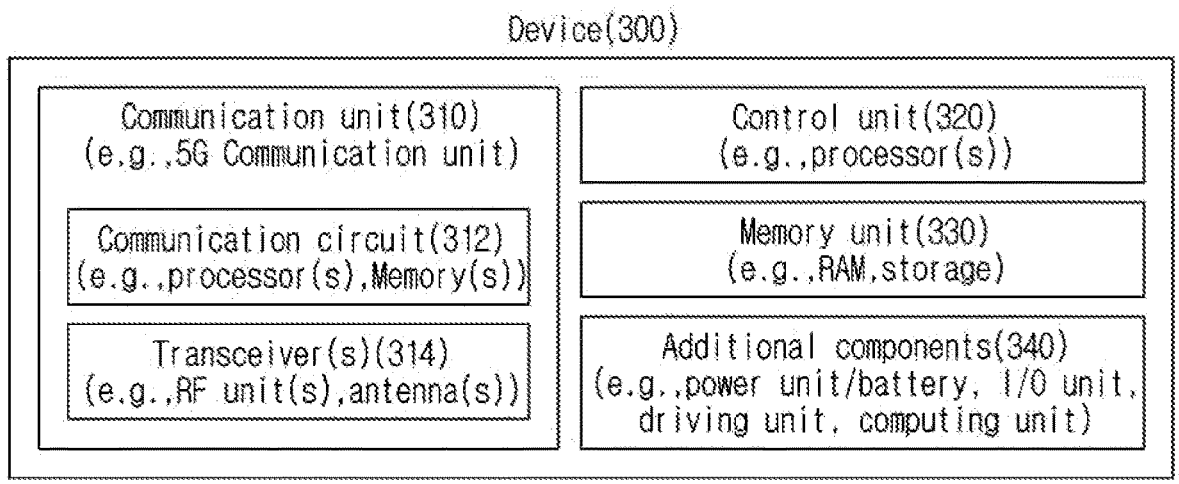
FIG. 3 is a view showing another example of a wireless device applicable to the present disclosure.

FIG. 3 is a view showing another example of a wireless device applicable to the present disclosure.

Referring to FIG. 3, a wireless device 300 may correspond to the wireless devices 200*a* and 200*b* of FIG. 2 and include various elements, components, units/portions and/or modules. For example, the wireless device 300 may include a communication unit 310, a control unit (controller) 320, a memory unit (memory) 330 and additional components 340. The communication unit may include a communication circuit 312 and a transceiver(s) 314. For example, the communication circuit 312 may include one or more processors 202*a* and 202*b* and/or one or more memories 204*a* and 204*b* of FIG. 2. For example, the transceiver(s) 314 may include one or more transceivers 206*a* and 206*b* and/or one or more antennas 208*a* and 208*b* of FIG. 2. The control unit 320 may be electrically coupled with the communication unit 310, the memory unit 330 and the additional components 340 to control overall operation of the wireless device. For example, the control unit 320 may control electrical/mechanical operation of the wireless device based on a program/code/instruction/information stored in the memory unit 330. In addition, the control unit 320 may transmit the information stored in the memory unit 330 to the outside (e.g., another communication device) through the wireless/wired interface using the communication unit 310 over a wireless/wired interface or store information received from the outside (e.g., another communication device) through the wireless/wired interface using the communication unit 310 in the memory unit 330.

The additional components 340 may be variously configured according to the types of the wireless devices. For example, the additional components 340 may include at least one of a power unit/battery, an input/output unit, a driving unit or a computing unit. Without being limited thereto, the wireless device 300 may be implemented in the form of the robot (FIG. 1, 100*a*), the vehicles (FIGS. 1, 100*b*-1 and 100*b*-2), the XR device (FIG. 1, 100*c*), the hand-held device (FIG. 1, 100*d*), the home appliance (FIG. 1, 100*e*), the IoT device (FIG. 1, 100*f*), a digital broadcast terminal, a hologram apparatus, a public safety apparatus, an MTC apparatus, a medical apparatus, a Fintech device (financial device), a security device, a climate/environment device, an AI server/device (FIG. 1, 140), the base station (FIG. 1, 120), a network node, etc. The wireless device may be movable or may be used at a fixed place according to use example/service.

In FIG. 3, various elements, components, units/portions and/or modules in the wireless device 300 may be coupled with each other through wired interfaces or at least some thereof may be wirelessly coupled through the communication unit 310. For example, in the wireless device 300, the control unit 320 and the communication unit 310 may be coupled by wire, and the control unit 320 and the first unit (e.g., 130 or 140) may be wirelessly coupled through the communication unit 310. In addition, each element, component, unit/portion and/or module of the wireless device 300 may further include one or more elements. For example, the control unit 320 may be composed of a set of one or more processors. For example, the control unit 320 may be composed of a set of a communication control processor, an application processor, an electronic control unit (ECU), a graphic processing processor, a memory control processor, etc. In another example, the memory unit 330 may be composed of a random access memory (RAM), a dynamic RAM (DRAM), a read only memory (ROM), a flash memory, a volatile memory, a non-volatile memory and/or a combination thereof.

Hand-Held Device Applicable to the Present Disclosure

Figure 4:
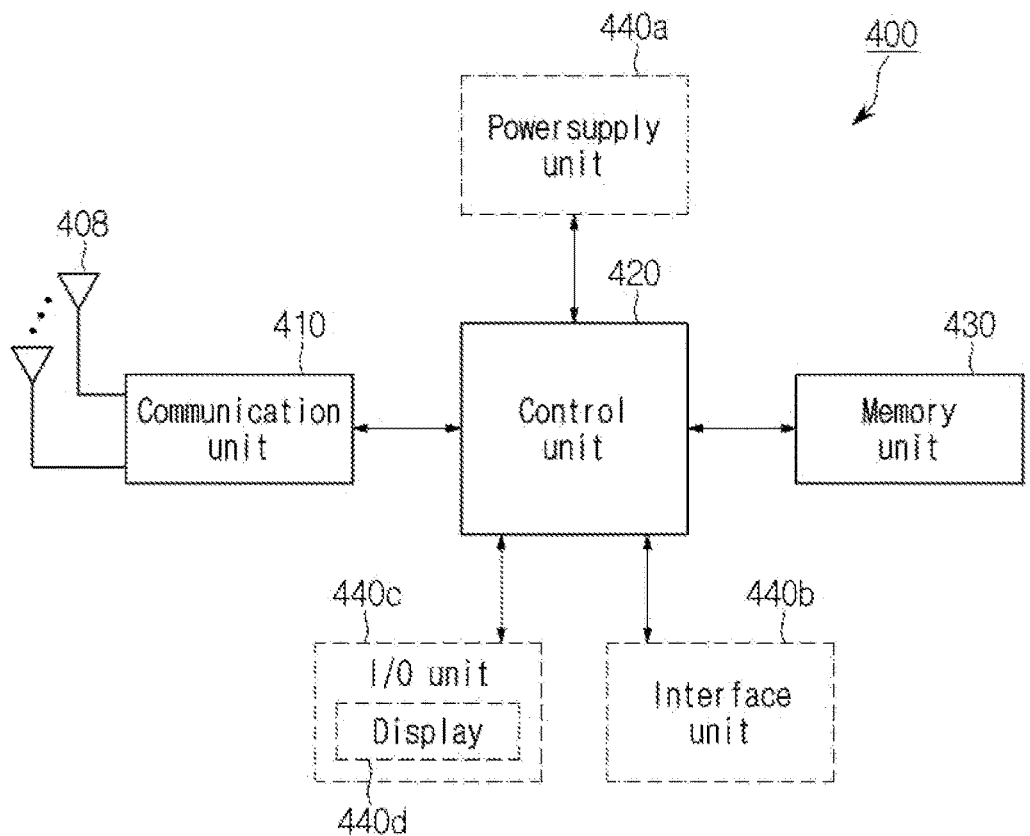
FIG. 4 is a view showing an example of a hand-held device applicable to the present disclosure.

FIG. 4 is a view showing an example of a hand-held device applicable to the present disclosure.

FIG. 4 shows a hand-held device applicable to the present disclosure. The hand-held device may include a smartphone, a smart pad, a wearable device (e.g., a smart watch or smart glasses), and a hand-held computer (e.g., a laptop, etc.). The hand-held device may be referred to as a mobile station (MS), a user terminal (UT), a mobile subscriber station (MSS), a subscriber station (SS), an advanced mobile station (AMS) or a wireless terminal (WT).

Referring to FIG. 4, the hand-held device 400 may include an antenna unit (antenna) 408, a communication unit (transceiver) 410, a control unit (controller) 420, a memory unit (memory) 430, a power supply unit (power supply) 440*a*, an interface unit (interface) 440*b*, and an input/output unit 440*c*. An antenna unit (antenna) 408 may be part of the communication unit 410. The blocks 410 to 430/440*a* to 440*c* may correspond to the blocks 310 to 330/340 of FIG. 3, respectively.

The communication unit 410 may transmit and receive signals (e.g., data, control signals, etc.) to and from other wireless devices or base stations. The control unit 420 may control the components of the hand-held device 400 to perform various operations. The control unit 420 may include an application processor (AP). The memory unit 430 may store data/parameters/program/code/instructions necessary to drive the hand-held device 400. In addition, the memory unit 430 may store input/output data/information, etc. The power supply unit 440*a* may supply power to the hand-held device 400 and include a wired/wireless charging circuit, a battery, etc. The interface unit 440*b* may support connection between the hand-held device 400 and another external device. The interface unit 440*b* may include various ports (e.g., an audio input/output port and a video input/output port) for connection with the external device. The input/output unit 440*c* may receive or output video information/signals, audio information/signals, data and/or user input information. The input/output unit 440*c* may include a camera, a microphone, a user input unit, a display 440*d*, a speaker and/or a haptic module.

For example, in case of data communication, the input/output unit 440*c* may acquire user input information/signal (e.g., touch, text, voice, image or video) from the user and store the user input information/signal in the memory unit 430. The communication unit 410 may convert the information/signal stored in the memory into a radio signal and transmit the converted radio signal to another wireless device directly or transmit the converted radio signal to a base station. In addition, the communication unit 410 may receive a radio signal from another wireless device or the base station and then restore the received radio signal into original information/signal. The restored information/signal may be stored in the memory unit 430 and then output through the input/output unit 440*c* in various forms (e.g., text, voice, image, video and haptic).

Type of Wireless Device Applicable to the Present Disclosure

Figure 5:
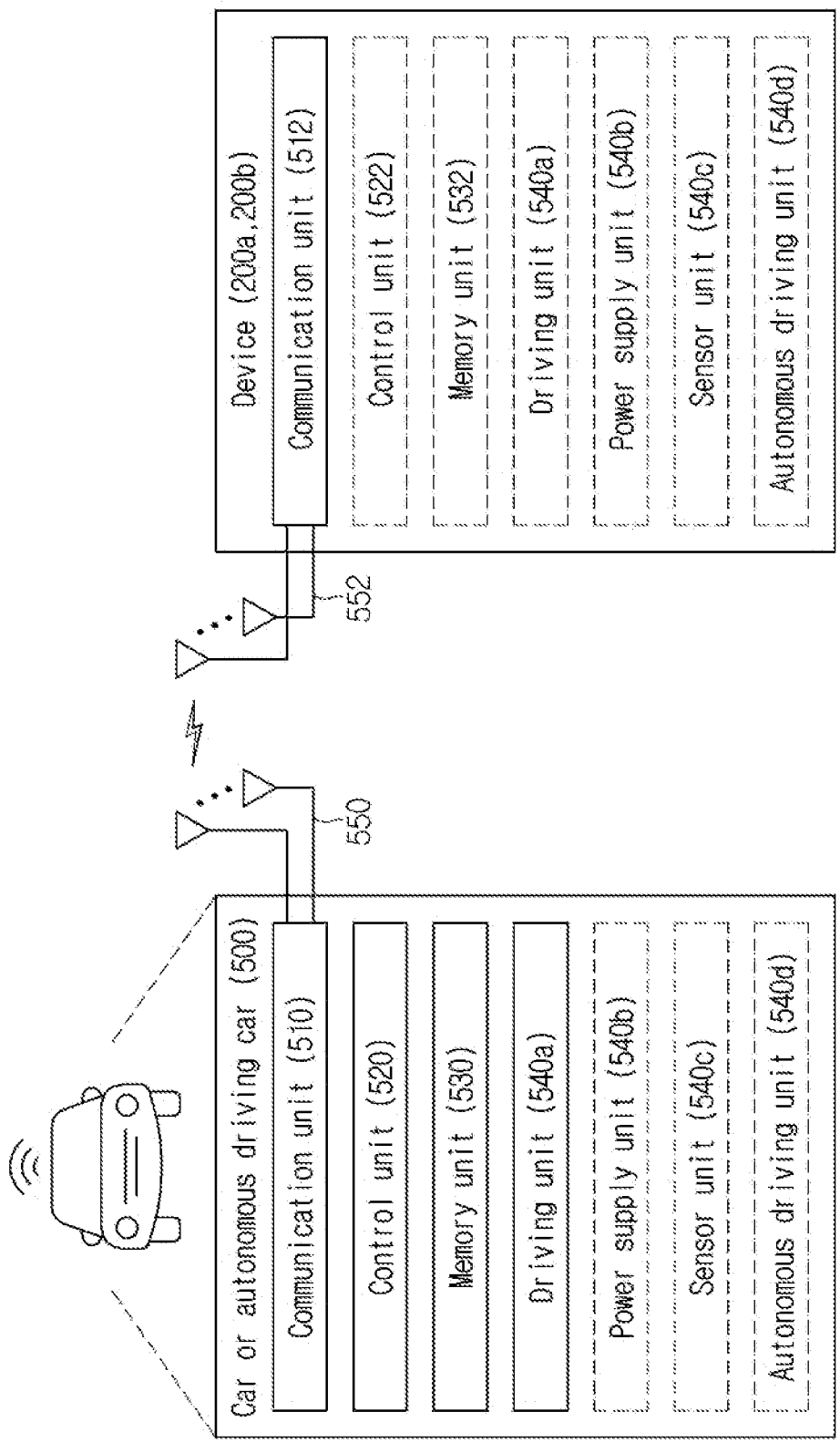
FIG. 5 is a view showing an example of a car or an autonomous driving car applicable to the present disclosure.

FIG. 5 is a view showing an example of a car or an autonomous driving car applicable to the present disclosure.

FIG. 5 shows a car or an autonomous driving vehicle applicable to the present disclosure. The car or the autonomous driving car may be implemented as a mobile robot, a vehicle, a train, a manned/unmanned aerial vehicle (AV), a ship, etc. and the type of the car is not limited.

Referring to FIG. 5, the car or autonomous driving car 500 may include an antenna unit (antenna) 508, a communication unit (transceiver) 510, a control unit (controller) 520, a driving unit 540*a*, a power supply unit (power supply) 540*b*, a sensor unit 540*c*, and an autonomous driving unit 540*d*. The antenna unit 550 may be configured as part of the communication unit 510. The blocks 510/530/540*a* to 540*d* correspond to the blocks 410/430/440 of FIG. 4.

The communication unit 510 may transmit and receive signals (e.g., data, control signals, etc.) to and from external devices such as another vehicle, a base station (e.g., a base station, a road side unit, etc.), and a server. The control unit 520 may control the elements of the car or autonomous driving car 500 to perform various operations. The control unit 520 may include an electronic control unit (ECU). The driving unit 540*a* may drive the car or autonomous driving car 500 on the ground. The driving unit 540*a* may include an engine, a motor, a power train, wheels, a brake, a steering device, etc. The power supply unit 540*b* may supply power to the car or autonomous driving car 500, and include a wired/wireless charging circuit, a battery, etc. The sensor unit 540*c* may obtain a vehicle state, surrounding environment information, user information, etc. The sensor unit 540*c* may include an inertial navigation unit (IMU) sensor, a collision sensor, a wheel sensor, a speed sensor, an inclination sensor, a weight sensor, a heading sensor, a position module, a vehicle forward/reverse sensor, a battery sensor, a fuel sensor, a tire sensor, a steering sensor, a temperature sensor, a humidity sensor, an ultrasonic sensor, an illumination sensor, a brake pedal position sensor, and so on. The autonomous driving sensor 540*d* may implement technology for maintaining a driving lane, technology for automatically controlling a speed such as adaptive cruise control, technology for automatically driving the car along a predetermined route, technology for automatically setting a route when a destination is set and driving the car, etc.

For example, the communication unit 510 may receive map data, traffic information data, etc. from an external server. The autonomous driving unit 540*d* may generate an autonomous driving route and a driving plan based on the acquired data. The control unit 520 may control the driving unit 540*a* (e.g., speed/direction control) such that the car or autonomous driving car 500 moves along the autonomous driving route according to the driving plane. During autonomous driving, the communication unit 510 may aperiodically/periodically acquire latest traffic information data from an external server and acquire surrounding traffic information data from neighboring cars. In addition, during autonomous driving, the sensor unit 540*c* may acquire a vehicle state and surrounding environment information. The autonomous driving unit 540*d* may update the autonomous driving route and the driving plan based on newly acquired data/information. The communication unit 510 may transmit information such as a vehicle location, an autonomous driving route, a driving plan, etc. to the external server. The external server may predict traffic information data using AI technology or the like based on the information collected from the cars or autonomous driving cars and provide the predicted traffic information data to the cars or autonomous driving cars.

Figure 6:
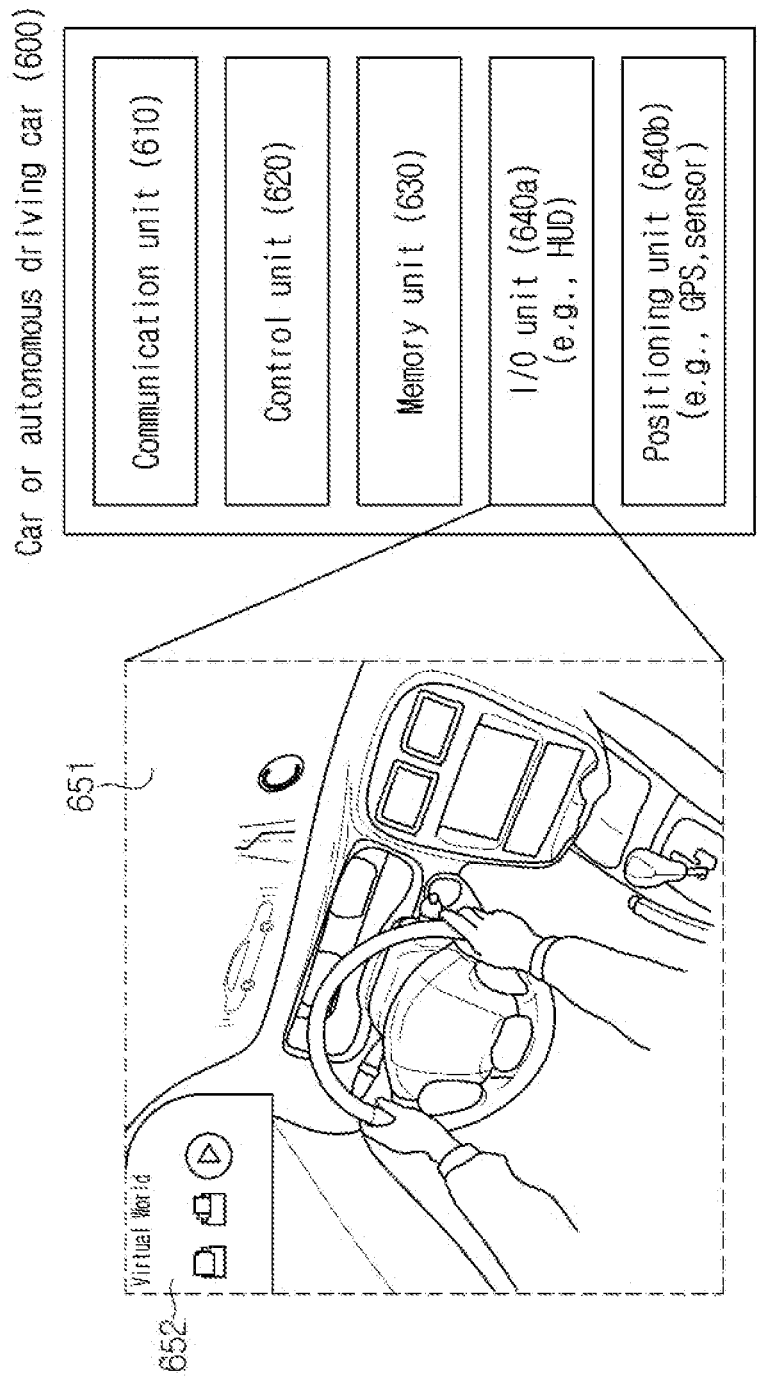
FIG. 6 is a view showing an example of a mobility applicable to the present disclosure.

FIG. 6 is a view showing an example of a mobility applicable to the present disclosure.

Referring to FIG. 6, the mobility applied to the present disclosure may be implemented as at least one of a transportation means, a train, an aerial vehicle or a ship. In addition, the mobility applied to the present disclosure may be implemented in the other forms and is not limited to the above-described embodiments.

At this time, referring to FIG. 6, the mobility 600 may include a communication unit (transceiver) 610, a control unit (controller) 620, a memory unit (memory) 630, an input/output unit 640*a* and a positioning unit 640*b*. Here, the blocks 610 to 630/640*a* to 640*b* may corresponding to the blocks 310 to 330/340 of FIG. 3.

The communication unit 610 may transmit and receive signals (e.g., data, control signals, etc.) to and from external devices such as another mobility or a base station. The control unit 620 may control the components of the mobility 600 to perform various operations. The memory unit 630 may store data/parameters/programs/code/instructions supporting the various functions of the mobility 600. The input/output unit 640*a* may output AR/VR objects based on information in the memory unit 630. The input/output unit 640*a* may include a HUD. The positioning unit 640*b* may acquire the position information of the mobility 600. The position information may include absolute position information of the mobility 600, position information in a driving line, acceleration information, position information of neighboring vehicles, etc. The positioning unit 640*b* may include a global positioning system (GPS) and various sensors.

For example, the communication unit 610 of the mobility 600 may receive map information, traffic information, etc. from an external server and store the map information, the traffic information, etc. in the memory unit 630. The positioning unit 640*b* may acquire mobility position information through the GPS and the various sensors and store the mobility position information in the memory unit 630. The control unit 620 may generate a virtual object based on the map information, the traffic information, the mobility position information, etc., and the input/output unit 640*a* may display the generated virtual object in a glass window (651 and 652). In addition, the control unit 620 may determine whether the mobility 600 is normally driven in the driving line based on the mobility position information. When the mobility 600 abnormally deviates from the driving line, the control unit 620 may display a warning on the glass window of the mobility through the input/output unit 640*a*. In addition, the control unit 620 may broadcast a warning message for driving abnormality to neighboring mobilities through the communication unit 610. Depending on situations, the control unit 620 may transmit the position information of the mobility and information on driving/mobility abnormality to a related institution through the communication unit 610.

Figure 7:
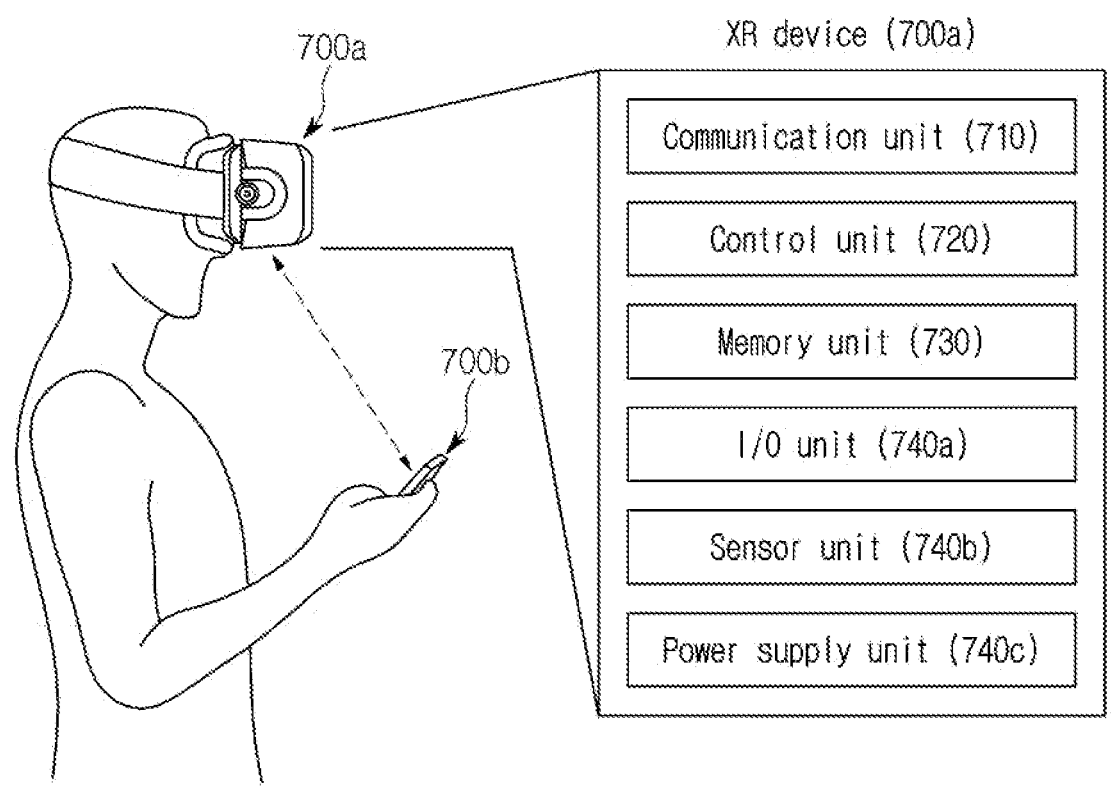
FIG. 7 is a view showing an example of an extended reality (XR) device applicable to the present disclosure.

FIG. 7 is a view showing an example of an XR device applicable to the present disclosure. The XR device may be implemented as a HMD, a head-up display (HUD) provided in a vehicle, a television, a smartphone, a computer, a wearable device, a home appliance, a digital signage, a vehicle, a robot, etc.

Referring to FIG. 7, the XR device 700*a* may include a communication unit (transceiver) 710, a control unit (controller) 720, a memory unit (memory) 730, an input/output unit 740*a*, a sensor unit 740*b* and a power supply unit (power supply) 740*c*. Here, the blocks 710 to 730/740*a* to 740*c* may correspond to the blocks 310 to 330/340 of FIG. 3, respectively.

The communication unit 710 may transmit and receive signals (e.g., media data, control signals, etc.) to and from external devices such as another wireless device, a hand-held device or a media server. The media data may include video, image, sound, etc. The control unit 720 may control the components of the XR device 700*a* to perform various operations. For example, the control unit 720 may be configured to control and/or perform procedures such as video/image acquisition, (video/image) encoding, metadata generation and processing. The memory unit 730 may store data/parameters/programs/code/instructions necessary to drive the XR device 700*a* or generate an XR object.

The input/output unit 740*a* may acquire control information, data, etc. from the outside and output the generated XR object. The input/output unit 740*a* may include a camera, a microphone, a user input unit, a display, a speaker and/or a haptic module. The sensor unit 740*b* may obtain an XR device state, surrounding environment information, user information, etc. The sensor unit 740*b* may include a proximity sensor, an illumination sensor, an acceleration sensor, a magnetic sensor, a gyro sensor, an inertia sensor, a red green blue (RGB) sensor, an infrared (IR) sensor, a finger scan sensor, an ultrasonic sensor, an optical sensor, a microphone and/or a radar. The power supply unit 740*c* may supply power to the XR device 700*a* and include a wired/wireless charging circuit, a battery, etc.

For example, the memory unit 730 of the XR device 700*a* may include information (e.g., data, etc.) necessary to generate an XR object (e.g., AR/VR/MR object). The input/output unit 740*a* may acquire an instruction for manipulating the XR device 700*a* from a user, and the control unit 720 may drive the XR device 700*a* according to the driving instruction of the user. For example, when the user wants to watch a movie, news, etc. through the XR device 700*a*, the control unit 720 may transmit content request information to another device (e.g., a hand-held device 700*b*) or a media server through the communication unit 730. The communication unit 730 may download/stream content such as a movie or news from another device (e.g., the hand-held device 700*b*) or the media server to the memory unit 730. The control unit 720 may control and/or perform procedures such as video/image acquisition, (video/image) encoding, metadata generation/processing, etc. with respect to content, and generate/output an XR object based on information on a surrounding space or a real object acquired through the input/output unit 740*a* or the sensor unit 740*b*.

In addition, the XR device 700*a* may be wirelessly connected with the hand-held device 700*b* through the communication unit 710, and operation of the XR device 700*a* may be controlled by the hand-held device 700*b*. For example, the hand-held device 700*b* may operate as a controller for the XR device 700*a*. To this end, the XR device 700*a* may acquire three-dimensional position information of the hand-held device 700*b* and then generate and output an XR object corresponding to the hand-held device 700*b*.

Figure 8:
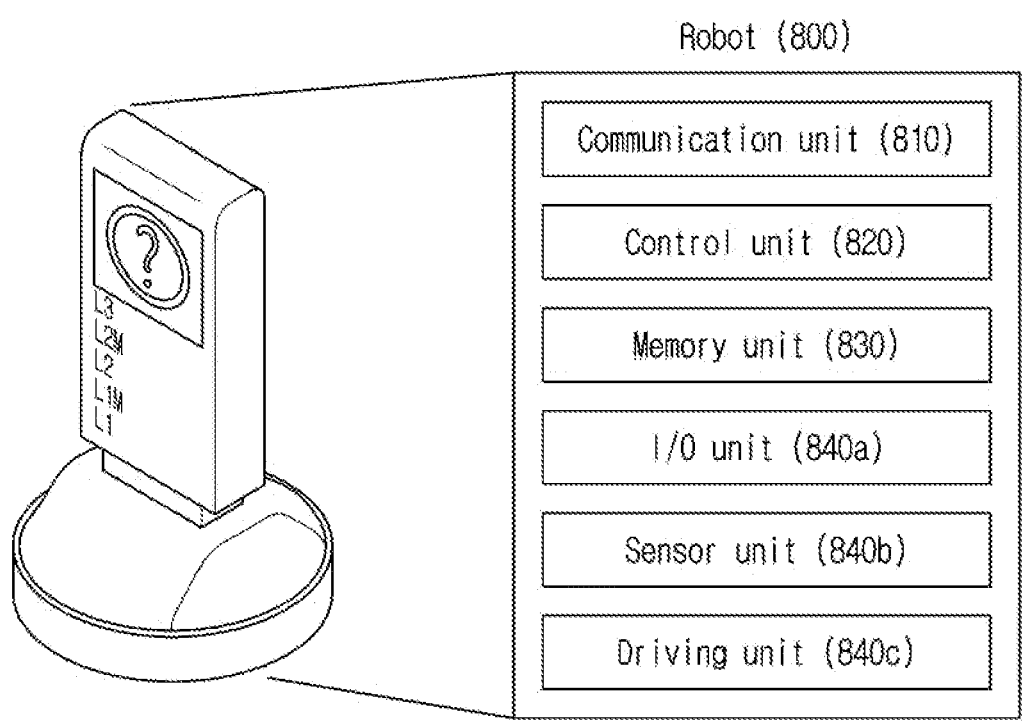
FIG. 8 is a view showing an example of a robot applicable to the present disclosure.

FIG. 8 is a view showing an example of a robot applicable to the present disclosure. For example, the robot may be classified into industrial, medical, household, military, etc. according to the purpose or field of use. At this time, referring to FIG. 8, the robot 800 may include a communication unit (transceiver) 810, a control unit (controller) 820, a memory unit (memory) 830, an input/output unit 840*a*, sensor unit 840*b* and a driving unit 840*c*. Here, blocks 810 to 830/840*a* to 840*c* may correspond to the blocks 310 to 330/340 of FIG. 3, respectively.

The communication unit 810 may transmit and receive signals (e.g., driving information, control signals, etc.) to and from external devices such as another wireless device, another robot or a control server. The control unit 820 may control the components of the robot 800 to perform various operations. The memory unit 830 may store data/parameters/programs/code/instructions supporting various functions of the robot 800. The input/output unit 840*a* may acquire information from the outside of the robot 800 and output information to the outside of the robot 800. The input/output unit 840*a* may include a camera, a microphone, a user input unit, a display, a speaker and/or a haptic module.

The sensor unit 840*b* may obtain internal information, surrounding environment information, user information, etc. of the robot 800. The sensor unit 840*b* may include a proximity sensor, an illumination sensor, an acceleration sensor, a magnetic sensor, a gyro sensor, an inertia sensor, an infrared (IR) sensor, a finger scan sensor, an ultrasonic sensor, an optical sensor, a microphone and/or a radar.

The driving unit 840*c* may perform various physical operations such as movement of robot joints. In addition, the driving unit 840*c* may cause the robot 800 to run on the ground or fly in the air. The driving unit 840*c* may include an actuator, a motor, wheels, a brake, a propeller, etc.

Figure 9:
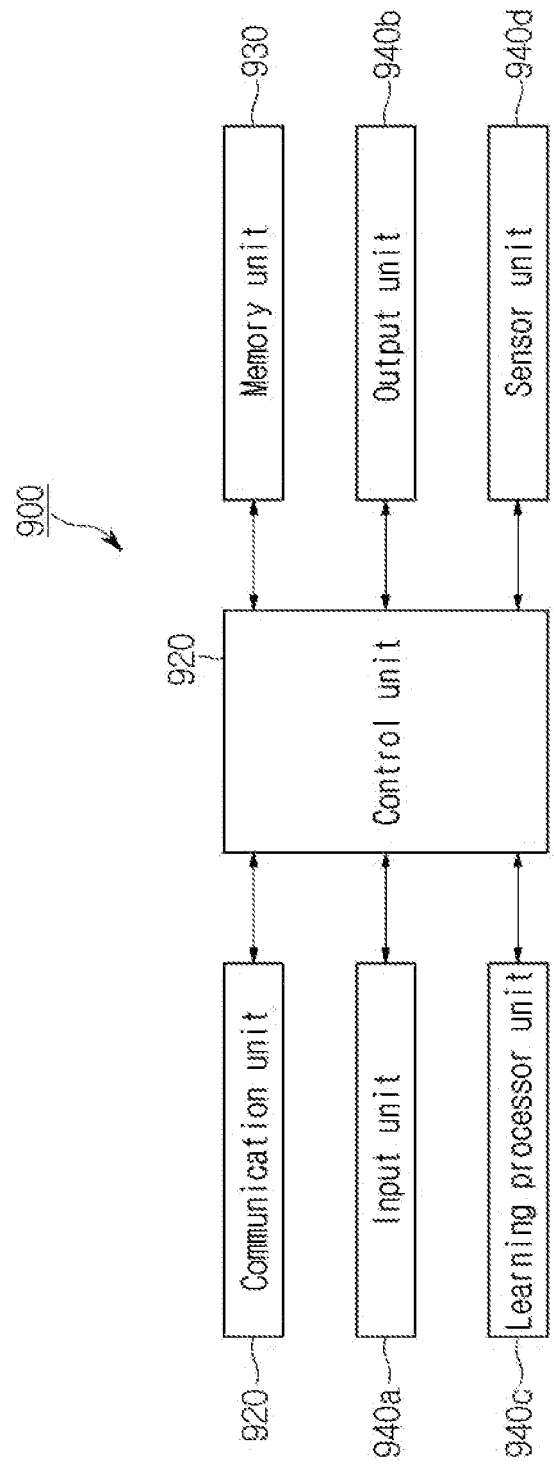
FIG. 9 is a view showing an example of artificial intelligence (AI) device applicable to the present disclosure.

FIG. 9 is a view showing an example of artificial intelligence (AI) device applicable to the present disclosure. For example, the AI device may be implemented as fixed or movable devices such as a TV, a projector, a smartphone, a PC, a laptop, a digital broadcast terminal, a tablet PC, a wearable device, a set-top box (STB), a radio, a washing machine, a refrigerator, a digital signage, a robot, a vehicle, or the like.

Referring to FIG. 9, the AI device 900 may include a communication unit (transceiver) 910, a control unit (controller) 920, a memory unit (memory) 930, an input/output unit 940*a*/940*b*, a leaning processor unit (learning processor) 940*c* and a sensor unit 940*d*. The blocks 910 to 930/940a to 940d may correspond to the blocks 310 to 330/340 of FIG. 3, respectively.

The communication unit 910 may transmit and receive wired/wireless signals (e.g., sensor information, user input, learning models, control signals, etc.) to and from external devices such as another AI device (e.g., FIG. 1, 100x, 120 or 140) or the AI server (FIG. 1, 140) using wired/wireless communication technology. To this end, the communication unit 910 may transmit information in the memory unit 930 to an external device or transfer a signal received from the external device to the memory unit 930.

The control unit 920 may determine at least one executable operation of the AI device 900 based on information determined or generated using a data analysis algorithm or a machine learning algorithm. In addition, the control unit 920 may control the components of the AI device 900 to perform the determined operation. For example, the control unit 920 may request, search for, receive or utilize the data of the learning processor unit 940c or the memory unit 930, and control the components of the AI device 900 to perform predicted operation or operation, which is determined to be desirable, of at least one executable operation. In addition, the control unit 920 may collect history information including operation of the AI device 900 or user's feedback on the operation and store the history information in the memory unit 930 or the learning processor unit 940c or transmit the history information to the AI server (FIG. 1, 140). The collected history information may be used to update a learning model.

The memory unit 930 may store data supporting various functions of the AI device 900. For example, the memory unit 930 may store data obtained from the input unit 940a, data obtained from the communication unit 910, output data of the learning processor unit 940c, and data obtained from the sensing unit 940. In addition, the memory unit 930 may store control information and/or software code necessary to operate/execute the control unit 920.

The input unit 940a may acquire various types of data from the outside of the AI device 900. For example, the input unit 940a may acquire learning data for model learning, input data, to which the learning model will be applied, etc. The input unit 940a may include a camera, a microphone and/or a user input unit. The output unit 940b may generate video, audio or tactile output. The output unit 940b may include a display, a speaker and/or a haptic module. The sensing unit 940 may obtain at least one of internal information of the AI device 900, the surrounding environment information of the AI device 900 and user information using various sensors. The sensing unit 940 may include a proximity sensor, an illumination sensor, an acceleration sensor, a magnetic sensor, a gyro sensor, an inertia sensor, a red green blue (RGB) sensor, an infrared (IR) sensor, a finger scan sensor, an ultrasonic sensor, an optical sensor, a microphone and/or a radar.

The learning processor unit 940c may train a model composed of an artificial neural network using training data. The learning processor unit 940c may perform AI processing along with the learning processor unit of the AI server (FIG. 1, 140). The learning processor unit 940c may process information received from an external device through the communication unit 910 and/or information stored in the memory unit 930. In addition, the output value of the learning processor unit 940c may be transmitted to the external device through the communication unit 910 and/or stored in the memory unit 930.

Physical Channels and General Signal Transmission

In a radio access system, a UE receives information from a base station on a DL and transmits information to the base station on a UL. The information transmitted and received between the UE and the base station includes general data information and a variety of control information. There are many physical channels according to the types/usages of information transmitted and received between the base station and the UE.

Figure 10:
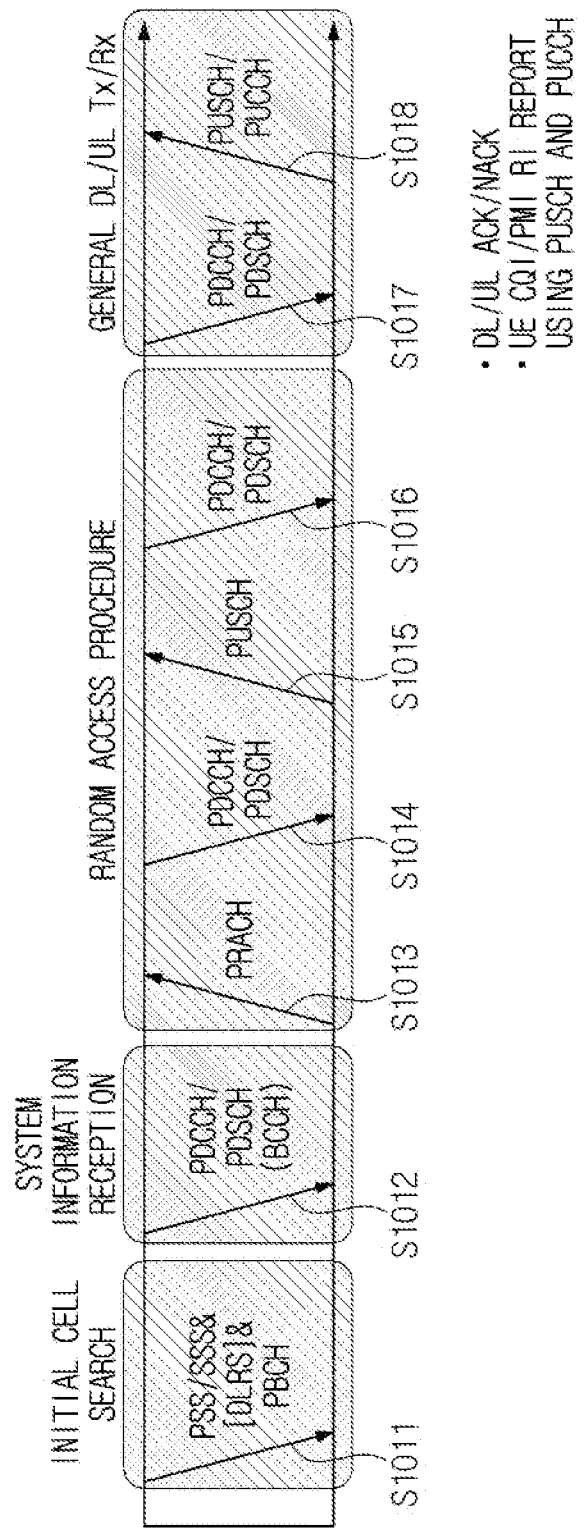
FIG. 10 is a view showing physical channels applicable to the present disclosure and a signal transmission method using the same.

FIG. 10 is a view showing physical channels applicable to the present disclosure and a signal transmission method using the same.

The UE which is turned on again in a state of being turned off or has newly entered a cell performs initial cell search operation in step S1011 such as acquisition of synchronization with a base station. Specifically, the UE performs synchronization with the base station, by receiving a Primary Synchronization Channel (P-SCH) and a Secondary Synchronization Channel (S-SCH) from the base station, and acquires information such as a cell Identifier (ID).

Thereafter, the UE may receive a physical broadcast channel (PBCH) signal from the base station and acquire intra-cell broadcast information. Meanwhile, the UE may receive a downlink reference signal (DL RS) in an initial cell search step and check a downlink channel state. The UE which has completed initial cell search may receive a physical downlink control channel (PDCCH) and a physical downlink control channel (PDSCH) according to physical downlink control channel information in step S1012, thereby acquiring more detailed system information.

Thereafter, the UE may perform a random access procedure such as steps S1013 to S1016 in order to complete access to the base station. To this end, the UE may transmit a preamble through a physical random access channel (PRACH) (S1013) and receive a random access response (RAR) to the preamble through a physical downlink control channel and a physical downlink shared channel corresponding thereto (S1014). The UE may transmit a physical uplink shared channel (PUSCH) using scheduling information in the RAR (S1015) and perform a contention resolution procedure such as reception of a physical downlink control channel signal and a physical downlink shared channel signal corresponding thereto (S1016).

The UE, which has performed the above-described procedures, may perform reception of a physical downlink control channel signal and/or a physical downlink shared channel signal (S1017) and transmission of a physical uplink shared channel (PUSCH) signal and/or a physical uplink control channel (PUCCH) signal (S1018) as general uplink/downlink signal transmission procedures.

The control information transmitted from the UE to the base station is collectively referred to as uplink control information (UCI). The UCI includes hybrid automatic repeat and request acknowledgement/negative-ACK (HARQ-ACK/NACK), scheduling request (SR), channel quality indication (CQI), preceding matrix indication (PMI), rank indication (RI), beam indication (BI) information, etc. At this time, the UCI is generally periodically transmitted through a PUCCH, but may be transmitted through a PUSCH in some embodiments (e.g., when control information and traffic data are simultaneously transmitted). In addition, the UE may aperiodically transmit UCI through a PUSCH according to a request/instruction of a network.

Figure 11:
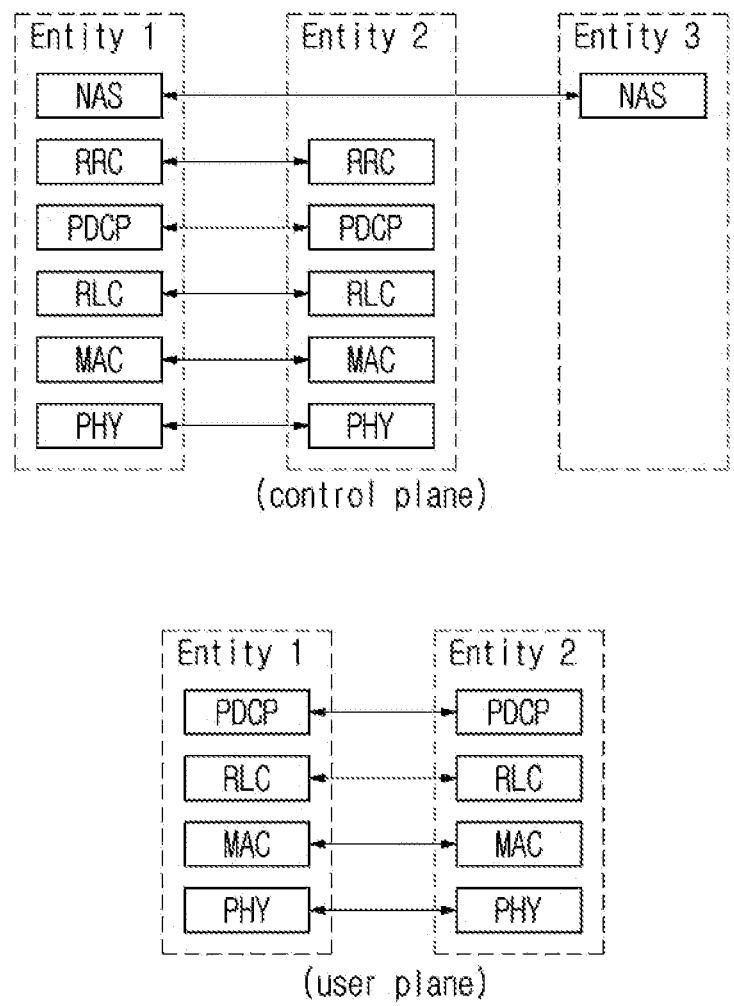
FIG. 11 is a view showing the structure of a control plane and a user plane of a radio interface protocol applicable to the present disclosure.

FIG. 11 is a view showing the structure of a control plane and a user plane of a radio interface protocol applicable to the present disclosure.

Referring to FIG. 11, Entity 1 may be a user equipment (UE). At this time, the UE may be at least one of a wireless device, a hand-held device, a vehicle, a mobility, an XR device, a robot or an AI device, to which the present disclosure is applicable in FIGS. 1 to 9. In addition, the UE refers to a device, to which the present disclosure is applicable, and is not limited to a specific apparatus or device.

Entity 2 may be a base station. At this time, the base station may be at least one of an eNB, a gNB or an ng-eNB. In addition, the base station may refer to a device for transmitting a downlink signal to a UE and is not limited to a specific apparatus or device. That is, the base station may be implemented in various forms or types and is not limited to a specific form.

Entity 3 may be a device for performing a network apparatus or a network function. At this time, the network apparatus may be a core network node (e.g., mobility management entity (MME) for managing mobility, an access and mobility management function (AMF), etc. In addition, the network function may mean a function implemented in order to perform a network function. Entity 3 may be a device, to which a function is applied. That is, Entity 3 may refer to a function or device for performing a network function and is not limited to a specific device.

A control plane refers to a path used for transmission of control messages, which are used by the UE and the network to manage a call. A user plane refers to a path in which data generated in an application layer, e.g. voice data or Internet packet data, is transmitted. At this time, a physical layer which is a first layer provides an information transfer service to a higher layer using a physical channel. The physical layer is connected to a media access control (MAC) layer of a higher layer via a transmission channel. At this time, data is transmitted between the MAC layer and the physical layer via the transmission channel. Data is also transmitted between a physical layer of a transmitter and a physical layer of a receiver via a physical channel. The physical channel uses time and frequency as radio resources.

The MAC layer which is a second layer provides a service to a radio link control (RLC) layer of a higher layer via a logical channel. The RLC layer of the second layer supports reliable data transmission. The function of the RLC layer may be implemented by a functional block within the MAC layer. A packet data convergence protocol (PDCP) layer which is the second layer performs a header compression function to reduce unnecessary control information for efficient transmission of an Internet protocol (IP) packet such as an IPv4 or IPv6 packet in a radio interface having relatively narrow bandwidth. A radio resource control (RRC) layer located at the bottommost portion of a third layer is defined only in the control plane. The RRC layer serves to control logical channels, transmission channels, and physical channels in relation to configuration, re-configuration, and release of radio bearers. A radio bearer (RB) refers to a service provided by the second layer to transmit data between the UE and the network. To this end, the RRC layer of the UE and the RRC layer of the network exchange RRC messages. A non-access stratum (NAS) layer located at a higher level of the RRC layer performs functions such as session management and mobility management. One cell configuring a base station may be set to one of various bandwidths to provide a downlink or uplink transmission service to several UEs. Different cells may be set to provide different bandwidths. Downlink transmission channels for transmitting data from a network to a UE may include a broadcast channel (BCH) for transmitting system information, a paging channel (PCH) for transmitting paging messages, and a DL shared channel (SCH) for transmitting user traffic or control messages. Traffic or control messages of a DL multicast or broadcast service may be transmitted through the DL SCH or may be transmitted through an additional DL multicast channel (MCH). Meanwhile, UL transmission channels for data transmission from the UE to the network include a random access channel (RACH) for transmitting initial control messages and a UL SCH for transmitting user traffic or control messages. Logical channels, which are located at a higher level of the transmission channels and are mapped to the transmission channels, include a broadcast control channel (BCCH), a paging control channel (PCCH), a common control channel (CCCH), a multicast control channel (MCCH), and a multicast traffic channel (MTCH).

Figure 12:
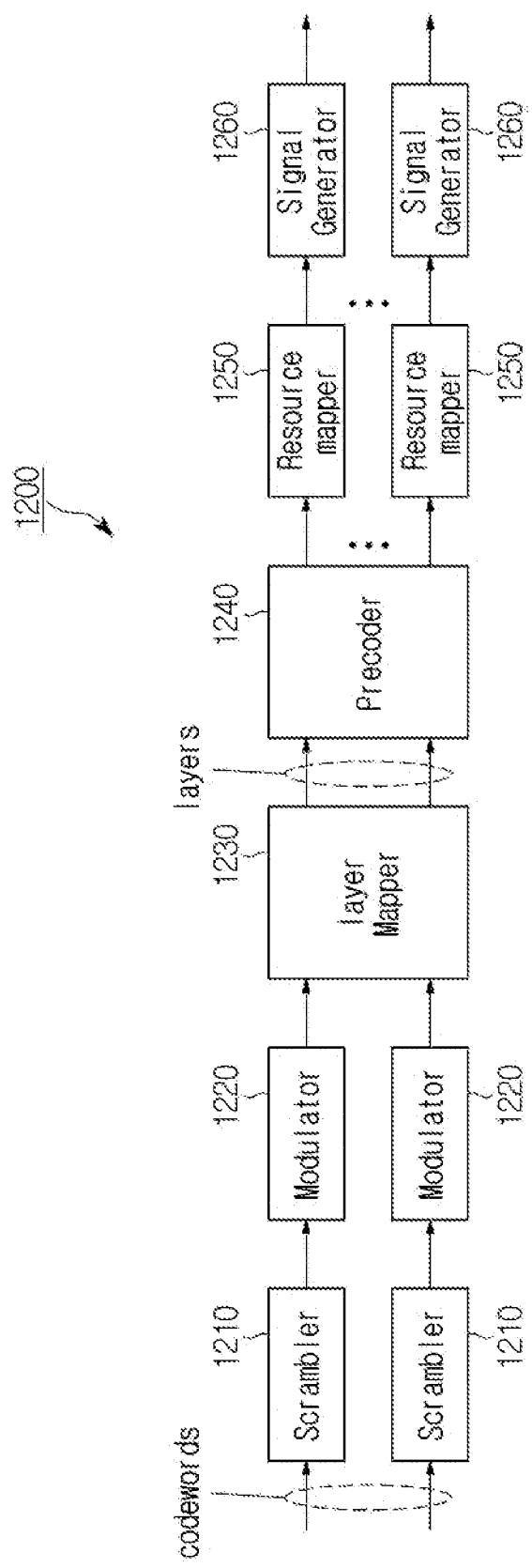
FIG. 12 is a view showing a method of processing a transmitted signal applicable to the present disclosure.

FIG. 12 is a view showing a method of processing a transmitted signal applicable to the present disclosure. For example, the transmitted signal may be processed by a signal processing circuit. At this time, a signal processing circuit 1200 may include a scrambler 1210, a modulator 1220, a layer mapper 1230, a precoder 1240, a resource mapper 1250, and a signal generator 1260. At this time, for example, the operation/function of FIG. 12 may be performed by the processors 202*a* and 202*b* and/or the transceiver 206*a* and 206*b* of FIG. 2. In addition, for example, the hardware element of FIG. 12 may be implemented in the processors 202*a* and 202*b* of FIG. 2 and/or the transceivers 206*a* and 206*b* of FIG. 2. For example, blocks 1010 to 1060 may be implemented in the processors 202*a* and 202*b* of FIG. 2. In addition, blocks 1210 to 1250 may be implemented in the processors 202*a* and 202*b* of FIG. 2 and a block 1260 may be implemented in the transceivers 206*a* and 206*b* of FIG. 2, without being limited to the above-described embodiments.

A codeword may be converted into a radio signal through the signal processing circuit 1200 of FIG. 12. Here, the codeword is a coded bit sequence of an information block. The information block may include a transport block (e.g., a UL-SCH transport block or a DL-SCH transport block). The radio signal may be transmitted through various physical channels (e.g., a PUSCH and a PDSCH) of FIG. 10. Specifically, the codeword may be converted into a bit sequence scrambled by the scrambler 1210. The scramble sequence used for scramble is generated based in an initial value and the initial value may include ID information of a wireless device, etc. The scrambled bit sequence may be modulated into a modulated symbol sequence by the modulator 1220. The modulation method may include pi/2-binary phase shift keying (pi/2-BPSK), m-phase shift keying (m-PSK), m-quadrature amplitude modulation (m-QAM), etc.

A complex modulation symbol sequence may be mapped to one or more transport layer by the layer mapper 1230. Modulation symbols of each transport layer may be mapped to corresponding antenna port(s) by the precoder 1240 (precoding). The output z of the precoder 1240 may be obtained by multiplying the output y of the layer mapper 1230 by an N*M precoding matrix W. Here, N may be the number of antenna ports and M may be the number of transport layers. Here, the precoder 1240 may perform precoding after transform precoding (e.g., discrete Fourier transform (DFT)) for complex modulation symbols. In addition, the precoder 1240 may perform precoding without performing transform precoding.

The resource mapper 1250 may map modulation symbols of each antenna port to time-frequency resources. The time-frequency resources may include a plurality of symbols (e.g., a CP-OFDMA symbol and a DFT-s-OFDMA symbol) in the time domain and include a plurality of subcarriers in the frequency domain. The signal generator 1260 may generate a radio signal from the mapped modulation symbols, and the generated radio signal may be transmitted to another device through each antenna. To this end, the signal generator 1260 may include an inverse fast Fourier transform (IFFT) module, a cyclic prefix (CP) insertor, a digital-to-analog converter (DAC), a frequency uplink converter, etc.

A signal processing procedure for a received signal in the wireless device may be configured as the inverse of the signal processing procedures 1210 to 1260 of FIG. 12. For example, the wireless device (e.g., 200a or 200b of FIG. 2) may receive a radio signal from the outside through an antenna port/transceiver. The received radio signal may be converted into a baseband signal through a signal restorer. To this end, the signal restorer may include a frequency downlink converter, an analog-to-digital converter (ADC), a CP remover, and a fast Fourier transform (FFT) module. Thereafter, the baseband signal may be restored to a codeword through a resource de-mapper process, a postcoding process, a demodulation process and a de-scrambling process. The codeword may be restored to an original information block through decoding. Accordingly, a signal processing circuit (not shown) for a received signal may include a signal restorer, a resource de-mapper, a postcoder, a demodulator, a de-scrambler and a decoder.

Figure 13:
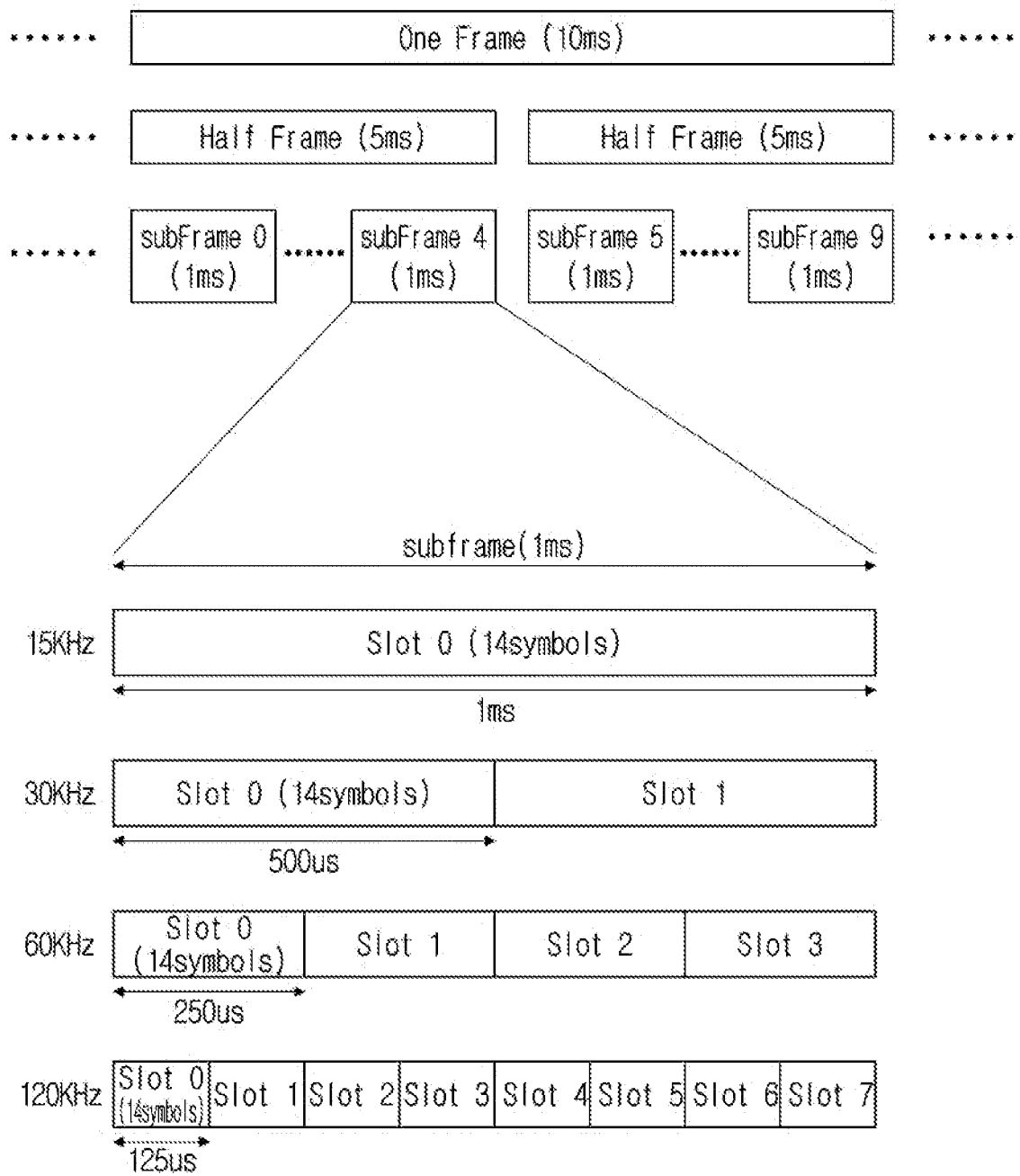
FIG. 13 is a view showing the structure of a radio frame applicable to the present disclosure.

FIG. 13 is a view showing the structure of a radio frame applicable to the present disclosure.

UL and DL transmission based on an NR system may be based on the frame shown in FIG. 13. At this time, one radio frame has a length of 10 ms and may be defined as two 5-ms half-frames (HFs). One half-frame may be defined as five 1-ms subframes (SFs). One subframe may be divided into one or more slots and the number of slots in the subframe may depend on subscriber spacing (SCS). At this time, each slot may include 12 or 14 OFDM(A) symbols according to cyclic prefix (CP). If normal CP is used, each slot may include 14 symbols. If an extended CP is used, each slot may include 12 symbols. Here, the symbol may include an OFDM symbol (or a CP-OFDM symbol) and an SC-FDMA symbol (or a DFT-s-OFDM symbol).

Table 1 shows the number of symbols per slot according to SCS, the number of slots per frame and the number of slots per subframe when normal CP is used, and Table 2 shows the number of symbols per slot according to SCS, the number of slots per frame and the number of slots per subframe when extended CP is used.

TABLE 1

| $\mu$ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

TABLE 2

| $\mu$ | $N_{symb}^{slot}$ | $N_{slot}^{frame,\mu}$ | $N_{slot}^{subframe,\mu}$ |
|---|---|---|---|
| 2 | 12 | 40 | 4 |

In Tables 1 and 2 above, Nslotsymb may indicate the number of symbols in a slot, Nframe,μslot may indicate the number of slots in a frame, and Nsubframe,μslot may indicate the number of slots in a subframe. In addition, in a system, to which the present disclosure is applicable, OFDM (A) numerology (e.g., SCS, CP length, etc.) may be differently set among a plurality of cells merged to one UE. Accordingly, an (absolute time) period of a time resource (e.g., an SF, a slot or a TTI) (for convenience, collectively referred to as a time unit (TU)) composed of the same number of symbols may be differently set between merged cells.

NR may support a plurality of numerologies (or subscriber spacings (SCSs)) supporting various 5G services. For example, a wide area in traditional cellular bands is supported when the SCS is 15 kHz, dense-urban, lower latency and wider carrier bandwidth are supported when the SCS is 30 kHz/60 kHz, and bandwidth greater than 24.25 GHz may be supported to overcome phase noise when the SCS is 60 kHz or higher.

An NR frequency band is defined as two types (FR1 and FR2) of frequency ranges. FR1 and FR2 may be configured as shown in the following table. In addition, FR2 may mean millimeter wave (mmW).

TABLE 3

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

In addition, for example, in a communication system, to which the present disclosure is applicable, the above-described numerology may be differently set. For example, a terahertz wave (THz) band may be used as a frequency band higher than FR2. In the THz band, the SCS may be set greater than that of the NR system, and the number of slots may be differently set, without being limited to the above-described embodiments. The THz band will be described below.

Figure 14:
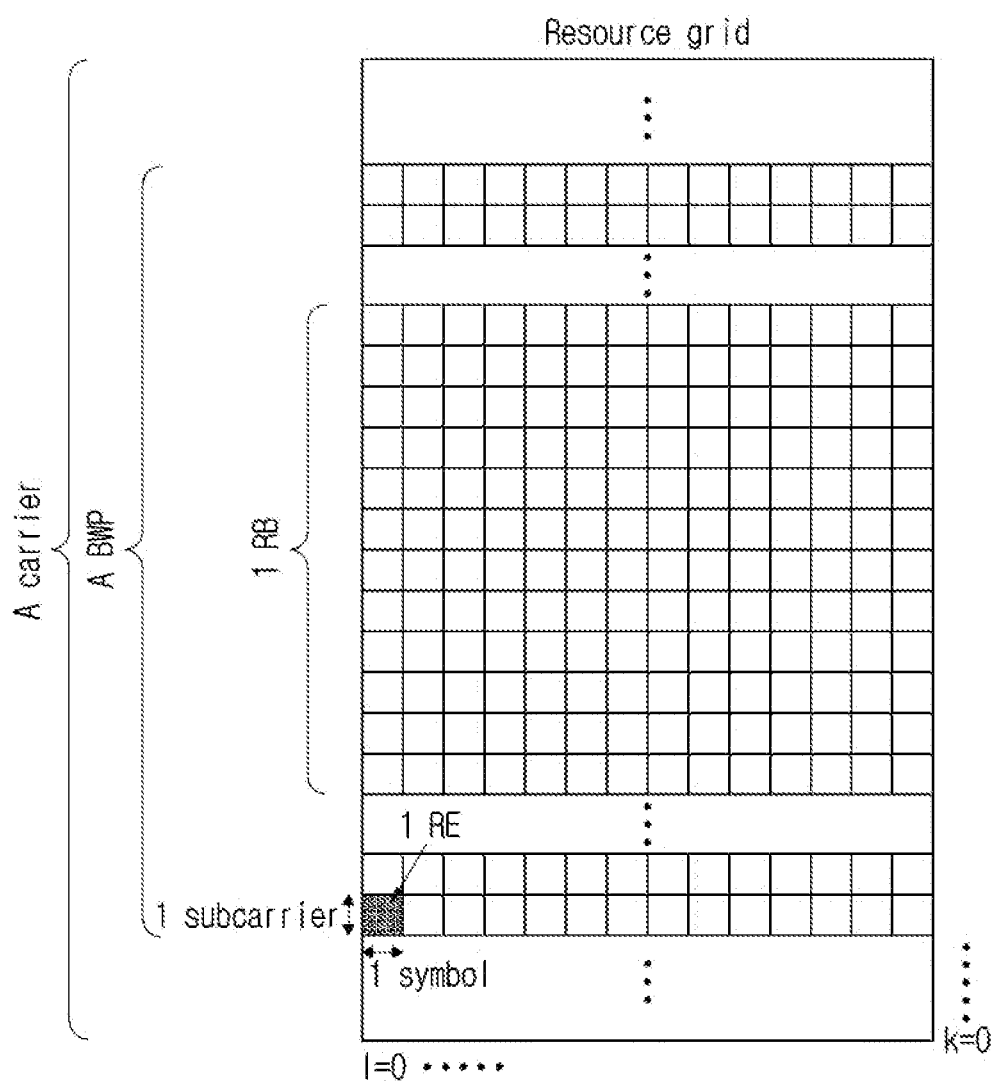
FIG. 14 is a view showing a slot structure applicable to the present disclosure.

FIG. 14 is a view showing a slot structure applicable to the present disclosure.

One slot includes a plurality of symbols in the time domain. For example, one slot includes seven symbols in case of normal CP and one slot includes six symbols in case of extended CP. A carrier includes a plurality of subcarriers in the frequency domain. A resource block (RB) may be defined as a plurality (e.g., 12) of consecutive subcarriers in the frequency domain.

In addition, a bandwidth part (BWP) is defined as a plurality of consecutive (P)RBs in the frequency domain and may correspond to one numerology (e.g., SCS, CP length, etc.).

The carrier may include a maximum of N (e.g., five) BWPs. Data communication is performed through an activated BWP and only one BWP may be activated for one UE. In resource grid, each element is referred to as a resource element (RE) and one complex symbol may be mapped.

6G Communication System

A 6G (wireless communication) system has purposes such as (i) very high data rate per device, (ii) a very large number of connected devices, (iii) global connectivity, (iv) very low latency, (v) decrease in energy consumption of battery-free IoT devices, (vi) ultra-reliable connectivity, and (vii) connected intelligence with machine learning capacity. The vision of the 6G system may include four aspects such as "intelligent connectivity", "deep connectivity", "holographic connectivity" and "ubiquitous connectivity", and the 6G system may satisfy the requirements shown in Table 4 below. That is, Table 4 shows the requirements of the 6G system.

TABLE 4

| | |
|---|---|
| Per device peak data rate | 1 Tbps |
| E2E latency | 1 ms |
| Maximum spectral efficiency | 100 bps/Hz |
| Mobility support | Up to 1000 km/hr |
| Satellite integration | Fully |
| AI | Fully |
| Autonomous vehicle | Fully |
| XR | Fully |
| Haptic Communication | Fully |

At this time, the 6G system may have key factors such as enhanced mobile broadband (eMBB), ultra-reliable low latency communications (URLLC), massive machine type communications (mMTC), AI integrated communication, tactile Internet, high throughput, high network capacity, high energy efficiency, low backhaul and access network congestion and enhanced data security.

Figure 15:
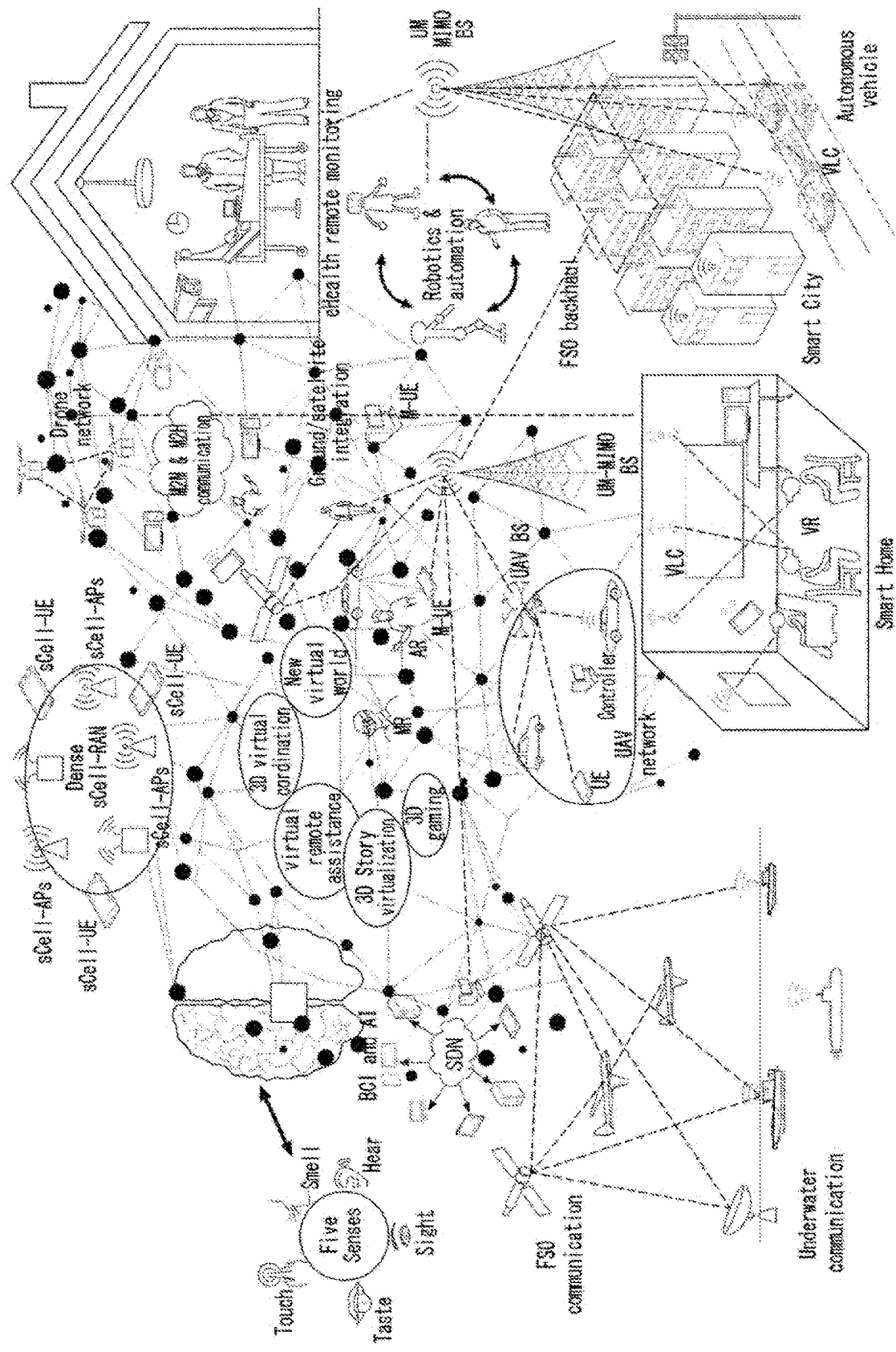
FIG. 15 is a view showing an example of a communication structure providable in a 6th generation (6G) system applicable to the present disclosure.

FIG. 15 is a view showing an example of a communication structure providable in a 6G system applicable to the present disclosure.

Referring to FIG. 15, the 6G system will have 50 times higher simultaneous wireless communication connectivity than a 5G wireless communication system. URLLC, which is the key feature of 5G, will become more important technology by providing end-to-end latency less than 1 ms in 6G communication. At this time, the 6G system may have much better volumetric spectrum efficiency unlike frequently used domain spectrum efficiency. The 6G system may provide advanced battery technology for energy harvesting and very long battery life and thus mobile devices may not need to be separately charged in the 6G system. In addition, in 6G, new network characteristics may be as follows.

Satellites integrated network: To provide a global mobile group, 6G will be integrated with satellite. Integrating terrestrial waves, satellites and public networks as one wireless communication system may be very important for 6G.

Connected intelligence: Unlike the wireless communication systems of previous generations, 6G is innovative and wireless evolution may be updated from "connected things" to "connected intelligence". AI may be applied in each step (or each signal processing procedure which will be described below) of a communication procedure.

Seamless integration of wireless information and energy transfer: A 6G wireless network may transfer power in order to charge the batteries of devices such as smartphones and sensors. Therefore, wireless information and energy transfer (WIET) will be integrated.

Ubiquitous super 3-dimension connectivity: Access to networks and core network functions of drones and very low earth orbit satellites will establish super 3D connection in 6G ubiquitous.

In the new network characteristics of 6G, several general requirements may be as follows.

Small cell networks: The idea of a small cell network was introduced in order to improve received signal quality as a result of throughput, energy efficiency and spectrum efficiency improvement in a cellular system. As a result, the small cell network is an essential feature for 5G and beyond 5G (5GB) communication systems. Accordingly, the 6G communication system also employs the characteristics of the small cell network.

Ultra-dense heterogeneous network: Ultra-dense heterogeneous networks will be another important characteristic of the 6G communication system. A multi-tier network composed of heterogeneous networks improves overall QoS and reduces costs.

High-capacity backhaul: Backhaul connection is characterized by a high-capacity backhaul network in order to support high-capacity traffic. A high-speed optical fiber and free space optical (FSO) system may be a possible solution for this problem.

Radar technology integrated with mobile technology: High-precision localization (or location-based service) through communication is one of the functions of the 6G wireless communication system. Accordingly, the radar system will be integrated with the 6G network.

Softwarization and virtualization: Softwarization and virtualization are two important functions which are the bases of a design process in a 5GB network in order to ensure flexibility, reconfigurability and programmability.

Core Implementation Technology of 6G System

Artificial Intelligence (AI)

Technology which is most important in the 6G system and will be newly introduced is AI. AI was not involved in the 4G system. A 5G system will support partial or very limited AI. However, the 6G system will support AI for full automation. Advance in machine learning will create a more intelligent network for real-time communication in 6G. When AI is introduced to communication, real-time data transmission may be simplified and improved. AI may determine a method of performing complicated target tasks using countless analysis. That is, AI may increase efficiency and reduce processing delay.

Time-consuming tasks such as handover, network selection or resource scheduling may be immediately performed by using AI. AI may play an important role even in M2M, machine-to-human and human-to-machine communication. In addition, AI may be rapid communication in a brain computer interface (BCI). An AI based communication system may be supported by meta materials, intelligent structures, intelligent networks, intelligent devices, intelligent recognition radios, self-maintaining wireless networks and machine learning.

Recently, attempts have been made to integrate AI with a wireless communication system in the application layer or the network layer, but deep learning have been focused on the wireless resource management and allocation field. However, such studies are gradually developed to the MAC layer and the physical layer, and, particularly, attempts to combine deep learning in the physical layer with wireless transmission are emerging. AI-based physical layer transmission means applying a signal processing and communication mechanism based on an AI driver rather than a traditional communication framework in a fundamental signal processing and communication mechanism. For example, channel coding and decoding based on deep learning, signal estimation and detection based on deep learning, multiple input multiple output (MIMO) mechanisms based on deep learning, resource scheduling and allocation based on AI, etc. may be included.

Machine learning may be used for channel estimation and channel tracking and may be used for power allocation, interference cancellation, etc. in the physical layer of DL. In addition, machine learning may be used for antenna selection, power control, symbol detection, etc. in the MIMO system.

However, application of a deep neutral network (DNN) for transmission in the physical layer may have the following problems.

Deep learning-based AI algorithms require a lot of training data in order to optimize training parameters. However, due to limitations in acquiring data in a specific channel environment as training data, a lot of training data is used offline. Static training for training data in a specific channel environment may cause a contradiction between the diversity and dynamic characteristics of a radio channel.

In addition, currently, deep learning mainly targets real signals. However, the signals of the physical layer of wireless communication are complex signals. For matching of the characteristics of a wireless communication signal, studies on a neural network for detecting a complex domain signal are further required.

Hereinafter, machine learning will be described in greater detail.

Machine learning refers to a series of operations to train a machine in order to build a machine which can perform tasks which cannot be performed or are difficult to be performed by people. Machine learning requires data and learning models. In machine learning, data learning methods may be roughly divided into three methods, that is, supervised learning, unsupervised learning and reinforcement learning.

Neural network learning is to minimize output error. Neural network learning refers to a process of repeatedly inputting training data to a neural network, calculating the error of the output and target of the neural network for the training data, backpropagating the error of the neural network from the output layer of the neural network to an input layer in order to reduce the error and updating the weight of each node of the neural network.

Supervised learning may use training data labeled with a correct answer and the unsupervised learning may use training data which is not labeled with a correct answer. That is, for example, in case of supervised learning for data classification, training data may be labeled with a category. The labeled training data may be input to the neural network, and the output (category) of the neural network may be compared with the label of the training data, thereby calculating the error. The calculated error is backpropagated from the neural network backward (that is, from the output layer to the input layer), and the connection weight of each node of each layer of the neural network may be updated according to backpropagation. Change in updated connection weight of each node may be determined according to the learning rate. Calculation of the neural network for input data and backpropagation of the error may configure a learning cycle (epoch). The learning data is differently applicable according to the number of repetitions of the learning cycle of the neural network. For example, in the early phase of learning of the neural network, a high learning rate may be used to increase efficiency such that the neural network rapidly ensures a certain level of performance and, in the late phase of learning, a low learning rate may be used to increase accuracy.

The learning method may vary according to the feature of data. For example, for the purpose of accurately predicting data transmitted from a transmitter in a receiver in a communication system, learning may be performed using supervised learning rather than unsupervised learning or reinforcement learning.

The learning model corresponds to the human brain and may be regarded as the most basic linear model. However, a paradigm of machine learning using a neural network structure having high complexity, such as artificial neural networks, as a learning model is referred to as deep learning.

Neural network cores used as a learning method may roughly include a deep neural network (DNN) method, a convolutional deep neural network (CNN) method and a recurrent Boltzmman machine (RNN) method. Such a learning model is applicable.

Terahertz (THz) Communication

THz communication is applicable to the 6G system. For example, a data rate may increase by increasing bandwidth. This may be performed by using sub-THz communication with wide bandwidth and applying advanced massive MIMO technology.

Figure 16:
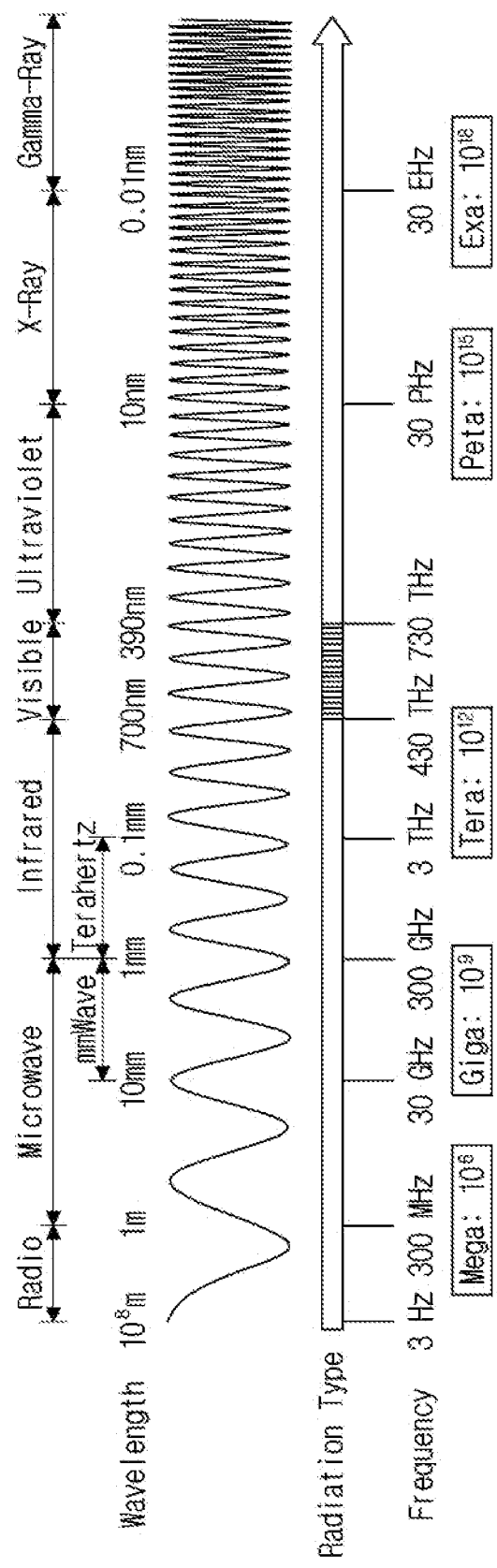
FIG. 16 is a view showing an electromagnetic spectrum applicable to the present disclosure.

FIG. 16 is a view showing an electromagnetic spectrum applicable to the present disclosure. For example, referring to FIG. 16, THz waves which are known as sub-millimeter radiation, generally indicates a frequency band between 0.1 THz and 10 THz with a corresponding wavelength in a range of 0.03 mm to 3 mm. A band range of 100 GHz to 300 GHz (sub THz band) is regarded as a main part of the THz band for cellular communication. When the sub-THz band is added to the mmWave band, the 6G cellular communication capacity increases. 300 GHz to 3 THz of the defined THz band is in a far infrared (IR) frequency band. A band of 300 GHz to 3 THz is a part of an optical band but is at the border of the optical band and is just behind an RF band. Accordingly, the band of 300 GHz to 3 THz has similarity with RF.

The main characteristics of THz communication include (i) bandwidth widely available to support a very high data rate and (ii) high path loss occurring at a high frequency (a high directional antenna is indispensable). A narrow beam width generated by the high directional antenna reduces interference. The small wavelength of a THz signal allows a larger number of antenna elements to be integrated with a device and BS operating in this band. Therefore, an advanced adaptive arrangement technology capable of overcoming a range limitation may be used.

Optical Wireless Technology

Optical wireless communication (OWC) technology is planned for 6G communication in addition to RF based communication for all possible device-to-access networks. This network is connected to a network-to-backhaul/fronthaul network connection. OWC technology has already been used since 4G communication systems but will be more widely used to satisfy the requirements of the 6G communication system. OWC technologies such as light fidelity/visible light communication, optical camera communication and free space optical (FSO) communication based on wide band are well-known technologies. Communication based on optical wireless technology may provide a very high data rate, low latency and safe communication. Light detection and ranging (LiDAR) may also be used for ultra high resolution 3D mapping in 6G communication based on wide band.

FSO Backhaul Network

The characteristics of the transmitter and receiver of the FSO system are similar to those of an optical fiber network.

Accordingly, data transmission of the FSO system similar to that of the optical fiber system. Accordingly, FSO may be a good technology for providing backhaul connection in the 6G system along with the optical fiber network. When FSO is used, very long-distance communication is possible even at a distance of 10,000 km or more. FSO supports mass backhaul connections for remote and non-remote areas such as sea, space, underwater and isolated islands. FSO also supports cellular base station connections.

Massive MIMO Technology

One of core technologies for improving spectrum efficiency is MIMO technology. When MIMO technology is improved, spectrum efficiency is also improved. Accordingly, massive MIMO technology will be important in the 6G system. Since MIMO technology uses multiple paths, multiplexing technology and beam generation and management technology suitable for the THz band should be significantly considered such that data signals are transmitted through one or more paths.

Blockchain

A blockchain will be important technology for managing large amounts of data in future communication systems. The blockchain is a form of distributed ledger technology, and distributed ledger is a database distributed across numerous nodes or computing devices. Each node duplicates and stores the same copy of the ledger. The blockchain is managed through a peer-to-peer (P2P) network. This may exist without being managed by a centralized institution or server. Blockchain data is collected together and organized into blocks. The blocks are connected to each other and protected using encryption. The blockchain completely complements large-scale IoT through improved interoperability, security, privacy, stability and scalability. Accordingly, the blockchain technology provides several functions such as interoperability between devices, high-capacity data traceability, autonomous interaction of different IoT systems, and large-scale connection stability of 6G communication systems.

3D Networking

The 6G system integrates terrestrial and public networks to support vertical expansion of user communication. A 3D BS will be provided through low-orbit satellites and UAVs. Adding new dimensions in terms of altitude and related degrees of freedom makes 3D connections significantly different from existing 2D networks.

Quantum Communication

In the context of the 6G network, unsupervised reinforcement learning of the network is promising. The supervised learning method cannot label the vast amount of data generated in 6G. Labeling is not required for unsupervised learning. Thus, this technique can be used to autonomously build a representation of a complex network. Combining reinforcement learning with unsupervised learning may enable the network to operate in a truly autonomous way.

Unmanned Aerial Vehicle

An unmanned aerial vehicle (UAV) or drone will be an important factor in 6G wireless communication. In most cases, a high-speed data wireless connection is provided using UAV technology. A base station entity is installed in the UAV to provide cellular connectivity. UAVs have certain features, which are not found in fixed base station infrastructures, such as easy deployment, strong line-of-sight links, and mobility-controlled degrees of freedom. During emergencies such as natural disasters, the deployment of terrestrial telecommunications infrastructure is not economically feasible and sometimes services cannot be provided in volatile environments. The UAV can easily handle this situation. The UAV will be a new paradigm in the field of wireless communications. This technology facilitates the three basic requirements of wireless networks, such as eMBB, URLLC and mMTC. The UAV can also serve a number of purposes, such as network connectivity improvement, fire detection, disaster emergency services, security and surveillance, pollution monitoring, parking monitoring, and accident monitoring. Therefore, UAV technology is recognized as one of the most important technologies for 6G communication.

Cell-Free Communication

The tight integration of multiple frequencies and heterogeneous communication technologies is very important in the 6G system. As a result, a user can seamlessly move from network to network without having to make any manual configuration in the device. The best network is automatically selected from the available communication technologies. This will break the limitations of the cell concept in wireless communication. Currently, user movement from one cell to another cell causes too many handovers in a high-density network, and causes handover failure, handover delay, data loss and ping-pong effects. 6G cell-free communication will overcome all of them and provide better QoS. Cell-free communication will be achieved through multi-connectivity and multi-tier hybrid technologies and different heterogeneous radios in the device.

Wireless Information and Energy Transfer (WIET)

WIET uses the same field and wave as a wireless communication system. In particular, a sensor and a smartphone will be charged using wireless power transfer during communication. WIET is a promising technology for extending the life of battery charging wireless systems. Therefore, devices without batteries will be supported in 6G communication.

Integration of Sensing and Communication

An autonomous wireless network is a function for continuously detecting a dynamically changing environment state and exchanging information between different nodes. In 6G, sensing will be tightly integrated with communication to support autonomous systems.

Integration of Access Backhaul Network

In 6G, the density of access networks will be enormous. Each access network is connected by optical fiber and backhaul connection such as FSO network. To cope with a very large number of access networks, there will be a tight integration between the access and backhaul networks.

Hologram Beamforming

Beamforming is a signal processing procedure that adjusts an antenna array to transmit radio signals in a specific direction. This is a subset of smart antennas or advanced antenna systems. Beamforming technology has several advantages, such as high signal-to-noise ratio, interference prevention and rejection, and high network efficiency. Hologram beamforming (HBF) is a new beamforming method that differs significantly from MIMO systems because this uses a software-defined antenna. HBF will be a very effective approach for efficient and flexible transmission and reception of signals in multi-antenna communication devices in 6G.

Big Data Analysis

Big data analysis is a complex process for analyzing various large data sets or big data. This process finds information such as hidden data, unknown correlations, and customer disposition to ensure complete data management. Big data is collected from various sources such as video, social networks, images and sensors. This technology is widely used for processing massive data in the 6G system.

Large Intelligent Surface (LIS)

In the case of the THz band signal, since the straightness is strong, there may be many shaded areas due to obstacles. By installing the LIS near these shaded areas, LIS technology that expands a communication area, enhances communication stability, and enables additional optional services becomes important. The LIS is an artificial surface made of electromagnetic materials, and can change propagation of incoming and outgoing radio waves. The LIS can be viewed as an extension of massive MIMO, but differs from the massive MIMO in array structures and operating mechanisms. In addition, the LIS has an advantage such as low power consumption, because this operates as a reconfigurable reflector with passive elements, that is, signals are only passively reflected without using active RF chains. In addition, since each of the passive reflectors of the LIS must independently adjust the phase shift of an incident signal, this may be advantageous for wireless communication channels. By properly adjusting the phase shift through an LIS controller, the reflected signal can be collected at a target receiver to boost the received signal power.

THz Wireless Communication

Figure 17:
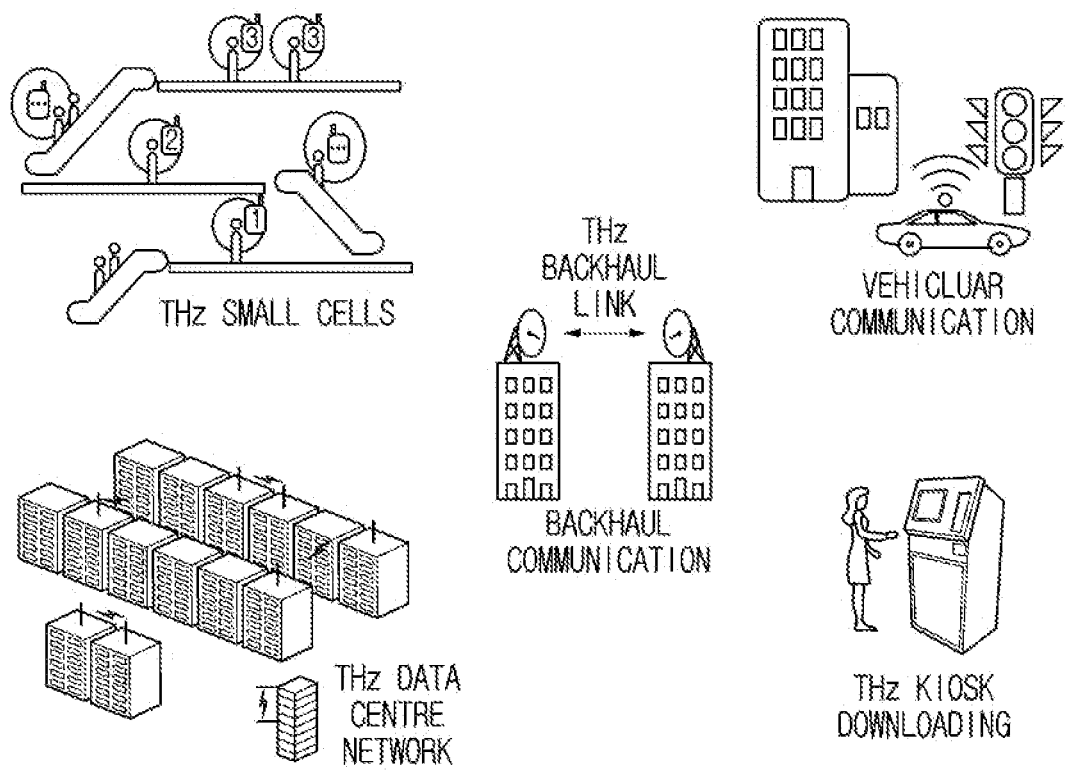
FIG. 17 is a view showing a THz communication method applicable to the present disclosure.

FIG. 17 is a view showing a THz communication method applicable to the present disclosure.

Referring to FIG. 17, THz wireless communication uses a THz wave having a frequency of approximately 0.1 to 10 THz (1 THz=1012 Hz), and may mean terahertz (THz) band wireless communication using a very high carrier frequency of 100 GHz or more. The THz wave is located between radio frequency (RF)/millimeter (mm) and infrared bands, and (i) transmits non-metallic/non-polarizable materials better than visible/infrared rays and has a shorter wavelength than the RF/millimeter wave and thus high straightness and is capable of beam convergence.

In addition, the photon energy of the THz wave is only a few meV and thus is harmless to the human body. A frequency band which will be used for THz wireless communication may be a D-band (110 GHz to 170 GHz) or a H-band (220 GHz to 325 GHz) band with low propagation loss due to molecular absorption in air. Standardization discussion on THz wireless communication is being discussed mainly in IEEE 802.15 THz working group (WG), in addition to 3GPP, and standard documents issued by a task group (TG) of IEEE 802.15 (e.g., TG3d, TG3e) specify and supplement the description of this disclosure. The THz wireless communication may be applied to wireless cognition, sensing, imaging, wireless communication, and THz navigation.

Specifically, referring to FIG. 17, a THz wireless communication scenario may be classified into a macro network, a micro network, and a nanoscale network. In the macro network, THz wireless communication may be applied to vehicle-to-vehicle (V2V) connection and backhaul/fronthaul connection. In the micro network, THz wireless communication may be applied to near-field communication such as indoor small cells, fixed point-to-point or multi-point connection such as wireless connection in a data center or kiosk downloading. Table 5 below shows an example of technology which may be used in the THz wave.

TABLE 5

| | |
|---|---|
| Transceivers Device | Available immature: UTC-PD, RTD and SBD |
| Modulation and coding | Low order modulation techniques (OOK, QPSK), LDPC, Reed Soloman, Hamming, Polar, Turbo |
| Antenna | Omni and Directional, phased array with low number of antenna elements |
| Bandwidth | 69 GHz (or 23 GHz) at 300 GHz |
| Channel models | Partially |
| Data rate | 100 Gbps |
| Outdoor deployment | No |
| Free space loss | High |
| Coverage | Low |
| Radio Measurements | 300 GHz indoor |
| Device size | Few micrometers |

Figure 18:
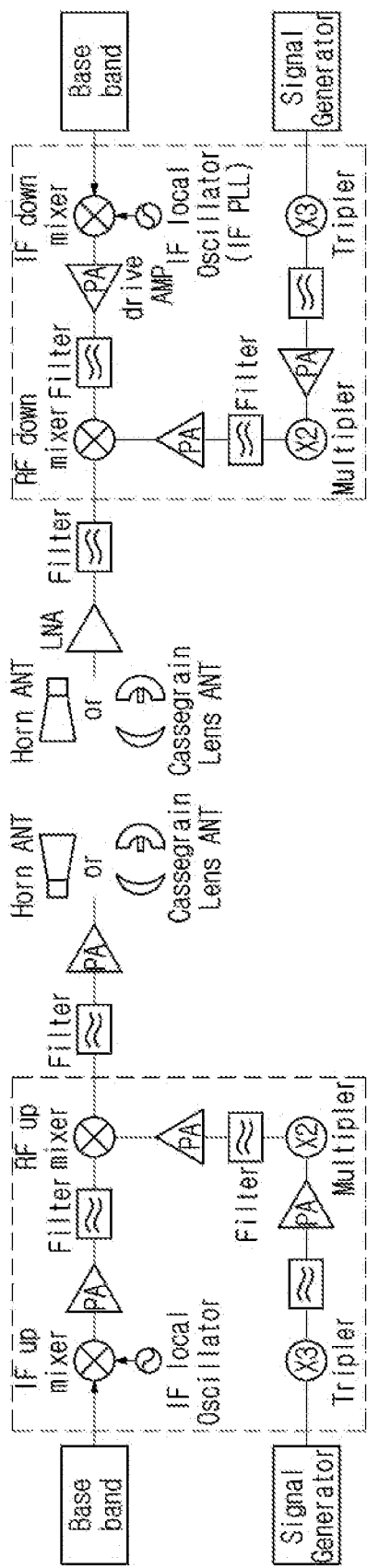
FIG. 18 is a view showing a THz wireless communication transceiver applicable to the present disclosure.

FIG. 18 is a view showing a THz wireless communication transceiver applicable to the present disclosure.

Referring to FIG. 18, THz wireless communication may be classified based on the method of generating and receiving THz. The THz generation method may be classified as an optical component or electronic component based technology.

At this time, the method of generating THz using an electronic component includes a method using a semiconductor component such as a resonance tunneling diode (RTD), a method using a local oscillator and a multiplier, a monolithic microwave integrated circuit (MMIC) method using a compound semiconductor high electron mobility transistor (HEMT) based integrated circuit, and a method using a Si-CMOS-based integrated circuit. In the case of FIG. 18, a multiplier (doubler, tripler, multiplier) is applied to increase the frequency, and radiation is performed by an antenna through a subharmonic mixer. Since the THz band forms a high frequency, a multiplier is essential. Here, the multiplier is a circuit having an output frequency which is N times an input frequency, and matches a desired harmonic frequency, and filters out all other frequencies. In addition, beamforming may be implemented by applying an array antenna or the like to the antenna of FIG. 18. In FIG. 18, IF represents an intermediate frequency, a tripler and a multiplier represents a multiplier, PA represents a power amplifier, and LNA represents a low noise amplifier, and PLL represents a phase-locked loop.

Figure 19:
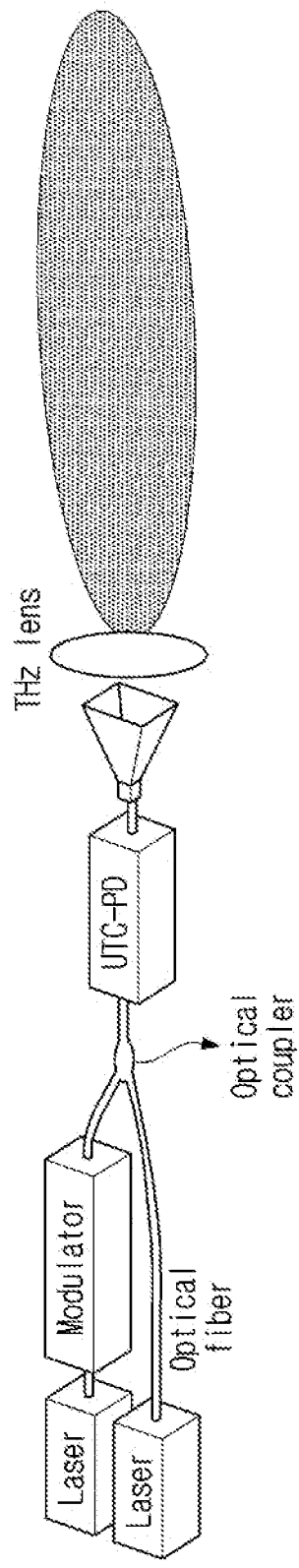
FIG. 19 is a view showing a THz signal generation method applicable to the present disclosure.
Figure 20:
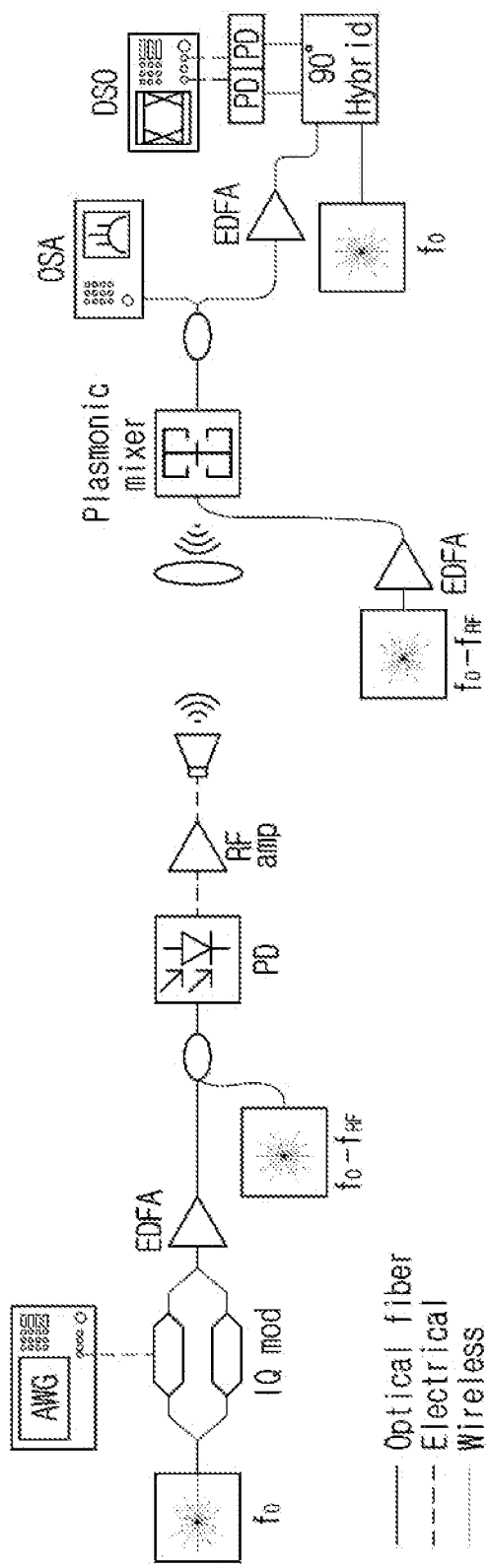
FIG. 20 is a view showing a wireless communication transceiver applicable to the present disclosure.

FIG. 19 is a view showing a THz signal generation method applicable to the present disclosure. FIG. 20 is a view showing a wireless communication transceiver applicable to the present disclosure.

Referring to FIGS. 19 and 20, the optical component-based THz wireless communication technology means a method of generating and modulating a THz signal using an optical component. The optical component-based THz signal generation technology refers to a technology that generates an ultrahigh-speed optical signal using a laser and an optical modulator, and converts it into a THz signal using an ultrahigh-speed photodetector. This technology is easy to increase the frequency compared to the technology using only the electronic component, can generate a high-power signal, and can obtain a flat response characteristic in a wide frequency band. In order to generate the THz signal based on the optical component, as shown in FIG. 19, a laser diode, a broadband optical modulator, and an ultrahigh-speed photodetector are required. In the case of FIG. 19, the light signals of two lasers having different wavelengths are combined to generate a THz signal corresponding to a wavelength difference between the lasers. In FIG. 19, an optical coupler refers to a semiconductor component that transmits an electrical signal using light waves to provide coupling with electrical isolation between circuits or systems, and a uni-travelling carrier photo-detector (UTC-PD) is one of photodetectors, which uses electrons as an active carrier and reduces the travel time of electrons by bandgap grading. The UTC-PD is capable of photodetection at 150 GHz or more. In FIG. 20, an erbium-doped fiber amplifier (EDFA) represents an optical fiber amplifier to which erbium is added, a photo detector (PD) represents a semiconductor component capable of converting an optical signal into an electrical signal, and OSA represents an optical sub assembly in which various optical communication functions (e.g., photoelectric conversion, electrophotic conversion, etc.) are modularized as one component, and DSO represents a digital storage oscilloscope.

Figure 21:
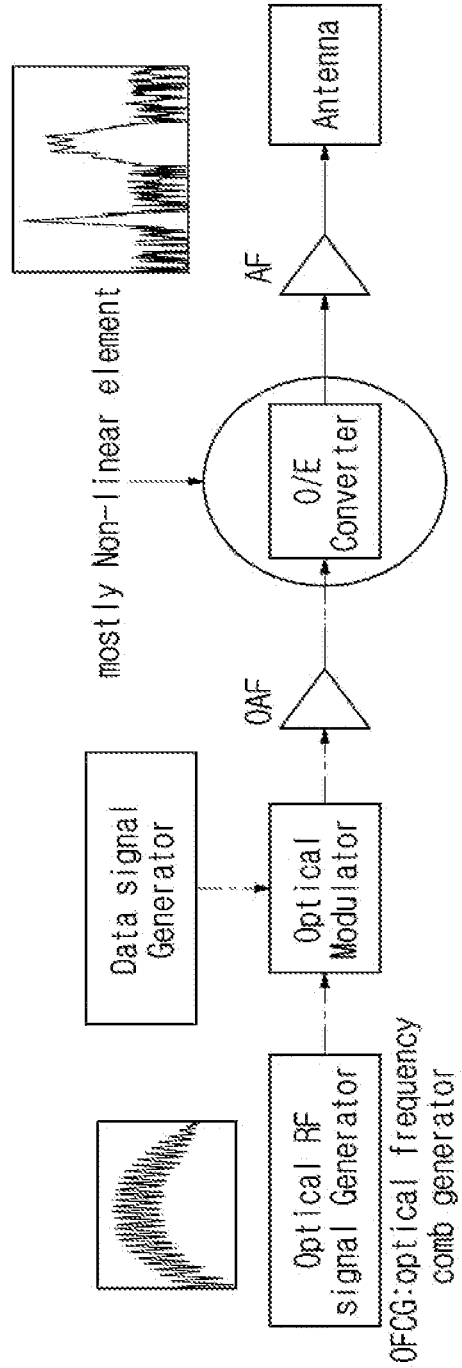
FIG. 21 is a view showing a transmitter structure applicable to the present disclosure.
Figure 22:
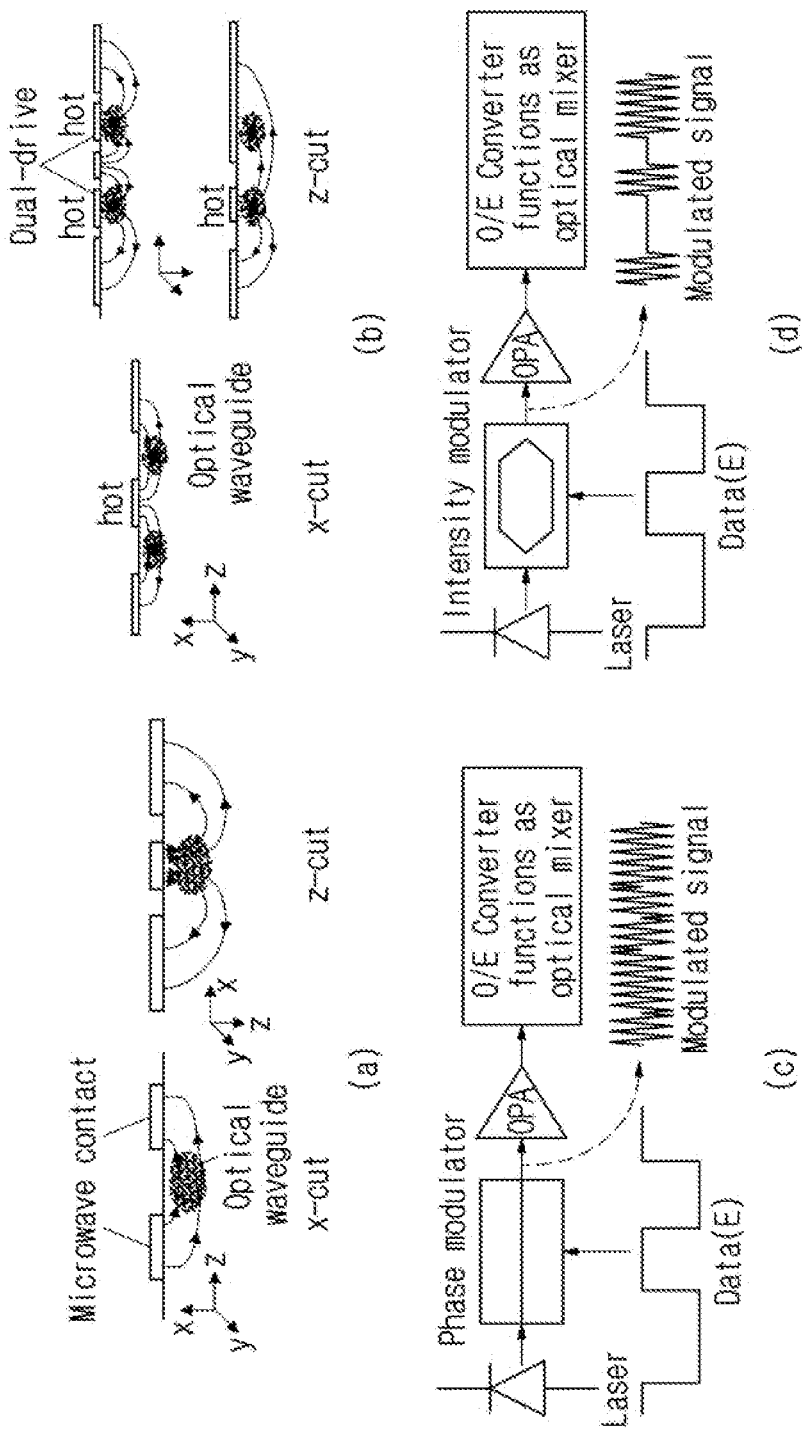
FIG. 22 is a view showing a modulator structure applicable to the present disclosure.

FIG. 21 is a view showing a transmitter structure applicable to the present disclosure. FIG. 22 is a view showing a modulator structure applicable to the present disclosure.

Referring to FIGS. 21 and 22, generally, the optical source of the laser may change the phase of a signal by passing through the optical wave guide. At this time, data is carried by changing electrical characteristics through microwave contact or the like. Thus, the optical modulator output is formed in the form of a modulated waveform. A photoelectric modulator (O/E converter) may generate THz pulses according to optical rectification operation by a nonlinear crystal, photoelectric conversion (O/E conversion) by a photoconductive antenna, and emission from a bunch of relativistic electrons. The terahertz pulse (THz pulse) generated in the above manner may have a length of a unit from femto second to pico second. The photoelectric converter (O/E converter) performs down conversion using non-linearity of the component.

Given THz spectrum usage, multiple contiguous GHz bands are likely to be used as fixed or mobile service usage for the terahertz system. According to the outdoor scenario criteria, available bandwidth may be classified based on oxygen attenuation 10^2 dB/km in the spectrum of up to 1 THz. Accordingly, a framework in which the available bandwidth is composed of several band chunks may be considered. As an example of the framework, if the length of the terahertz pulse (THz pulse) for one carrier (carrier) is set to 50 ps, the bandwidth (BW) is about 20 GHz.

Effective down conversion from the infrared band to the terahertz band depends on how to utilize the nonlinearity of the O/E converter. That is, for down-conversion into a desired terahertz band (THz band), design of the photoelectric converter (O/E converter) having the most ideal non-linearity to move to the corresponding terahertz band (THz band) is required. If a photoelectric converter (O/E converter) which is not suitable for a target frequency band is used, there is a high possibility that an error occurs with respect to the amplitude and phase of the corresponding pulse.

In a single carrier system, a terahertz transmission/reception system may be implemented using one photoelectric converter. In a multi-carrier system, as many photoelectric converters as the number of carriers may be required, which may vary depending on the channel environment. Particularly, in the case of a multi-carrier system using multiple broadbands according to the plan related to the above-described spectrum usage, the phenomenon will be prominent. In this regard, a frame structure for the multi-carrier system can be considered. The down-frequency-converted signal based on the photoelectric converter may be transmitted in a specific resource region (e.g., a specific frame). The frequency domain of the specific resource region may include a plurality of chunks. Each chunk may be composed of at least one component carrier (CC).

Specific Embodiments of the Present Disclosure

Hereinafter, a technology for transmitting and receiving a signal according to a UW-OFDM technique will be described. Specifically, the present disclosure describes a technique for channel estimation in a frequency domain by using UW that is a deterministic sequence. By various embodiments described below, a channel may be estimated in a frequency domain by using UW, and a resource desired for preamble transmission may be saved. In addition, it may also be advantageous to system complexity and multiple input and multiple output (MIMO) extension.

UW-OFDM is a waveform obtained by replacing CP in cyclic prefix (CP)-OFDM by UW that is a deterministic sequence. A UW may be used for synchronization acquisition, channel estimation, and phase noise estimation. Since a UW is included in a discrete fourier transform (DFT) window, cyclicity is ensured. In addition, when UW-OFDM is used, unlike CP-OFDM, the power and time resource consumed for CP transmission are saved. The structure of a UW-OFDM symbol can be illustrated in FIG. 23.

Figure 23:
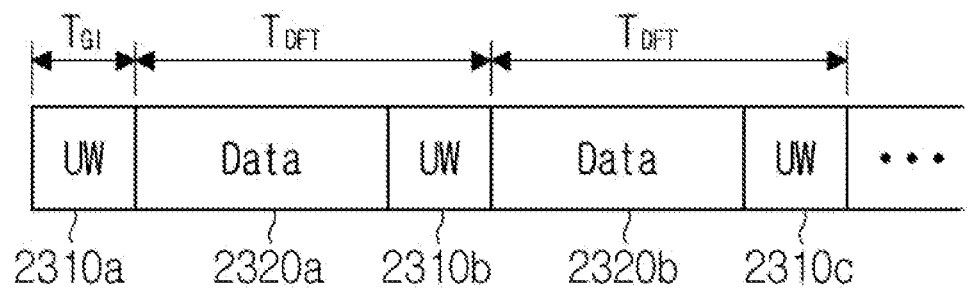
FIG. 23 is a view illustrating a structure of a symbol applicable to the present disclosure.

FIG. 23 is a view illustrating a structure of a symbol applicable to the present disclosure. FIG. 23 exemplifies a plurality of UW-OFDM symbols. Referring to FIG. 23, UW-OFDM symbols are configured in a concatenated form of UW 2310*a*, data 2320*a*, UW 2310*b*, data 2320*b* and UW 2310*c* in the time domain. A pair of one piece of data 2320*a* or 2320*b* and one UW 2310*b* or 2310*c* constitutes one UW-OFDM symbol, and one UW-OFDM symbol is included in a TDFT interval. That is, unlike a CP of a CP-OFDM symbol used in the current LTE and 5G systems, a UW of a UW-OFDM symbol is DFT or fast fourier transform (FFT) calculated together with data.

In FIG. 23, one UW 2320*a* is located before the first UW-OFDM symbol. In order to perform channel estimation and phase noise estimation using a UW, it is advantageous to locate a UW both in front part and end part of data within a UW-OFDM symbol. Accordingly, in the example of FIG. 23, the first UW 2320*a* is located without data. However, according to another embodiment, a UW-OFDM symbol may be configured by excluding the first UW 2320*a*.

Figure 24:
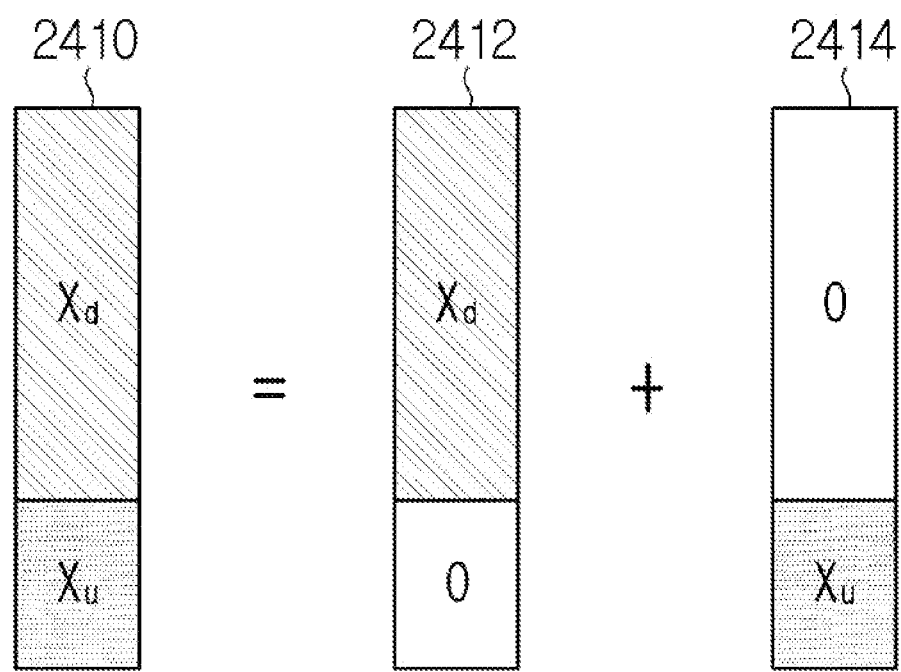
FIG. 24 is a view illustrating an example of a method of inserting a unique word (UW) into a symbol that is applicable to the present disclosure.

An example of generating a UW-OFDM symbol like in FIG. 23 is illustrated in FIG. 24. FIG. 24 is a view illustrating an example of a method of inserting a unique word (UW) into a symbol that is applicable to the present disclosure. Referring to FIG. 24, a UW of UW-OFDM may be generated in two steps. At a first step, a symbol 2412 including zero UW is generated. An OFDM symbol with a specific area of 0 within a symbol interval is generated by designating some of all the subcarriers as redundant subcarriers. At a second step, a UW-OFDM symbol 2410 is generated by adding a UW signal 2414 to be transmitted to the zero UW area of the generated OFDM symbol 2412. A sequence used for a UW may be configured in a cell-specific, user-specific and beam-specific way. For example, time domain, frequency domain and a Zadoff-Chu sequence with good domain correlation may be used as a UW sequence.

Figure 25:
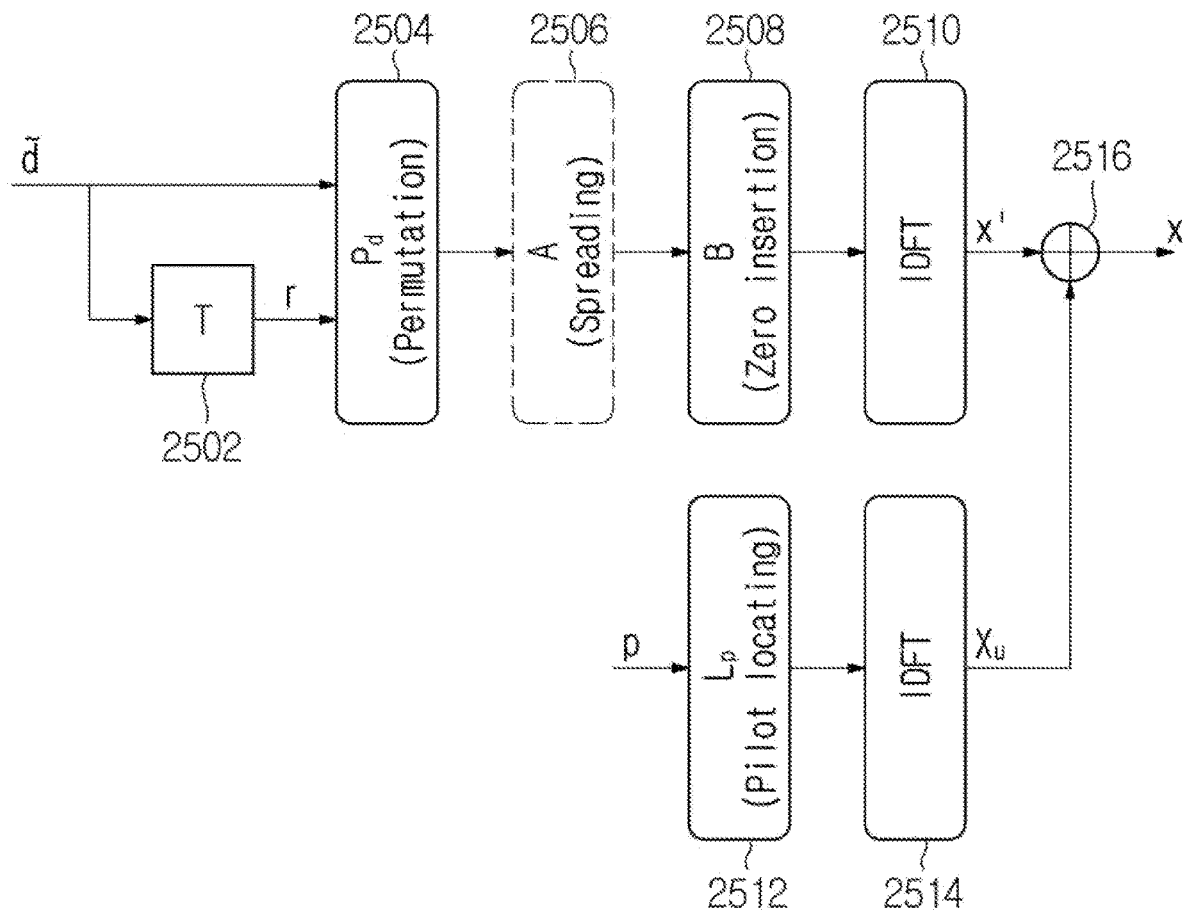
FIG. 25 is a view illustrating an example of a transmitter that transmits a unique-work (UW)-orthogonal frequency division multiplexing (OFDM) symbol applicable to the present disclosure.

FIG. 25 is a view illustrating an example of a transmitter that transmits a UW-OFDM symbol applicable to the present disclosure. The components shown in FIG. 25 are functional blocks and may be physically implemented in one or more circuits.

Referring to FIG. 25, a transmitter includes a redundant generating unit 2502, a permutation unit 2504, a spreading unit 2506, a zero insertion unit 2508, an inverse DFT (IDFT) unit 2510, a pilot locating unit 2512, an inverse DFT (IDFT) unit 2514, and an aggregation unit 2516.

The redundant generating unit 2502 adds redundant values to input data d. To this end, the redundant generating unit 2502 uses a redundant generation matrix T. The redundant generating unit 2502 may make a data symbol have 0 in a time domain-specific area after an IDFT or IFFT calculation. The permutation unit 2504 permutes signals including redundant values and data values. Herein, a signal includes values of a frequency domain, and the permutation unit 2504 moves redundant values to a position of a redundant subcarrier. The permutation unit 2504 uses a data permutation matrix $P_d$.

The spreading unit 2506 spreads values of each subcarrier included in a signal that is output from the permutation unit 2504. To this end, the spreading unit 2506 uses a spreading matrix A. However, according to another embodiment, the spreading unit 2506 may be omitted. A structure, in which a transmitter including the spreading unit 2506 is used, may be referred to as a non-systematic coded UW-OFDM structure, and a structure, in which a transmitter not including the spreading unit 2506 is used, may be referred to as a systematic coded UW-OFDM structure.

A combination of a permutation matrix $P_d$ used for permutation, a redundant generation matrix T and a spreading matrix A may be referred to as a code generation matrix G.

The zero insertion unit 2508 inserts a value of 0 to a position corresponding to a direct current (DC) subcarrier and a guard band. The zero insertion unit 2508 uses a zero padding matrix B. In other words, the zero insertion unit 2508 maps a value of 0 to a DC subcarrier and subcarriers in a guard band. In addition, the zero insertion unit 2608 may insert a value of 0 into a subcarrier to which a pilot, that is, a frequency domain signal of a UW, is to be mapped. In some cases, the zero insertion unit 2508 may be omitted.

The IDFT unit 2510 performs IDFT calculation for a signal that is output from the zero insertion unit 2508, the spreading unit 2510 or the permutation unit 2504. Accordingly, a frequency domain signal is transformed to a time domain signal. Herein, the time domain signal is an OFDM symbol including a zero UW. According to another embodiment, IDFT calculation may be replaced by IFFT calculation.

The pilot locating unit 2512 dispersively locates a pilot p, which is a frequency domain signal of a UW, to a position that the UW will occupy. The pilot locating unit 2512 uses a pilot locating matrix $L_p$. The pilot locating unit 2512 moves values included in the pilot p to positions of subcarriers which are configured to be occupied by a UW.

The IDFT unit 2514 performs IDFT calculation for a signal that is output from the pilot locating unit 2512. Accordingly, a frequency domain signal is transformed to a time domain signal. According to another embodiment, IDFT calculation may be replaced by IFFT calculation. The aggregation unit 2516 may aggregate a time domain data signal, which is output from the IDFT unit 2510, with a time domain UW signal that is output from the IDFT unit 2514. That is, the aggregation unit 2516 may generate a UW-OFDM symbol by aggregating a data signal (e.g., an OFDM symbol including a zero UW) with a UW signal in time domain.

The structure exemplified in FIG. 25 includes two IDFT units 2510 and 2514. However, according to another embodiment, a data frequency domain signal, which is output from the zero insertion unit 2508, the spreading unit 2510 or the permutation unit 2504, and a frequency domain signal output from the pilot locating unit 2512 may be input into one IDFT unit, and the one IDFT unit may perform IDFT calculation or IFFT calculation for a frequency domain signal of data and a frequency domain signal of a UW.

The above-described UW-OFDM signal of time domain may be mathematically expressed by Formula 1 below.

$$x = x' + x_u \quad \text{[Formula 1]}$$

In Formula 1, x is a UW-OFDM signal of time domain and means a matrix with a size of N1. x' is an OFDM symbol of time domain without UW and means a matrix of a size of N1. $x_u$ is a unique word (UW) and means a matrix with a size of N1. N means a symbol duration and an IDFT size.

The symbol duration N of an OFDM symbol for performing UW-based channel estimation may be mathematically expressed by Formula 2 below.

$$N = N_d + N_r + N_p + N_z \quad \text{[Formula 2]}$$

In Formula 2, N means a symbol duration and an IDFT size. $N_d$ means the number of data subcarriers in frequency domain. $N_r$ means the number of redundant subcarriers. $N_p$ means the number of pilot subcarriers. $N_z$ means the number of zero subcarriers.

Meanwhile, $N_u$ means the length of a guard interval. Since a time domain signal of a UW is always configured deterministically in the interval, the length of a zero UW within x' may also be expressed as $N_u$. Accordingly, $N_u$ may have a same length as $N_r$.

The symbol duration N of an OFDM symbol for performing interpolation-based channel estimation may be mathematically expressed by Formula 3 below.

$$N = N_d + N_r + N_z \quad \text{[Formula 3]}$$

In Formula 3, N means a symbol duration and an IDFT size. $N_d$ means the number of data subcarriers in frequency domain. $N_r$ means the number of redundant subcarriers. $N_z$ means the number of zero subcarriers. In the case of an OFDM symbol for performing interpolation-based channel estimation, a data symbol may be transmitted in a subcarrier where a pilot is transmitted.

An OFDM symbol of time domain not including the above-described UW may be mathematically expressed by Formula 4 below.

$$x' = F_N^{-1} BAP_d \begin{bmatrix} I \\ T \end{bmatrix} \tilde{d} = F_N^{-1} BAP_d \begin{bmatrix} d \\ \tilde{r} \end{bmatrix} = F_N^{-1} BG\tilde{d} = \begin{bmatrix} x_d \\ 0_{N_u \times 1} \end{bmatrix} \quad \text{[Formula 4]}$$

In Formula 4, x' is an OFDM symbol of time domain without UW and means a matrix with a size of N1. $F_N^{-1}$ is an N-point inverse discrete fourier transform (IDFT) matrix, meaning an N×N size matrix with each element of $$[F_N^{-1}]_{kl} = \frac{1}{N} e^{j\frac{2\pi}{N}kl}.$$

B is a zero padding matrix, meaning an N×($N_d$+$N_r$) size matrix with each element of 0 or 1. A is a spreading matrix, meaning a ($N_d$+$N_r$)×($N_d$+$N_r$) size matrix. $P_d$ is a permutation matrix, meaning a ($N_d$+$N_r$)×($N_d$+$N_r$) size matrix with each element of 0 or 1. I means a unit matrix. T is a redundant generation matrix, meaning a matrix with $N_r$×$N_d$ size. $\tilde{d}$ represents data values of frequency domain included in an OFDM symbol and means a matrix with $N_d$×1 size. $\tilde{r}$ represents redundant subcarriers of frequency domain and means a matrix with $N_r$×1 size. $x_d$ represents payload data, meaning a matrix with (N−$N_u$)×1 size. $O_{N_u \times 1}$ means a zero (0) matrix with $N_u$×1 size.

A redundant subcarrier for forming a zero UW in a specific area as in Formula 4 may be expressed by Formula 5 below.

$$\begin{bmatrix} M_{11} & M_{12} \\ M_{21} & M_{22} \end{bmatrix} \begin{bmatrix} \tilde{d} \\ \tilde{r} \end{bmatrix} = \begin{bmatrix} x_d \\ 0 \end{bmatrix} \text{ with}$$ [Formula 5]

$$M = F_N^{-1} B A P_d = \begin{bmatrix} M_{11} & M_{12} \\ M_{21} & M_{22} \end{bmatrix}$$

$$M_{21}\tilde{d} + M_{22}\tilde{r} = 0$$

$$\tilde{r} = T\tilde{d} \text{ with } T = -M_{22}^{-1} M_{21} \in \mathbb{C}^{N_r \times N_d}$$

In Formula 5, $M_{mn}$ means a submatrix of the matrix M. $\tilde{d}$ means data values of frequency domain included in an OFDM symbol. $\tilde{r}$ means redundant subcarriers of frequency domain. $x_d$ means payload data. $F_N^{-1}$ is an N-point inverse discrete fourier transform (IDFT) matrix, meaning an N×N size matrix with each element of $$[F_N^{-1}]_{kl} = \frac{1}{N} e^{j\frac{2\pi}{N}kl}.$$

B means a zero padding matrix. A means a spreading matrix. $P_d$ is a permutation matrix, meaning a ($N_d$+$N_r$)×($N_d$+$N_r$) size matrix with each element of 0 or 1. T means a redundant generation matrix.

A UW signal may be expressed by Formula 6 below.

$$x_u = F_N^{-1} L_p p$$ [Formula 6]

In Formula 6, $x_u$ is a unique word (UW) and means a matrix with a size of N1. $F_N^{-1}$ is an N-point inverse discrete fourier transform (IDFT) matrix, meaning an N×N size matrix with each element of $$[F_N^{-1}]_{kl} = \frac{1}{N} e^{j\frac{2\pi}{N}kl}.$$

$L_p$ is a pilot locating matrix, meaning a N×$N_p$ size matrix with each element of 0 or 1. P is a pilot, which is an UW in frequency domain, and means a matrix with $N_p$×1 size.

Figure 26:
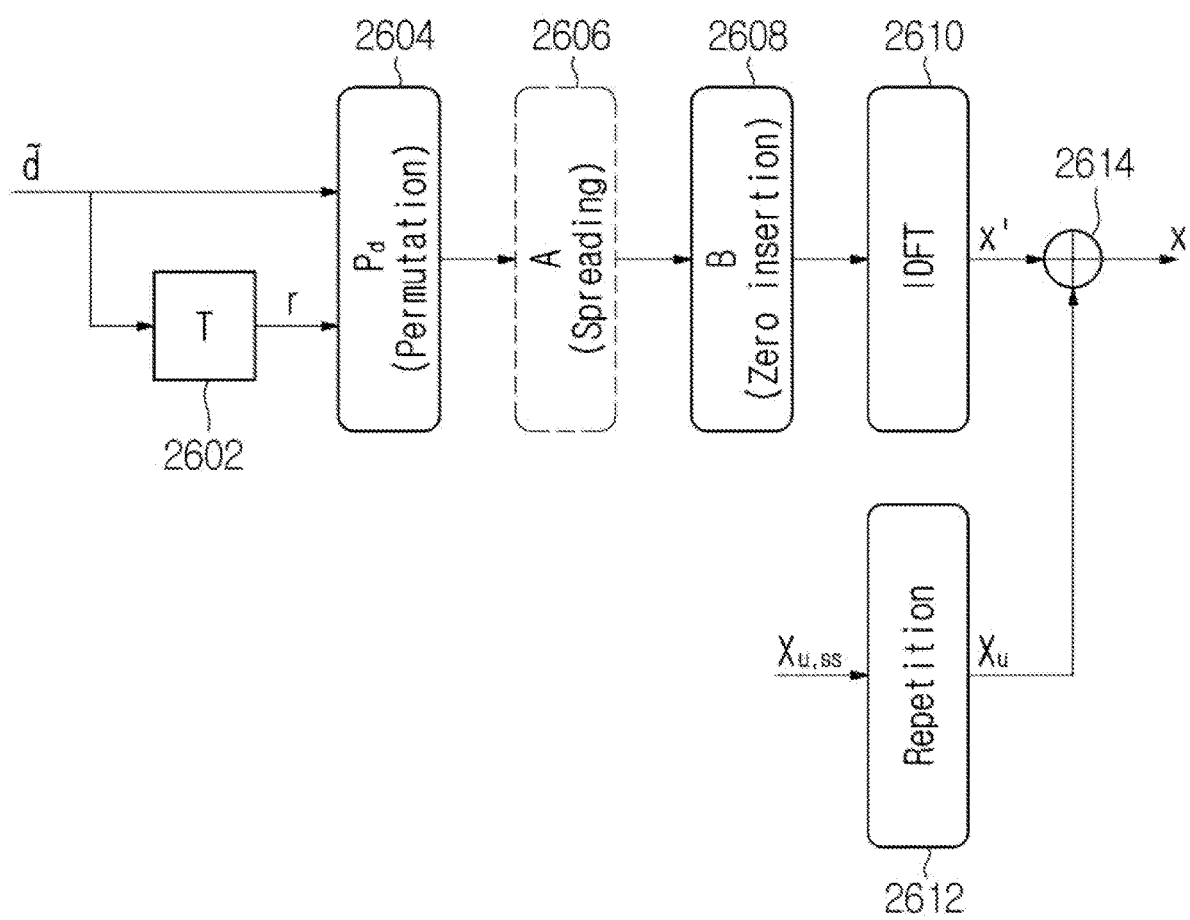
FIG. 26 is a view illustrating an example of a transmitter that transmits a UW-OFDM symbol applicable to the present disclosure.

FIG. 26 is a view illustrating an example of a transmitter that transmits a UW-OFDM symbol applicable to the present disclosure. Unlike FIG. 25 illustrating an embodiment of a scheme of generating a UW by means of a pilot of frequency domain, FIG. 26 illustrates an embodiment of a scheme of generating a UW in time domain. The components shown in FIG. 26 are functional blocks and may be physically implemented in one or more circuits.

Referring to FIG. 26, a transmitter includes a redundant generating unit 2602, a permutation unit 2604, a spreading unit 2606, a zero insertion unit 2608, an IDFT unit 2610, a repetition unit 2612, and an aggregation unit 2614.

The redundant generating unit 2602 adds redundant values to input data d. To this end, the redundant generating unit 2602 uses a redundant generation matrix T. The redundant generating unit 2602 may make a data symbol have 0 in a time domain-specific area after an IDFT or IFFT calculation.

The permutation unit 2604 permutes signals including redundant values and data values. Herein, a signal includes values of a frequency domain, and the permutation unit 2604 moves redundant values to a location of a redundant subcarrier.

The spreading unit 2606 spreads values of each subcarrier included in a signal that is output from the permutation unit 2604. To this end, the spreading unit 2606 uses a spreading matrix A. However, according to another embodiment, the spreading unit 2606 may be omitted. A structure, in which a transmitter including the spreading unit 2606 is used, may be referred to as a non-systematic coded UW-OFDM structure, and a structure, in which a transmitter not including the spreading unit 2606 is used, may be referred to as a systematic coded UW-OFDM structure.

A combination of a permutation matrix $P_d$ used for permutation, a redundant generation matrix T and a spreading matrix A may be referred to as a code generation matrix G.

The zero insertion unit 2608 inserts a value of 0 to a location corresponding to a direct current (DC) subcarrier and a guard band. The zero insertion unit 2608 uses a zero padding matrix B. In other words, the zero insertion unit 2608 maps a value of 0 to a DC subcarrier and subcarriers in a guard band. In addition, the zero insertion unit 2608 may insert a value of 0 into a subcarrier to which a pilot, that is, a frequency domain signal of a UW, is to be mapped. In some cases, the zero insertion unit 2608 may be omitted.

The IDFT unit 2610 performs IDFT calculation for a signal that is output from the zero insertion unit 2608, the spreading unit 2610 or the permutation unit 2604. Accordingly, a frequency domain signal is transformed to a time domain signal. Herein, the time domain signal is an OFDM symbol including a zero UW. According to another embodiment, IDFT calculation may be replaced by IFFT calculation.

The repetition unit 2612 generates a UW signal $x_u$ transmitted to an OFDM symbol interval by repeating a sub-symbol $x_{u,ss}$ N/$N_S$ times. Here, N means an OFDM symbol length. $N_S$ means a sub-symbol interval. A sub-symbol means a period of repeating an UW within an OFDM symbol. $x_{u,ss}$ is a UW of a sub-symbol, meaning a matrix with $N_S$×1 size. $x_u$ is a UW of an OFDM symbol, meaning a matrix with N×1 size. The UW signal $x_{u,ss}$ in a sub-symbol interval may be configured with a head part (N−$N_{GI}$) of zero (0) and a tail part $N_{GI}$ of a specific sequence.

The relationship between the above-described sub-symbol and a symbol may be mathematically expressed by Formula 7 below.

$$x_u = 1_{\frac{N}{N_S} \times 1} \otimes x_{u,SS}$$ [Formula 7]

In Formula 7, $x_{uss}$ is a UW of a sub-symbol, meaning a matrix with $N_S \times 1$ size. $x_u$ is a UW of an OFDM symbol, meaning a matrix with $N \times 1$ size. As a UW signal $x_{u,ss}$ of a sub-symbol interval is repeated $N/N_S$ times, a UW signal $x_u$ of a symbol interval is configured.

According to a structure as shown in FIG. 26, a transmitter makes a specific area of an OFDM symbol into 0 and then inserts and transmits a UW into the area. A redundant subcarrier may be used to generate a zero UW that makes a specific area into 0 in time domain. In order to generate a redundant subcarrier, an operation is performed to multiply a code generation matrix G, which is composed of a data permutation matrix $P_d$ and a redundant generation matrix T, with a data symbol. The code generation matrix G may further include a spreading matrix A. The data symbol may mean a modulation symbol that is mapped to a subcarrier in frequency domain.

Figure 27:
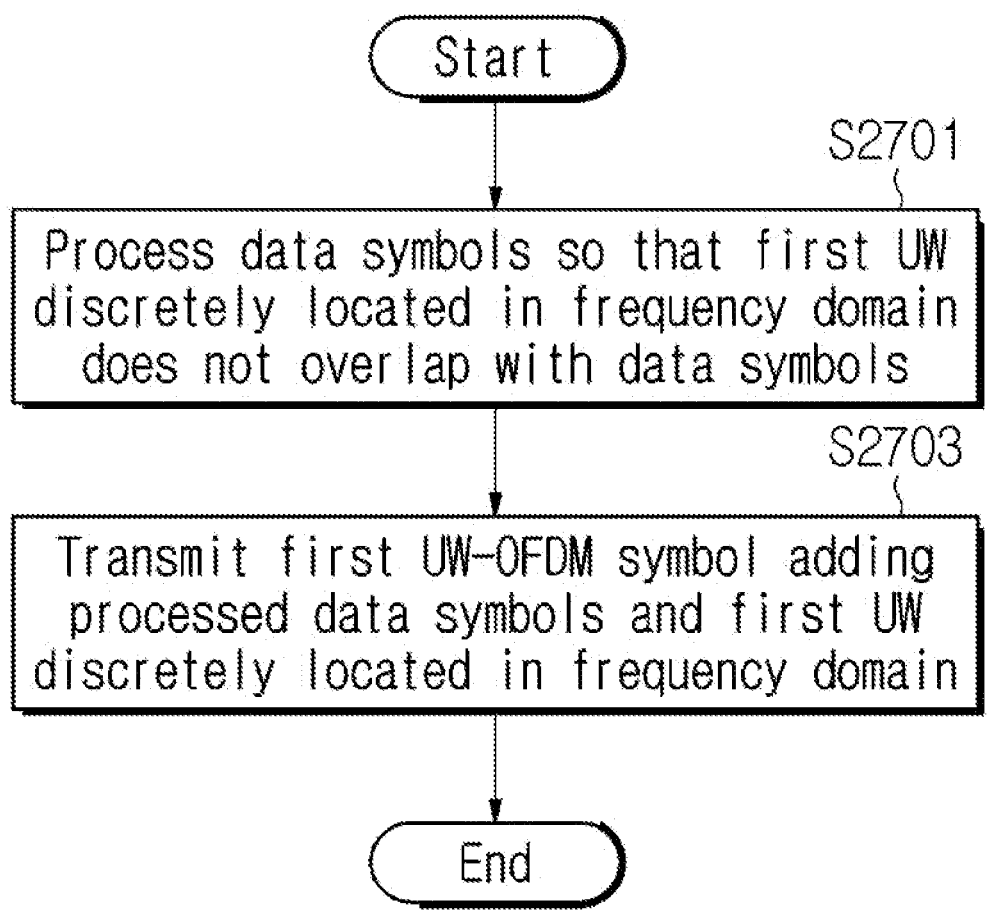
FIG. 27 is a view illustrating an embodiment of a procedure of transmitting a UW-OFDM symbol in a device applicable to the present disclosure.

FIG. 27 is a view illustrating an embodiment of a procedure of transmitting a UW-OFDM symbol in a device applicable to the present disclosure. FIG. 27 exemplifies a method of operating a device that transmits a UW-OFDM symbol. The operating subject of a procedure illustrated in FIG. 27 may be a base station or a terminal.

Referring to FIG. 27, at step S2701, the device processes data symbols so that a first UW discretely located in frequency domain does not overlap with a data symbol in frequency domain. For channel estimation in frequency domain, a subcarrier in which a data symbol is transmitted should be distinguished, in frequency domain, from a subcarrier in which a UW is transmitted. In other words, in frequency domain, a subcarrier of data and a subcarrier of a UW should not overlap with each other. Accordingly, the device processes a UW to be transmitted in a specific subcarrier dedicated to it in frequency domain and processes a data symbol not to be transmitted in the subcarrier used by the UW. The device may prevent the overlap of subcarrier between data and a UW by inserting zero into a subcarrier for transmitting a pilot that is a frequency domain signal of the UW.

At step S2703, the device transmits a first UW-OFDM symbol adding the data symbols and the first UW discretely located in frequency domain, which are processed not to overlap. The device transmits a UW-OFDM symbol that is generated according to a setting. According to an embodiment, the device may locate a UW discretely in frequency domain by locating a pilot in a position that is configured to be occupied by the UW. According to another embodiment, the device may locate a UW discretely in frequency domain by repeating a time-domain UW in a same position of sub-symbols which is defined to have an integer ratio, in a time domain, between an OFDM symbol length and a sub-symbol length.

Figure 28:
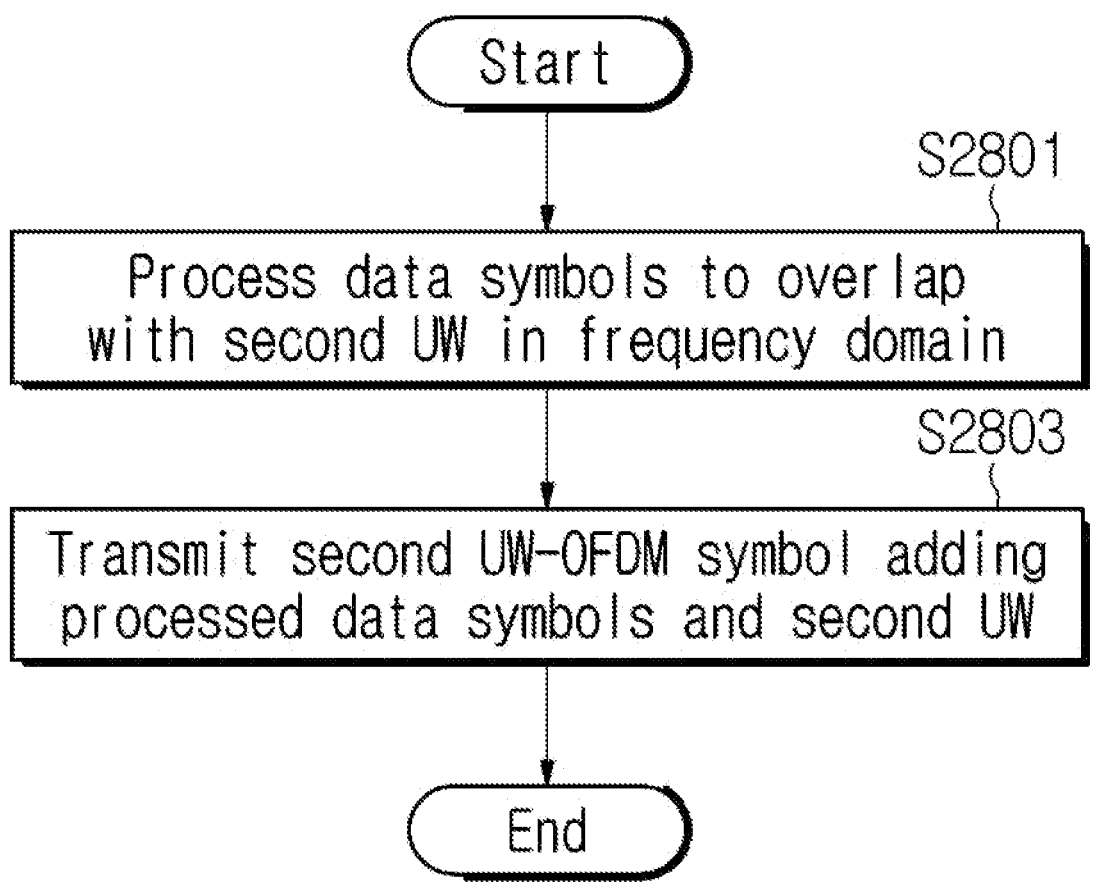
FIG. 28 is a view illustrating an embodiment of a procedure of transmitting a UW-OFDM symbol applicable to the present disclosure.

FIG. 28 is a view illustrating an embodiment of a procedure of transmitting a UW-OFDM symbol applicable to the present disclosure. FIG. 28 exemplifies a method of operating a device that transmits a UW-OFDM symbol. The operating subject of a procedure illustrated in FIG. 28 may be a base station or a terminal.

Referring to FIG. 28, at step S2801, the device processes data symbols to overlap with a second UW in frequency domain. For an OFDM symbol in which a UW is not dedicated to a specific subcarrier, channel estimation may be performed through interpolation based on a first UW-OFDM symbol in which channel estimation is directly performed. Accordingly, unlike the first UW-OFDM symbol at step S2701, a second UW-OFDM symbol needs not be processed so as to prevent data and a subcarrier of a UW from overlapping in frequency domain. Thus, when a data symbol is transmitted in a subcarrier where a UW is transmitted, the number of data symbols, which can be transmitted in an OFDM symbol, may increase.

At step S2803, the device transmits the second UW-OFDM symbol adding the second UW and data symbols that are processed to overlap with the second UW. The device transmits a UW-OFDM symbol that is generated according to a setting. According to an embodiment, the device may locate a UW discretely in frequency domain by locating a pilot in a position that is configured to be occupied by the UW. According to another embodiment, the device may locate a UW discretely in frequency domain by repeating a time-domain UW in a same position of sub-symbols which is defined to have an integer ratio, in a time domain, between an OFDM symbol length and a sub-symbol length.

Figure 29:
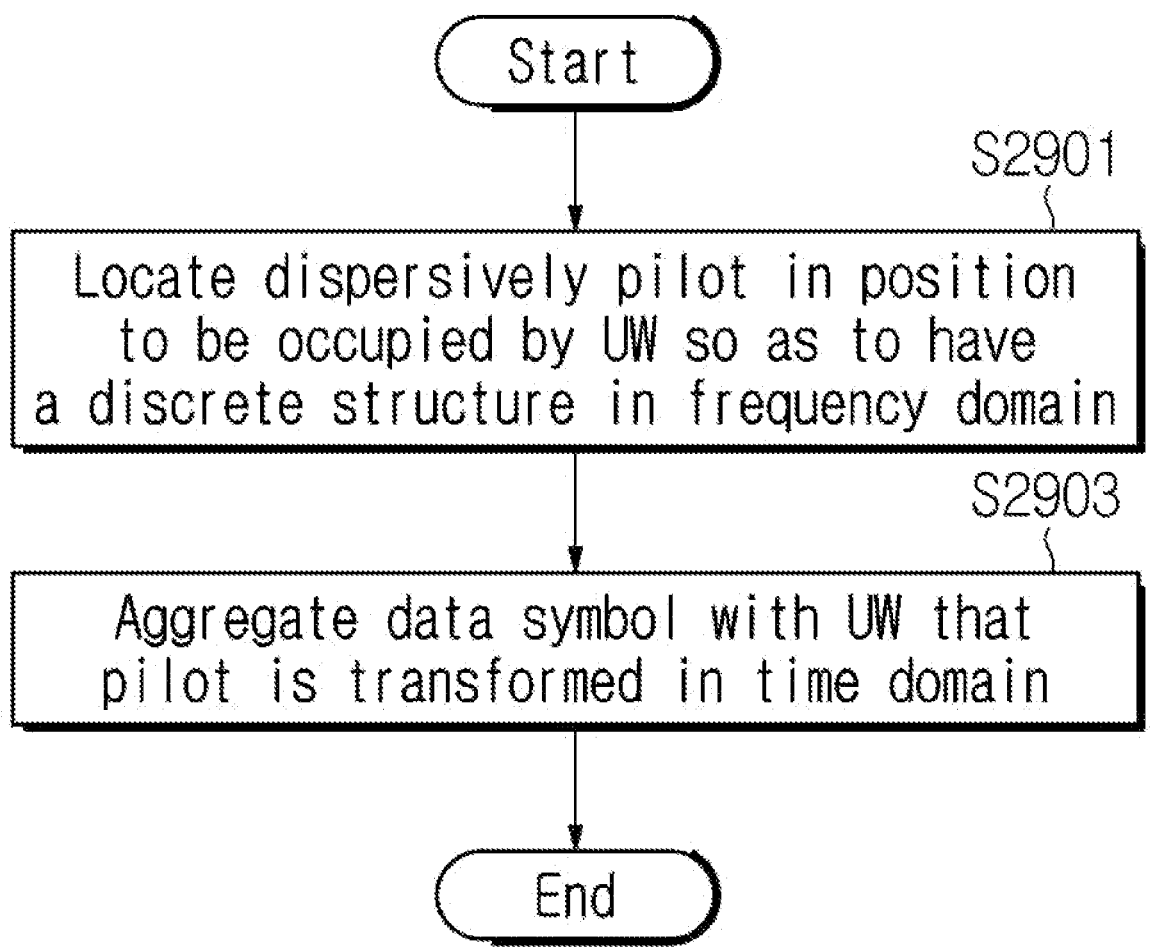
FIG. 29 is a view illustrating an embodiment of a procedure of processing a pilot in a device applicable to the present disclosure.

FIG. 29 is a view illustrating an embodiment of a procedure of processing a pilot in a device applicable to the present disclosure. FIG. 29 exemplifies a method of operating a device that transmits a UW-OFDM symbol. The operating subject of a procedure illustrated in FIG. 29 may be a base station or a terminal. The procedure illustrated in FIG. 29 may be an embodiment of processing a pilot at step S2703 of transmitting a first UW-OFDM symbol adding processed data symbols and a first UW discretely located in frequency domain and at step S2803 of transmitting a second UW-OFDM symbol adding processed data symbols and a second UW.

Referring to FIG. 29, at step S2901, the device dispersively locates a pilot in a position to be occupied by a UW so that it can have a discrete structure in frequency domain. A pilot, which is a frequency-domain signal of a UW, may be located not in all subcarriers but be located discretely in subcarriers at a predetermined interval.

At step S2903, the device aggregates a UW, which is transformed from the pilot in time domain, with a data symbol. According to an embodiment, after performing IDFT on a pilot dispersively located in a position to be occupied by a UW and thus transforming the pilot into a time-domain UW signal, the device may transmit a first UW-OFDM symbol by adding a subcarrier, in which the UW is transmitted, and a data signal that is processed not to be occupied by data. According to another embodiment, after performing IDFT on a pilot dispersively located in a position to be occupied by a UW and thus transforming the pilot into a time-domain UW signal, the device may transmit a second UW-OFDM symbol by adding a data signal, which is processed to be transmitted also in a subcarrier where the UW is transmitted, and the UW.

The device may transform a pilot, which is dispersively located in a position to be occupied by a UW, into a time-domain UW signal through IDFT or IFFT calculation. The device may transmit a UW-OFDM symbol that is generated by aggregating, in time domain, a data signal and a UW on which IDFT is performed.

Figure 30:
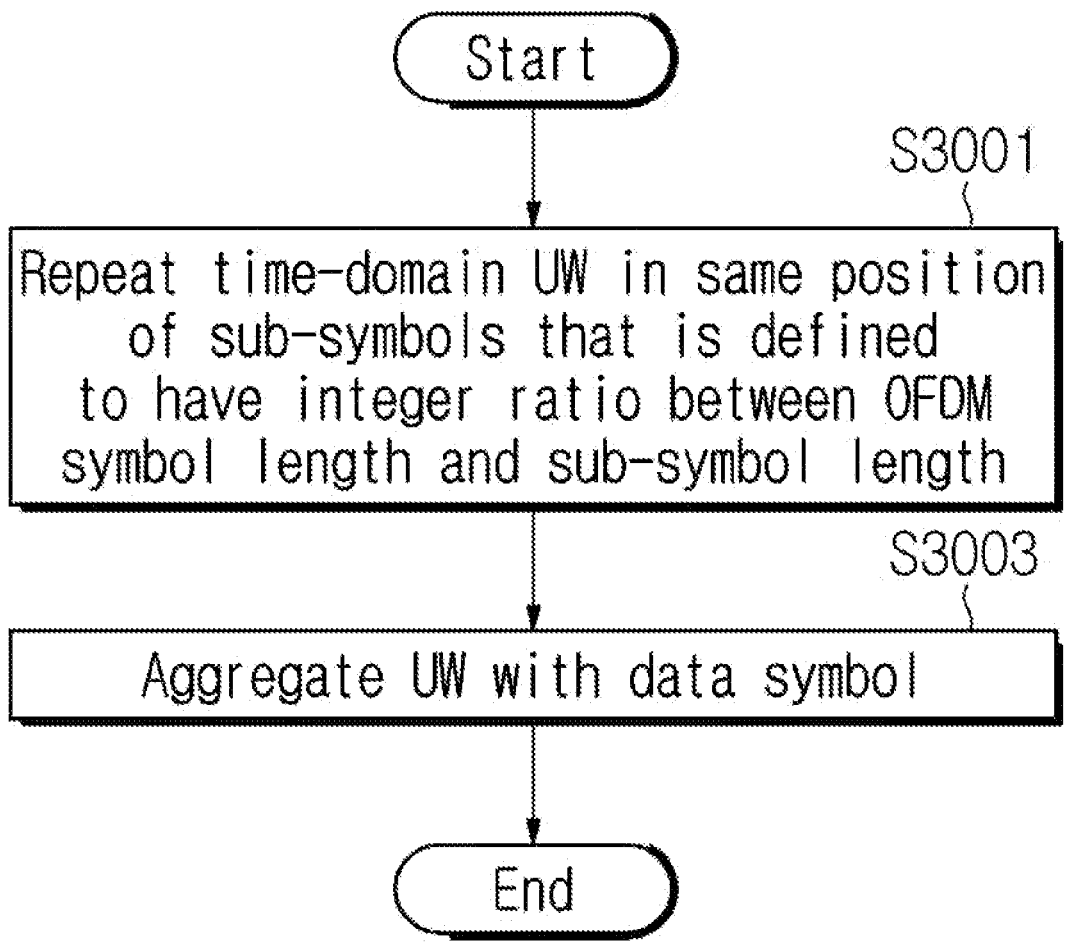
FIG. 30 is a view illustrating an embodiment of a procedure of processing a UW in a device applicable to the present disclosure.

FIG. 30 is a view illustrating an embodiment of a procedure of processing a UW in a device applicable to the present disclosure. FIG. 30 exemplifies a method of operating a device that transmits a UW-OFDM symbol. The operating subject of a procedure illustrated in FIG. 30 may be a base station or a terminal. The procedure illustrated in FIG. 30 may be an embodiment of processing a pilot at step S2703 of transmitting a first UW-OFDM symbol adding processed data symbols and a first UW discretely located in frequency domain and at step S2803 of transmitting a second UW-OFDM symbol adding processed data symbols and a second UW.

Referring to FIG. 30, at step S3001, the device repeats a time-domain UW in a same position of sub-symbols which is defined to have an integer ratio between an OFDM symbol length and a sub-symbol length. In case $N/N_S$, which is a ratio between an OFDM symbol length N and a length $N_S$ of a sub-symbol as a repetition interval of a UW, has an integer value, the UW exists in each subcarrier index of an interval of $N/N_S$ in frequency domain. Accordingly, channel estimation in frequency domain is possible.

When a UW is periodically transmitted in a same position of sub-symbols which is defined to have an integer ratio between an OFDM symbol length and a sub-symbol length, since the UW is located in a specific interval without occupying the entire OFDM symbol in time domain, the signal to noise ratio (SNR) of a UW signal may be improved with respect to time domain. In addition, a degree of change of phase noise changing within an OFDM symbol interval may be estimated by using a UW.

At step S3003, the device aggregates a UW with a data symbol. Since the UW is generated in time domain, unlike step S2903, IDFT is not needed to transform the UW to time domain, and the UW may be aggregated with the data symbol after repeating a time-domain UW in a same position of sub-symbols which is defined to have an integer ratio between an OFDM symbol length and a sub-symbol length (S3001).

Figure 31:
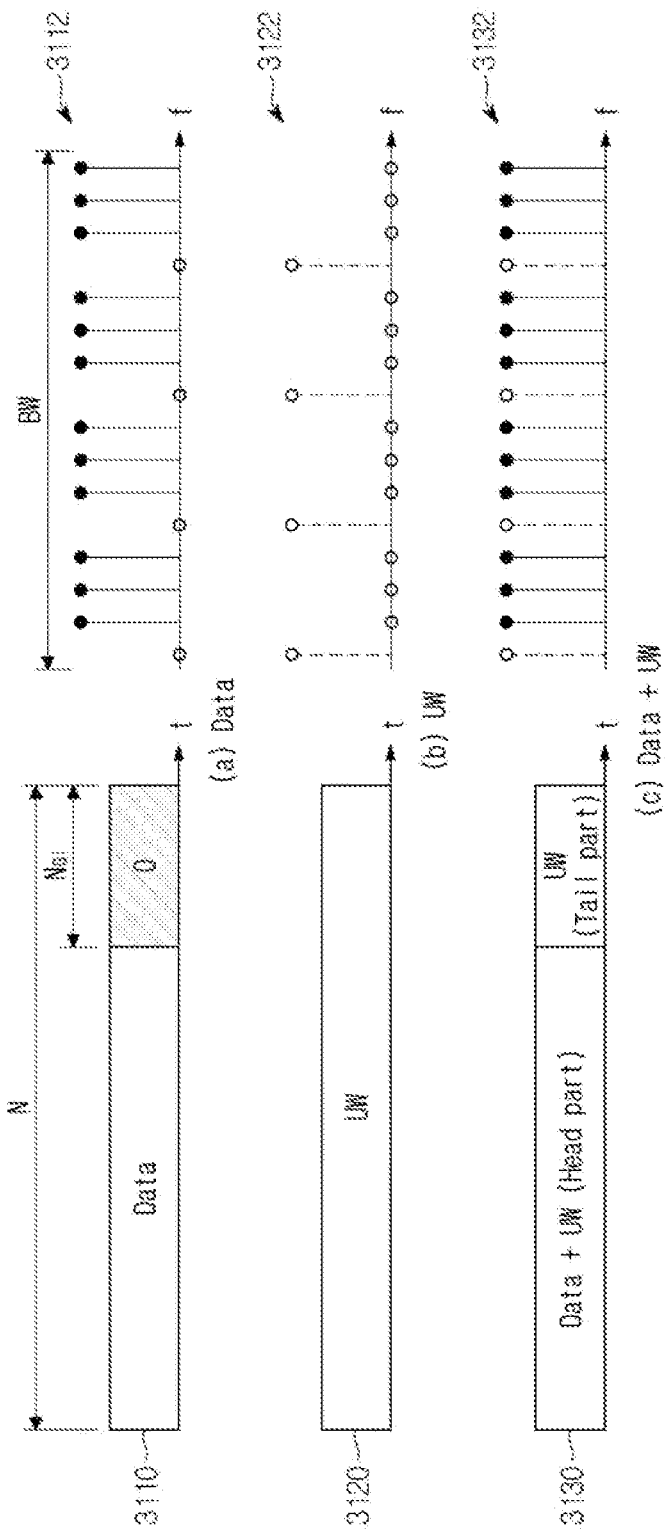
FIG. 31 is a view illustrating an embodiment of a UW-OFDM symbol structure that is applicable to the present disclosure.

FIG. 31 is a view illustrating an embodiment of a UW-OFDM symbol structure that is applicable to the present disclosure. FIG. 31 illustrates an OFDM symbol 3110 in time domain, an OFDM symbol 3112 in frequency domain, a UW 3120 in time domain, and a UW 3122 in frequency domain. In addition, FIG. 31 illustrates a UW-OFDM symbol 3130 in time domain and a UW-OFDM symbol 3132 in frequency domain.

Referring to (a) of FIG. 31, the OFDM symbol 3110 in time domain includes data and a guard interval of length $N_{GI}$. The guard interval of the OFDM symbol 3110 in time domain is set to zero. The OFDM symbol 3112 in frequency domain occupies a subcarrier that does not overlap with a subcarrier of the UW 3122 in frequency domain.

Referring to (b) of FIG. 31, the UW 3120 in time domain exists throughout the entire OFDM symbol interval. The UW 3122 in frequency domain is located discretely in frequency domain. The UW 3122 in frequency domain may have a periodical structure. (b) of FIG. 31 exemplifies a case of locating frequency domain components of a UW at 4 subcarrier intervals. However, the interval of frequency domain components of a UW may be different. However, the interval of frequency domain components of a UW is dependent on an interval of subcarriers that are not occupied by a data symbol.

Referring to (c) of FIG. 31, a UW-OFDM symbol 3130 in time domain includes a tail part that has a deterministic sequence. In the case of a UW-OFDM symbol 3132 in frequency domain, a UW uses a specific dedicated subcarrier in frequency domain, and data does not occupy any subcarrier occupied by the UW. Accordingly, channel estimation may be performed in a wireless communication system by transmitting a UW-OFDM symbol of FIG. 31.

Figure 32:
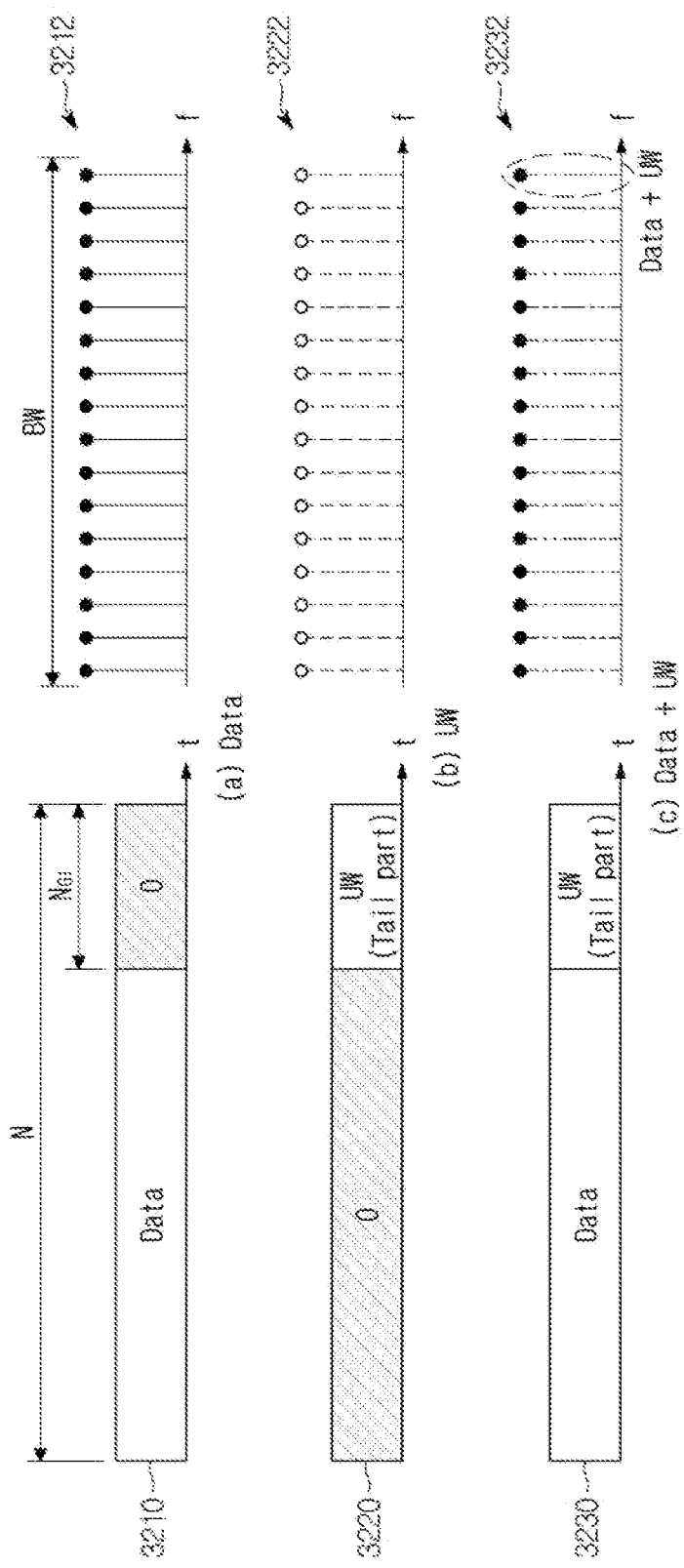
FIG. 32 is a view illustrating an embodiment of a UW-OFDM symbol structure that is applicable to the present disclosure.

FIG. 32 is a view illustrating an embodiment of a UW-OFDM symbol structure that is applicable to the present disclosure. FIG. 32 illustrates an OFDM symbol 3210 in time domain, an OFDM symbol 3212 in frequency domain, a UW 3220 in time domain, and a UW 3222 in frequency domain. In addition, FIG. 32 illustrates a UW-OFDM symbol 3230 in time domain and a UW-OFDM symbol 3232 in frequency domain.

Referring to (a) of FIG. 32, the OFDM symbol 3210 in time domain includes data and a guard interval of length $N_{GI}$. The guard interval of the OFDM symbol 3210 in time domain is set to zero. The OFDM symbol 3212 in frequency domain is transmitted through every subcarrier. Accordingly, a subcarrier, in which a UW is transmitted, may also transmit data, and the number of data symbols, which can be transmitted in the OFDM symbol, may increase.

Referring to (b) of FIG. 32, the UW 3220 in time domain occupies only a predetermined interval of an OFDM symbol. The UW 3222 in frequency domain may be transmitted through every subcarrier.

Referring to (c) of FIG. 32, a UW-OFDM symbol 3230 in time domain includes a tail part that has a deterministic sequence. A UW included in the UW-OFDM symbol 3230 in time domain gives no distortion to a data part. However, since the OFDM symbol 3212 in frequency domain and the UW 3222 in frequency domain are transmitted respectively through every subcarrier, the UW-OFDM symbol 3232 in frequency domain has an overlap between data and the UW in every subcarrier. Accordingly, as the UW-OFDM symbol of FIG. 32 includes no UW that uses a specific dedicated subcarrier, it may be processed based on channel information that is estimated through interpolation based on another UW-OFDM symbol for which direct channel estimation is performed.

Figure 33:
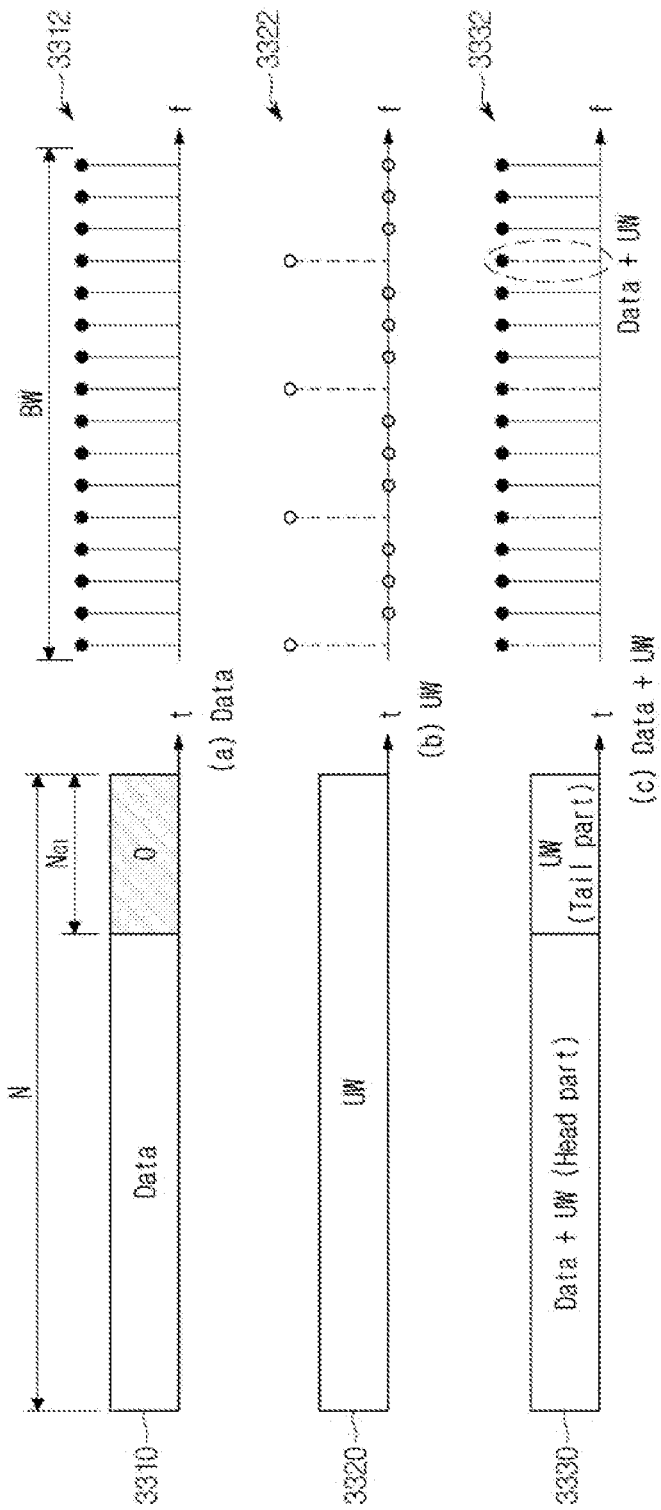
FIG. 33 is a view illustrating an embodiment of a UW-OFDM symbol structure that is applicable to the present disclosure.

FIG. 33 is a view illustrating an embodiment of a UW-OFDM symbol structure that is applicable to the present disclosure. FIG. 33 illustrates an OFDM symbol 3310 in time domain, an OFDM symbol 3312 in frequency domain, a UW 3320 in time domain, and a UW 3322 in frequency domain. In addition, FIG. 33 illustrates a UW-OFDM symbol 3330 in time domain and a UW-OFDM symbol 3332 in frequency domain.

Referring to (a) of FIG. 33, the OFDM symbol 3310 in time domain includes data and a guard interval of length $N_{GI}$. The guard interval of the OFDM symbol 3310 in time domain is set to zero. The OFDM symbol 3312 in frequency domain is transmitted through every subcarrier. Accordingly, a subcarrier, in which a UW is transmitted, may also transmit data, and the number of data symbols, which can be transmitted in the OFDM symbol, may increase.

Referring to (b) of FIG. 33, the UW 3320 in time domain occupies every interval of an OFDM symbol. The UW 3322 in frequency domain is located discretely in frequency domain. In addition, the UW 3322 in frequency domain may have a periodical structure.

Referring to (c) of FIG. 33, a UW-OFDM symbol 3330 in time domain includes a tail part that has a deterministic sequence. Since the data symbol 3312 in frequency domain is transmitted through every subcarrier and the UW 3322 in frequency domain is transmitted through a subcarrier that is discretely located, the UW-OFDM symbol 3332 in frequency domain has an overlap between data and UW in a subcarrier where the UW 3322 in frequency domain is transmitted. Accordingly, since the UW-OFDM symbol of FIG. 33 has no UW that uses a specific dedicated subcarrier, a channel may be estimated through interpolation based on a UW-OFDM symbol for which direct channel estimation is performed.

Figure 34:
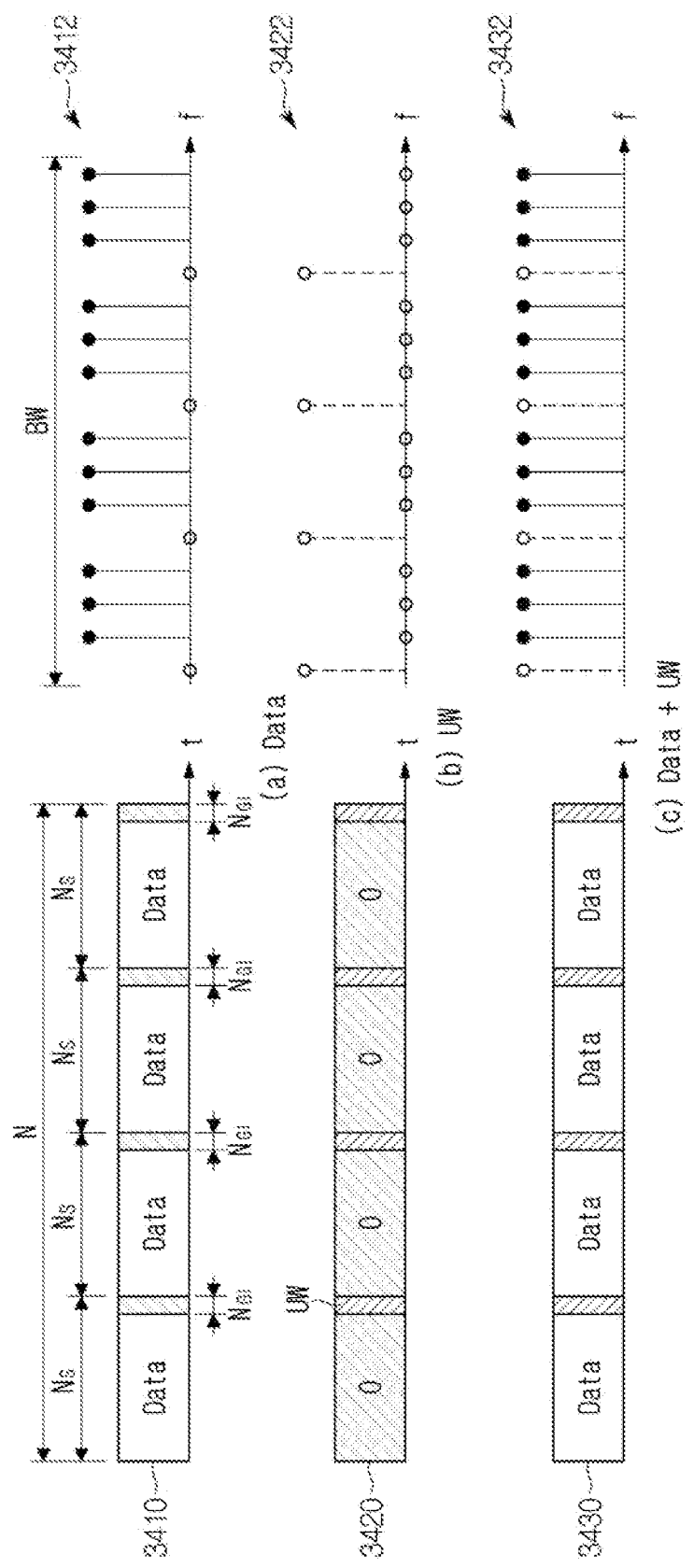
FIG. 34 is a view illustrating an embodiment of a UW-OFDM symbol structure that is applicable to the present disclosure.

FIG. 34 is a view illustrating an embodiment of a UW-OFDM symbol structure that is applicable to the present disclosure. FIG. 34 illustrates an OFDM symbol 3410 in time domain, an OFDM symbol 3412 in frequency domain, a UW 3420 in time domain, and a UW 3422 in frequency domain. In addition, FIG. 34 illustrates a UW-OFDM symbol 3430 in time domain and a UW-OFDM symbol 3432 in frequency domain.

Referring to (a) of FIG. 34, the OFDM symbol 3410 in time domain includes data and a guard interval of length $N_{GI}$. The guard interval of the OFDM symbol 3410 in time domain is set to zero. The guard interval $N_{GI}$ exists in every sub-symbol period $N_S$ within an OFDM symbol interval N. Data is transmitted in intervals excluding the guard interval. The OFDM symbol 3412 in frequency domain occupies a subcarrier that does not overlap with a subcarrier of the UW 3422 in frequency domain.

Referring to (b) of FIG. 34, a UW 3420 in time domain has a same length as $N_{GI}$ in every sub-symbol period $N_S$. Due to the characteristic of discrete Fourier transform (DFT), a repeated signal in time domain may exist as a signal in every subcarrier at a specific period in frequency domain. Accordingly, in case a ratio $N/N_S$ between the OFDM symbol length N and the sub-symbol length $N_S$ that is a period of the repeated UW 3420 in time domain has an integer value, the UW 3422 in frequency domain may also exist in every subcarrier index at $N/N_S$ periods. The OFDM symbol 3412 in frequency domain is transmitted through a subcarrier so as not to overlap with a subcarrier of the UW 3422 in frequency domain.

Referring to (c) of FIG. 34, the UW-OFDM 3430 in a time domain repeats a time-domain UW in a same position of sub-symbols which is defined to have an integer ratio between an OFDM symbol length and a sub-symbol length. In addition, data is transmitted in an interval where no UW is transmitted. When a UW is periodically transmitted in a same position of sub-symbols which is defined to have an integer ratio between an OFDM symbol length and a sub-symbol length, since the UW is located in a specific interval without occupying the entire OFDM symbol in time domain, the signal to noise ratio (SNR) of a UW signal may be improved with respect to time domain. In the case of a UW-OFDM symbol 3432 in frequency domain, a UW uses a specific dedicated subcarrier in frequency domain, and data does not occupy any subcarrier occupied by the UW. Accordingly, channel estimation may be performed in a wireless communication system by transmitting a UW-OFDM symbol of FIG. 34.

Figure 35:
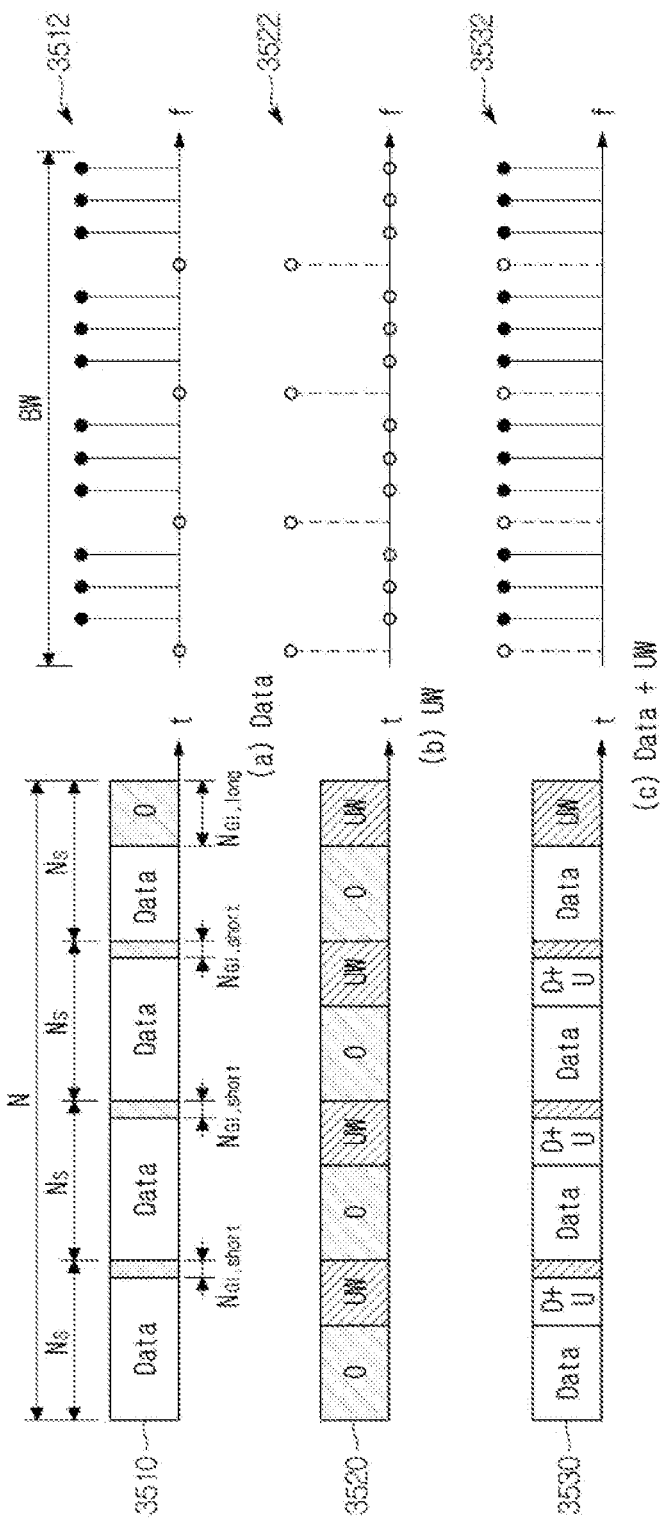
FIG. 35 is a view illustrating an embodiment of a UW-OFDM symbol structure that is applicable to the present disclosure.

FIG. 35 is a view illustrating an embodiment of a UW-OFDM symbol structure that is applicable to the present disclosure. FIG. 35 illustrates an OFDM symbol 3510 in time domain, an OFDM symbol 3512 in frequency domain, a UW 3520 in time domain, and a UW 3522 in frequency domain. In addition, FIG. 35 illustrates a UW-OFDM symbol 3530 in time domain and a UW-OFDM symbol 3532 in frequency domain.

Referring to (a) of FIG. 35, the OFDM symbol 3510 in time domain includes data and a guard interval of length $N_{GI}$. The guard interval of the OFDM symbol 3510 in time domain is set to zero. The guard interval $N_{GI}$ exists in every sub-symbol period $N_S$ within an OFDM symbol interval N. Data is transmitted in intervals excluding the guard interval. In the OFDM symbol 3510 in time domain, a long guard interval $N_{GI,long}$ is located in a boundary part, and a short guard interval $N_{GI,short}$ is located in a middle part. A long guard interval is intended to prevent ISI in a symbol boundary part, and a short guard interval is intended to reduce overhead caused by UW transmission. In order to prevent ISI, a long guard interval may be configured to be longer than a channel impulse response (CIR). The OFDM symbol 3512 in frequency domain occupies a subcarrier that does not overlap with a subcarrier of the UW 3522 in frequency domain.

Referring to (b) of FIG. 35, a UW 3520 in time domain has a same length as a long guard interval $N_{GI,long}$. That is, a device may generate the UW 3520 in time domain by locating a UW based on $N_{GI,long}$ selected between $N_{GI,short}$ and $N_{GI,long}$ and by inserting zero in the remaining intervals. Due to the characteristic of discrete Fourier transform (DFT), a repeated signal in time domain may be configured into a form of signal with a specific period in frequency domain. Accordingly, in case a ratio $N/N_S$ between the OFDM symbol interval N and the sub-symbol interval $N_S$ that is a period of the repeated UW 3520 in time domain has an integer value, the UW 3522 in frequency domain may also exist in every subcarrier index at $N/N_S$ periods.

Referring to (c) of FIG. 35, a UW-OFDM symbol 3530 in time domain may be configured to have a form of adding data and a UW for a specific part in time domain due to a length difference between $N_{GI,short}$ and $N_{GI,long}$. However, a part of transmitting data may be configured to be longer than an interval in which data and a UW are transmitted in a form of addition. In the case of a UW-OFDM symbol 3532 in frequency domain, a UW uses a specific dedicated subcarrier in frequency domain, and data does not occupy any subcarrier occupied by the UW. Accordingly, channel estimation may be performed in a wireless communication system by transmitting a UW-OFDM symbol of FIG. 35. In addition, when a UW is periodically transmitted in a same position of sub-symbols which is defined to have an integer ratio between an OFDM symbol length and a sub-symbol length, since the UW is located in a specific interval without occupying the entire OFDM symbol in time domain, the signal to noise ratio (SNR) of a UW signal may be improved with respect to time domain.

Figure 36:
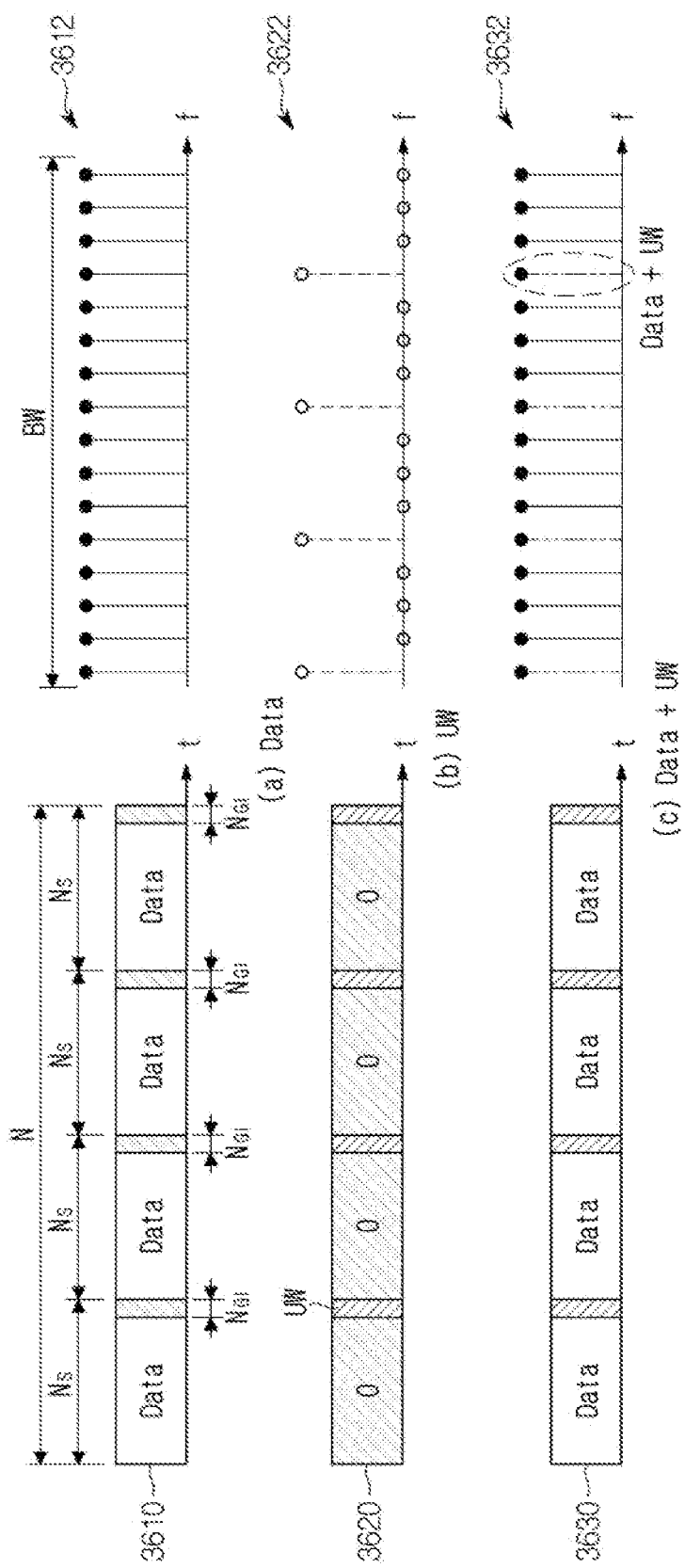
FIG. 36 is a view illustrating an embodiment of a UW-OFDM symbol structure that is applicable to the present disclosure.

FIG. 36 is a view illustrating an embodiment of a UW-OFDM symbol structure that is applicable to the present disclosure. FIG. 36 illustrates an OFDM symbol 3610 in time domain, an OFDM symbol 3612 in frequency domain, a UW 3620 in time domain, and a UW 3622 in frequency domain. In addition, FIG. 36 illustrates a UW-OFDM symbol 3630 in time domain and a UW-OFDM symbol 3632 in frequency domain.

Referring to (a) of FIG. 36, the OFDM symbol 3610 in time domain includes data and a guard interval of length $N_{GI}$. The guard interval of the OFDM symbol 3610 in time domain is set to zero. The guard interval $N_{GI}$ exists in every sub-symbol period Ns within an OFDM symbol interval N. Data is transmitted in intervals excluding the guard interval. A data symbol 3612 in frequency domain is transmitted through every subcarrier. Accordingly, a subcarrier, in which a UW is transmitted, may also transmit data, and the number of data symbols, which can be transmitted in an OFDM symbol, may increase.

Referring to (b) of FIG. 36, a UW 3620 in time domain has a same length as $N_{GI}$ in every sub-symbol period $N_S$. Due to the characteristic of discrete Fourier transform (DFT), a repeated signal in time domain may be configured into a form of signal with a specific period in frequency domain. Accordingly, in case a ratio $N/N_S$ between the OFDM symbol interval N and the sub-symbol interval Ns that is a period of the repeated UW 3620 in time domain has an integer value, the UW 3622 in frequency domain may also exist in every subcarrier index at $N/N_S$ periods.

Referring to (c) of FIG. 36, the UW-OFDM 3630 in time domain repeats a time-domain UW in a same position of sub-symbols which is defined to have an integer ratio between an OFDM symbol length and a sub-symbol length. In addition, data is transmitted in an interval where no UW is transmitted. When a UW is periodically transmitted in a same position of sub-symbols which is defined to have an integer ratio between an OFDM symbol length and a sub-symbol length, since the UW is located in a specific interval without occupying the entire OFDM symbol in time domain, the signal to noise ratio (SNR) of a UW signal may be improved with respect to time domain. Since the data symbol 3612 in frequency domain is transmitted through every subcarrier and the UW 3622 in frequency domain is transmitted through a subcarrier that is discretely located, the UW-OFDM symbol 3632 in frequency domain has an overlap between data and UW in a subcarrier where the UW 3622 in frequency domain is transmitted. Accordingly, since the UW-OFDM symbol of FIG. 36 includes no UW that uses a specific dedicated subcarrier, a channel may be estimated through interpolation based on another UW-OFDM symbol.

Figure 37:
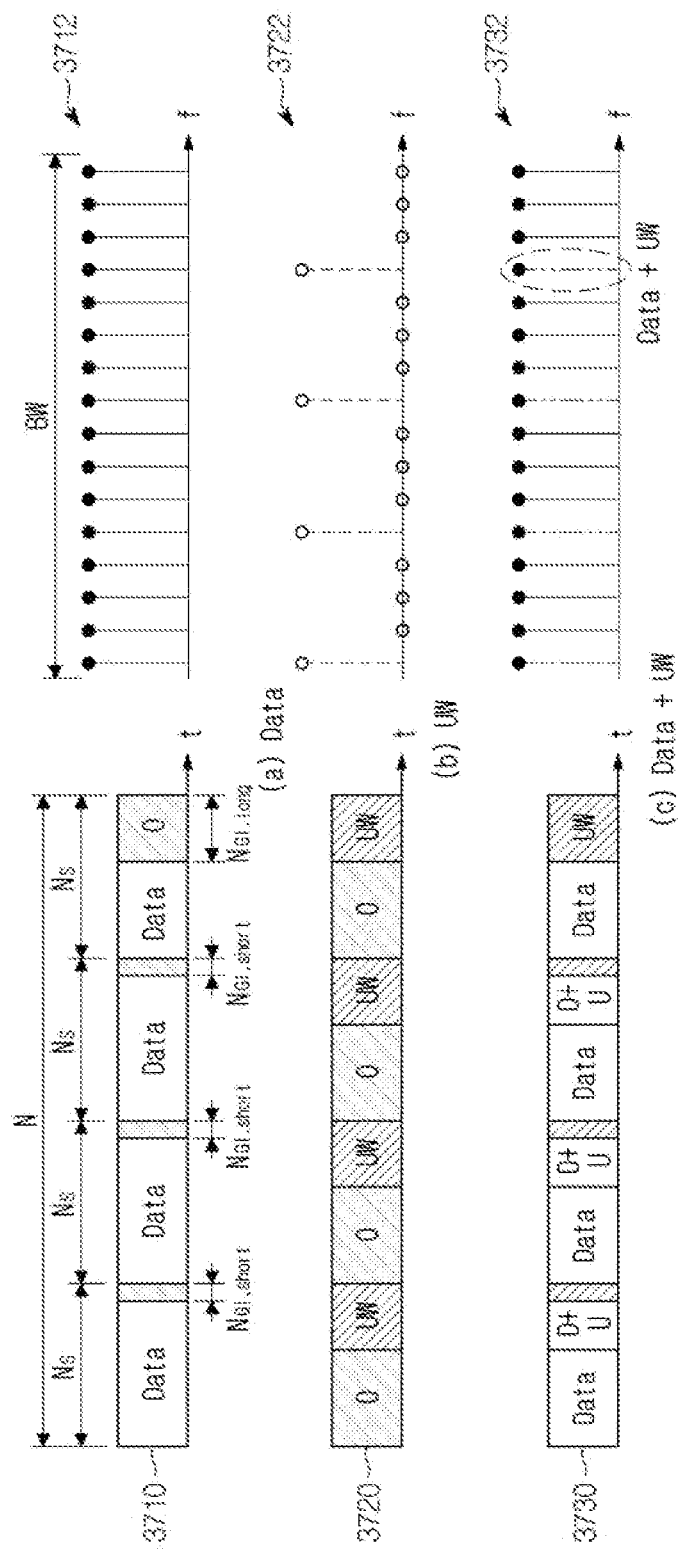
FIG. 37 is a view illustrating an embodiment of a UW-OFDM symbol structure that is applicable to the present disclosure.

FIG. 37 is a view illustrating an embodiment of a UW-OFDM symbol structure that is applicable to the present disclosure. FIG. 37 illustrates an OFDM symbol 3710 in time domain, an OFDM symbol 3712 in frequency domain, a UW 3720 in time domain, and a UW 3722 in frequency domain. In addition, FIG. 37 illustrates a UW-OFDM symbol 3730 in time domain and a UW-OFDM symbol 3732 in frequency domain.

Referring to (a) of FIG. 37, a data symbol 3710 in time domain includes data and a guard interval of length $N_{GI}$. The guard interval of the data symbol 3710 in time domain is set to zero. The guard interval $N_{GI}$ exists in every sub-symbol period $N_S$ within an OFDM symbol interval N. Data is transmitted in intervals excluding the guard interval. In the data symbol 3710 in time domain, a long guard interval $N_{GI,long}$ is located in a boundary part, and a short guard interval $N_{GI,short}$ is located in a middle part. A long guard interval is intended to prevent ISI in a symbol boundary part, and a short guard interval is intended to reduce overhead caused by UW transmission. In order to prevent ISI, a long guard interval may be configured to be longer than a channel impulse response (CIR). A data symbol 3712 in frequency domain is transmitted through every subcarrier. Accordingly, a subcarrier, in which a UW is transmitted, may also transmit data, and the number of data symbols, which can be transmitted in an OFDM symbol, may increase.

Referring to (b) of FIG. 37, a UW 3720 in time domain has a same length as a long guard interval $N_{GI,long}$. That is, the UW 3720 in time domain may be generated by locating a UW based on $N_{GI,long}$ selected between $N_{GI,short}$ and $N_{GI,long}$ and by inserting zero in the remaining intervals. Due to the characteristic of discrete Fourier transform (DFT), a repeated signal in time domain may be configured into a form of signal with a specific period in frequency domain. Accordingly, in case a ratio $N/N_S$ between the OFDM symbol interval N and the sub-symbol interval $N_S$ that is a period of the repeated UW 3720 in time domain has an integer value, the UW 3722 in frequency domain may also exist in every subcarrier index at $N/N_S$ periods.

Referring to (c) of FIG. 37, a UW-OFDM symbol 3730 in time domain may be configured to have a form of adding data and a UW for a specific part in time domain due to a length difference between $N_{GI,short}$ and $N_{GI,long}$. However, a part of transmitting data may be configured to be longer than an interval in which data and a UW are transmitted in a form of addition. Since the data symbol 3722 in frequency domain is transmitted through every subcarrier and the UW 3722 in frequency domain is transmitted through a subcarrier that is discretely located, the UW-OFDM symbol 3732 in frequency domain has an overlap between data and UW in a subcarrier where the UW 3722 in frequency domain is transmitted. Accordingly, since the UW-OFDM symbol of FIG. 37 includes no UW that uses a specific dedicated subcarrier, a channel may be estimated through interpolation based on another UW-OFDM symbol. In addition, when a UW is periodically transmitted in a same position of sub-symbols which is defined to have an integer ratio between an OFDM symbol length and a sub-symbol length, since the UW is located in a specific interval without occupying the entire OFDM symbol in time domain, the signal to noise ratio (SNR) of a UW signal may be improved with respect to time domain.

Figure 38:
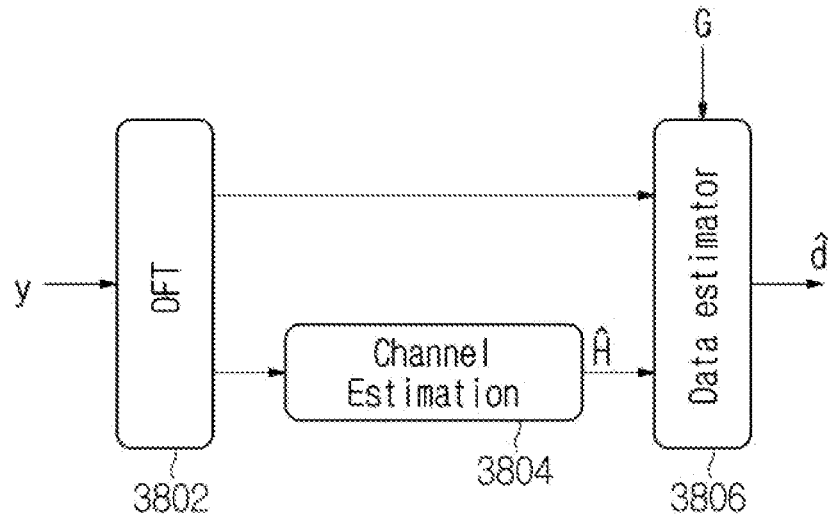
FIG. 38 is a view illustrating an example of a receiver that receives a UW-OFDM symbol applicable to the present disclosure.

FIG. 38 is a view illustrating an example of a receiver that receives a UW-OFDM symbol applicable to the present disclosure. The components shown in FIG. 38 are functional blocks and may be physically implemented in one or more circuits.

Referring to FIG. 38, a receiver includes a DFT unit 3802, a channel estimation unit 3804, and a data estimator 3806.

The DFT unit 3802 transforms a UW-OFDM symbol into a frequency-domain signal by performing DFT calculation on the UW-OFDM symbol included in a Rx signal y. According to another embodiment, DFT calculation may be replaced by FFT calculation.

The channel estimation unit 3804 may estimate a frequency-domain channel based on a pilot that is a frequency-domain signal of a UW. In frequency domain, a pilot may be located not in all subcarriers but be located discretely in subcarriers at a predetermined interval. The channel estimation unit 3804 may generate channel information through channel estimation based on a signal that the DFT unit 3802 transforms into frequency domain.

The data estimator 3806 may estimate data based on a signal, which the DFT unit 3802 transforms into frequency domain, and channel information that the channel estimation unit 3804 generates. Data estimation uses G used in Tx, and G is a code generation matrix meaning a combination of a permutation matrix $P_d$ and a redundant generation matrix T. G may further include a spreading matrix A. G may be determined by a receiver in advance or be adaptively modified. Linear data estimation may be performed, when a zero subcarrier including a pilot is excluded. According to an embodiment, equalizers like zero forcing (ZF) and minimum mean square error (MMSE) may be used.

The above-described UW-OFDM symbol, that is, a Rx signal passing through a radio channel, may be mathematically expressed by Formula 8 below.

In Formula 8, $y_r$ means a Rx signal that has passed through a radio channel.

$$y_r = H_c x + n = H_c F_N^{-1}(G\tilde{d} + L_p p) + n \quad \text{[Formula 8]}$$

$H_c$ means a cyclic convolution matrix, meaning a matrix with a size of N×N. The cyclic convolution matrix may include a zero-padding vector of a channel impulse response coefficient $h_c$. $h_c$ means a channel impulse response coefficient, meaning a matrix with a size of N×1. n means a gaussian noise vector, meaning a matrix with a size of N×1. x is a UW-OFDM signal of time domain and means a matrix with a size of N×1. $F_N^{-1}$ is an N-point inverse discrete fourier transform (IDFT) matrix, meaning an N×N size matrix with each element of $$[F_N^{-1}]_{kl} = \frac{1}{N} e^{j\frac{2\pi}{N}kl}.$$

d̃ represents data values of frequency domain included in an OFDM symbol and means a matrix with $N_d \times 1$ size. $L_p$ is a pilot locating matrix, meaning a $N \times N_p$ size matrix with each element of 0 or 1. P is a pilot, which is an UW in frequency domain, and means a matrix with $N_p 1$ size.

The above-described Rx signal, which has passed a radio channel, can be transformed into a signal in frequency domain as mathematically expressed in Formula 9 below.

$$\tilde{y} = B^T F_N y_r = B^T F_N H_c F_N^{-1} G\tilde{d} + B^T F_N n = \tilde{H} G\tilde{d} + \tilde{v} \quad \text{[Formula 9]}$$

In Formula 9, ỹ means a signal that is transformed into frequency domain. B is a zero padding matrix, meaning an $N \times (N_d + N_r)$ size matrix with each element of 0 or 1. FN is an N-point discrete fourier transform (DFT) matrix, meaning an $N \times N$ size matrix with each element of $$[F_N]_{kl} = e^{-j\frac{2\pi}{N}kl}.$$

$y_r$ means a Rx signal that has passed through a radio channel. H̃ means channel information that is known through channel estimation. ṽ means a gaussian noise vector that is transformed into frequency domain. d̃ represents data values of frequency domain included in an OFDM symbol and means a matrix with $N_d \times 1$ size.

Channel information and a gaussian noise vector, which is transformed into frequency domain, can be mathematically expressed by Formula 10 below.

$$\tilde{H} = B^T F_N H f_N^{-1}$$

$$\tilde{v} = B^T F_N n \quad \text{[Formula 10]}$$

In Formula 10, H̃ is channel information, meaning a matrix with a size of $(N_d+N_r) \times (N_d+N_r)$. $F_N$ is an N-point discrete fourier transform (DFT) matrix, meaning an $N \times N$ size matrix with each element of $$[F_N]_{kl} = e^{-j\frac{2\pi}{N}kl}.$$

B is a zero padding matrix, meaning an $N \times (N_d+N_r)$ size matrix with each element of 0 or 1. n means a gaussian noise vector, meaning a matrix with a size of $N \times 1$.

The above-described linear data estimation may be mathematically expressed by Formula 11 below.

$$\hat{\tilde{d}} = E\tilde{y} \quad \text{[Formula 11]}$$

Formula 11, d̂ means estimated data. E means an equalizer.

The above-described ZF equalizer and MMSE equalizer may be mathematically expressed by Formula 12 below.

$$E_{ZF} = \left(G^H \tilde{H}^H \tilde{H} G\right)^{-1} G^H \tilde{H}^H \quad \text{[Formula 12]}$$

$$E_{MMSE} = \left(G^H \tilde{H}^H \tilde{H} G + \frac{N\sigma_n^2}{\sigma_d^2}I\right)^{-1} G^H \tilde{H}^H$$

In Formula 12, $E_{ZF}$ means the ZF equalizer. $E_{MMSE}$ means the MMSE equalizer. $\tilde{H}^H$ means a hermitian matrix of H̃. $G^H$ means a hermitian matrix of G. G is a code generation matrix meaning a combination of a permutation matrix $P_d$ and a redundant generation matrix T. G may further include a spreading matrix A.

Figure 39:
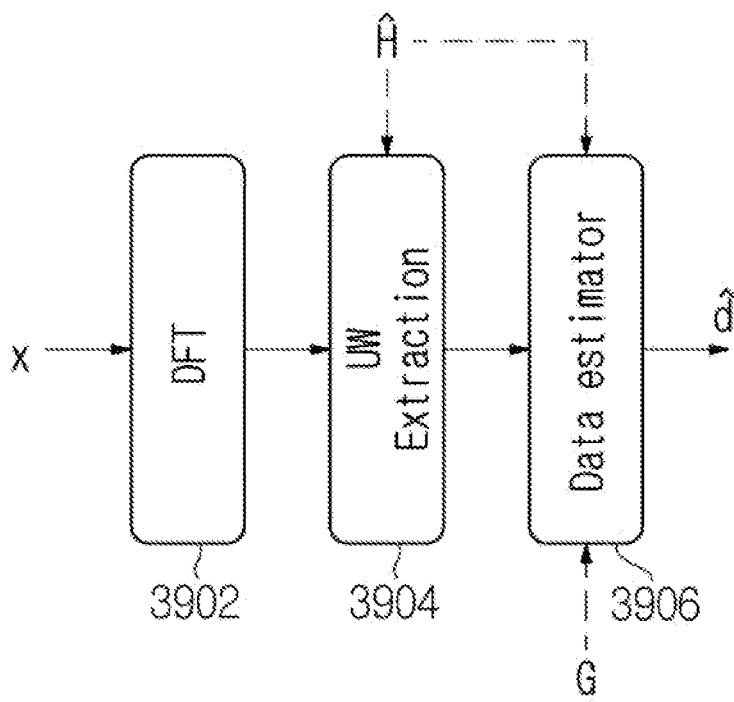
FIG. 39 is a view illustrating another example of a receiver that receives a UW-OFDM symbol applicable to the present disclosure.

FIG. 39 is a view illustrating another example of a receiver that receives a UW-OFDM symbol applicable to the present disclosure. The components shown in FIG. 39 are functional blocks and may be physically implemented in one or more circuits.

Referring to FIG. 39, a receiver includes a DFT unit 3902, a UW extraction unit 3904, and a data estimator 3906.

The DFT unit 3902 transforms a UW-OFDM symbol into a frequency-domain signal by performing DFT calculation on the UW-OFDM symbol. According to another embodiment, DFT calculation may be replaced by FFT calculation.

The UW extraction unit 3904 removes a UW of a signal, which the DFT unit 3902 transforms into frequency domain, from frequency domain. In case a UW does not use a specific dedicated subcarrier and is mixed with a data subcarrier, UW removal is needed. Unlike Formula 9 based on FIG. 38, since a UW is located by being mixed with a data subcarrier, even when a signal, which is transformed into frequency domain, is transpose calculated by a zero padding matrix, the component of a pilot signal is not removed. Accordingly, a separate process is needed to remove the UW from the frequency domain. This process needs channel information that is estimated in another OFDM symbol.

The data estimator 3906 may estimate data based on a signal, from which the UW extraction unit removes a UW, and channel information that is estimated in a previous OFDM symbol. Data estimation uses G used in Tx, and G is a code generation matrix meaning a combination of a permutation matrix $P_d$ and a redundant generation matrix T. G may further include a spreading matrix A. G may be determined by a receiver in advance or be adaptively modified. Linear data estimation may be performed, when a zero subcarrier including a pilot is excluded. According to an embodiment, the linear data estimation may use equalizers like zero forcing (ZF) and minimum mean square error (MMSE).

In case the above-described UW does not use a specific dedicated subcarrier and is mixed with a data subcarrier, a Rx signal transformed into frequency domain may be mathematically expressed by Formula 13.

$$\widetilde{y_d} = B^T F_N y_r = \quad \text{[Formula 13]}$$
$$B^T F_N H_c F_N^{-1}(G\tilde{d} + L_p p) + B^T F_N n = \tilde{H} G\tilde{d} + \tilde{H} L_p p + \tilde{v}$$

In Formula 13, $\widetilde{yd}$ means a Rx signal transformed into frequency domain when a UW does not use a specific dedicated subcarrier and is mixed with a data subcarrier. B is a zero padding matrix, meaning an $N \times (N_d+N_r)$ size matrix with each element of 0 or 1. $F_N$ is an N-point discrete fourier transform (DFT) matrix, meaning an $N \times N$ size matrix with each element of $$[F_N]_{kl} = e^{-j\frac{2\pi}{N}kl}.$$

$H_c$ means a cyclic convolution matrix, meaning a matrix with a size of $N \times N$. $F_N^{-1}$ is an N-point inverse discrete fourier transform (IDFT) matrix, meaning an N×N size matrix with each element of $$[F_N^{-1}]_{kl} = \frac{1}{N} e^{j\frac{2\pi}{N}kl}.$$

$y_r$ means a Rx signal that has passed through a radio channel. $\tilde{H}$ means channel information that is known through channel estimation in another OFDM symbol. $\tilde{v}$ means a gaussian noise vector that is transformed into frequency domain. $\tilde{d}$ represents data values of frequency domain included in an OFDM symbol and means a matrix with $N_d \times 1$ size. $L_p$ is a pilot locating matrix, meaning a $N \times N_p$ size matrix with each element of 0 or 1. p is a pilot, which is an UW in frequency domain, and means a matrix with $N_p \times 1$ size. n means a gaussian noise vector, meaning a matrix with a size of N×1. G is a code generation matrix meaning a combination of a permutation matrix $P_d$ and a redundant generation matrix T. G may further include a spreading matrix A.

The above-described process of removing a UW from the frequency domain may be mathematically expressed by Formula 14 below.

$$\tilde{y}' = \widetilde{y_d} - \tilde{H}L_p p = \tilde{H}G\tilde{d} + \tilde{v}$$ [Formula 14]

In Formula 14, $\widetilde{y_d}$ means a Rx signal transformed into frequency domain
when a UW does not use a specific dedicated subcarrier and is mixed with a data subcarrier. $\tilde{H}$ means channel information that is known through channel estimation in another OFDM symbol. $L_p$ is a pilot locating matrix, meaning a N×$N_p$ size matrix with each element of 0 or 1. p is a pilot, which is an UW in frequency domain, and means a matrix with $N_p \times 1$ size. G is a code generation matrix meaning a combination of a permutation matrix $P_d$ and a redundant generation matrix T. G may further include a spreading matrix A. $\tilde{d}$ represents data values of frequency domain included in an OFDM symbol and means a matrix with $N_d \times 1$ size. $\tilde{v}$ means a gaussian noise vector that is transformed into frequency domain.

Figure 40:
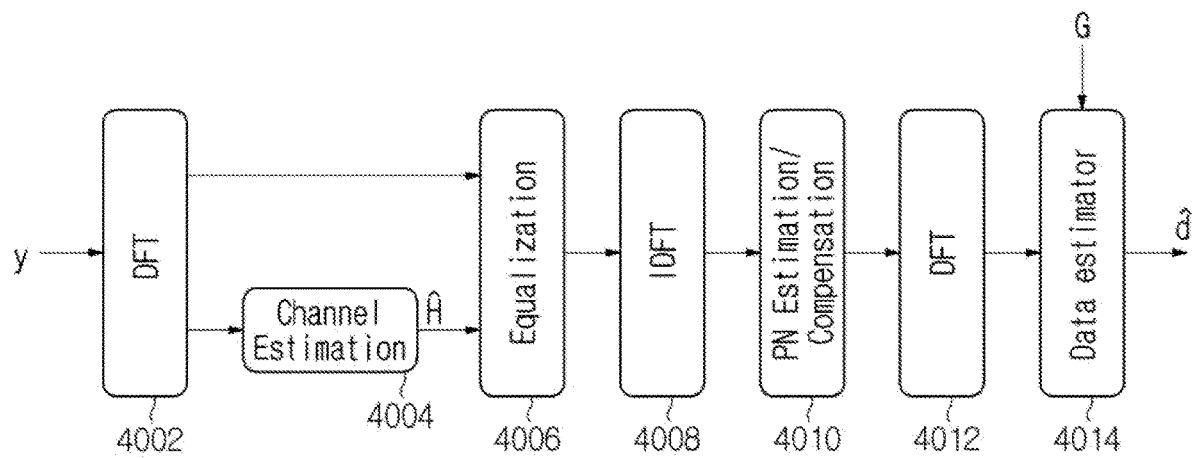
FIG. 40 is a view illustrating yet another example of a receiver that receives a UW-OFDM symbol applicable to the present disclosure.

FIG. 40 is a view illustrating yet another example of a receiver that receives a UW-OFDM symbol applicable to the present disclosure. The components shown in FIG. 40 are functional blocks and may be physically implemented in one or more circuits.

Referring to FIG. 40, a receiver includes the DFT unit 4002, a channel estimation unit 4004, an equalization unit 4006, an inverse DFT (IDFT) unit 4008, a phase noise estimation/compensation unit 4010, a DFT unit 4012, and a data estimator 4014.

The DFT unit 4002 transforms a UW-OFDM symbol into a frequency-domain signal by performing DFT calculation on the UW-OFDM symbol. According to another embodiment, DFT calculation may be replaced by FFT calculation.

The channel estimation unit 4004 may estimate a frequency-domain channel based on a pilot that is a frequency-domain signal of a UW. In frequency domain, a pilot may be located not in all subcarriers but be located discretely in subcarriers at a predetermined interval. The channel estimation unit 4004 may generate channel information through channel estimation based on a signal that the DFT unit 4002 transforms into frequency domain.

The equalization unit 4006 equalizes signals that are output from the DFT unit 4002 and the channel estimation unit 4004. That is, the equalization unit 4006 restores a signal from distortion caused by inter symbol interference (ISI) by removing or reducing channel distortion like ISI. According to an embodiment, when a UW is repeated in each sub-symbol period in time domain, phase noise estimation and compensation between UWs may be performed.

The IDFT unit 4008 transforms a signal, which is output from the equalization unit 4006, into time domain. According to another embodiment, IDFT calculation may be replaced by IFFT calculation.

The phase noise estimation/compensation unit 4010 estimates and compensates a phase noise from a signal that is output from the IDFT unit 4008. According to an embodiment, when a UW is repeated in each sub-symbol period in time domain, the phase noise estimation/compensation unit 4010 may perform an operation of phase noise estimation and compensation between UWs.

The DFT unit 4012 transforms a signal output from the phase noise estimation/compensation unit 4010 into frequency domain. According to another embodiment, DFT calculation may be replaced by FFT calculation.

The data estimator 4014 may estimate data based on a signal that the DFT unit 4012 transforms into frequency domain. Data estimation uses G used in Tx, and G is a code generation matrix meaning a combination of a permutation matrix $P_d$ and a redundant generation matrix T. G may further include a spreading matrix A. G may be determined by a receiver in advance or be adaptively modified.

Figure 41:
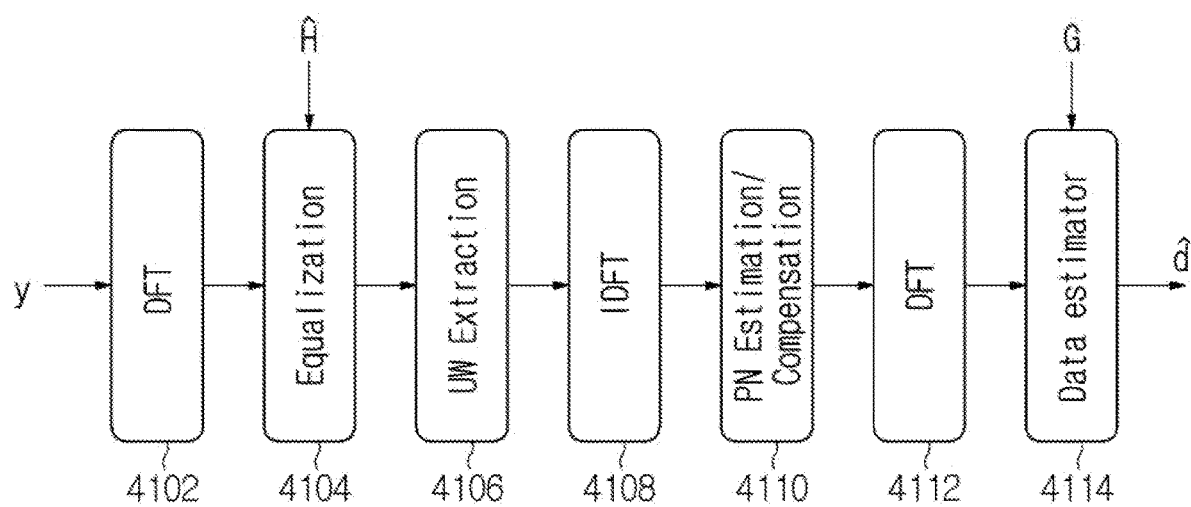
FIG. 41 is a view illustrating yet another example of a receiver that receives a UW-OFDM symbol applicable to the present disclosure.

FIG. 41 is a view illustrating yet another example of a receiver that receives a UW-OFDM symbol applicable to the present disclosure. The components shown in FIG. 41 are functional blocks and may be physically implemented in one or more circuits.

Referring to FIG. 41, a receiver includes the DFT unit 4102, an equalization unit 4104, a UW extraction unit 4106, an inverse DFT (IDFT) unit 4108, a phase noise estimation/compensation unit 4110, a DFT unit 4112, and a data estimator 4114.

The DFT unit 4102 transforms a UW-OFDM symbol into a frequency-domain signal by performing DFT calculation on the UW-OFDM symbol. According to another embodiment, DFT calculation may be replaced by FFT calculation.

The equalization unit 4104 equalizes a signal that is output from the DFT unit 4102. That is, the equalization unit 4104 restores a signal from distortion caused by inter symbol interference (ISI) by removing or reducing channel distortion like ISI.

The UW extraction unit 4104 removes a UW of a signal, which is output from the equalization unit 4104, from frequency domain. In case a UW does not use a specific dedicated subcarrier and is mixed with a data subcarrier, UW removal is needed. Unlike Formula 9 based on FIG. 38, in a UW-OFDM symbol where a UW is mixed with a data subcarrier, a pilot component is not removed even after transpose calculation of a zero padding matrix. Accordingly, for a UW-OFDM symbol where a UW is mixed with a data subcarrier, a separate process is needed to remove the UW from frequency domain.

The IDFT unit 4108 transforms a signal, which is output from the UW extraction unit 4106, into time domain. According to another embodiment, IDFT calculation may be replaced by IFFT calculation.

The phase noise estimation/compensation unit 4110 estimates and compensates a phase noise from a signal that is output from the IDFT unit 4108. According to an embodiment, when a UW is repeated in each sub-symbol period in time domain, the phase noise estimation/compensation unit 4110 may perform an operation of phase noise estimation and compensation between UWs.

The DFT unit 4112 transforms a signal output from the phase noise estimation/compensation unit 4110 into frequency domain. According to another embodiment, DFT calculation may be replaced by FFT calculation.

The data estimator 4114 may estimate data based on a signal that the DFT unit 4112 transforms into frequency domain. Data estimation uses G used in Tx, and G is a code generation matrix meaning a combination of a permutation matrix $P_d$ and a redundant generation matrix T. G may further include a spreading matrix A. G may be determined by a receiver in advance or be adaptively modified.

Figure 42:
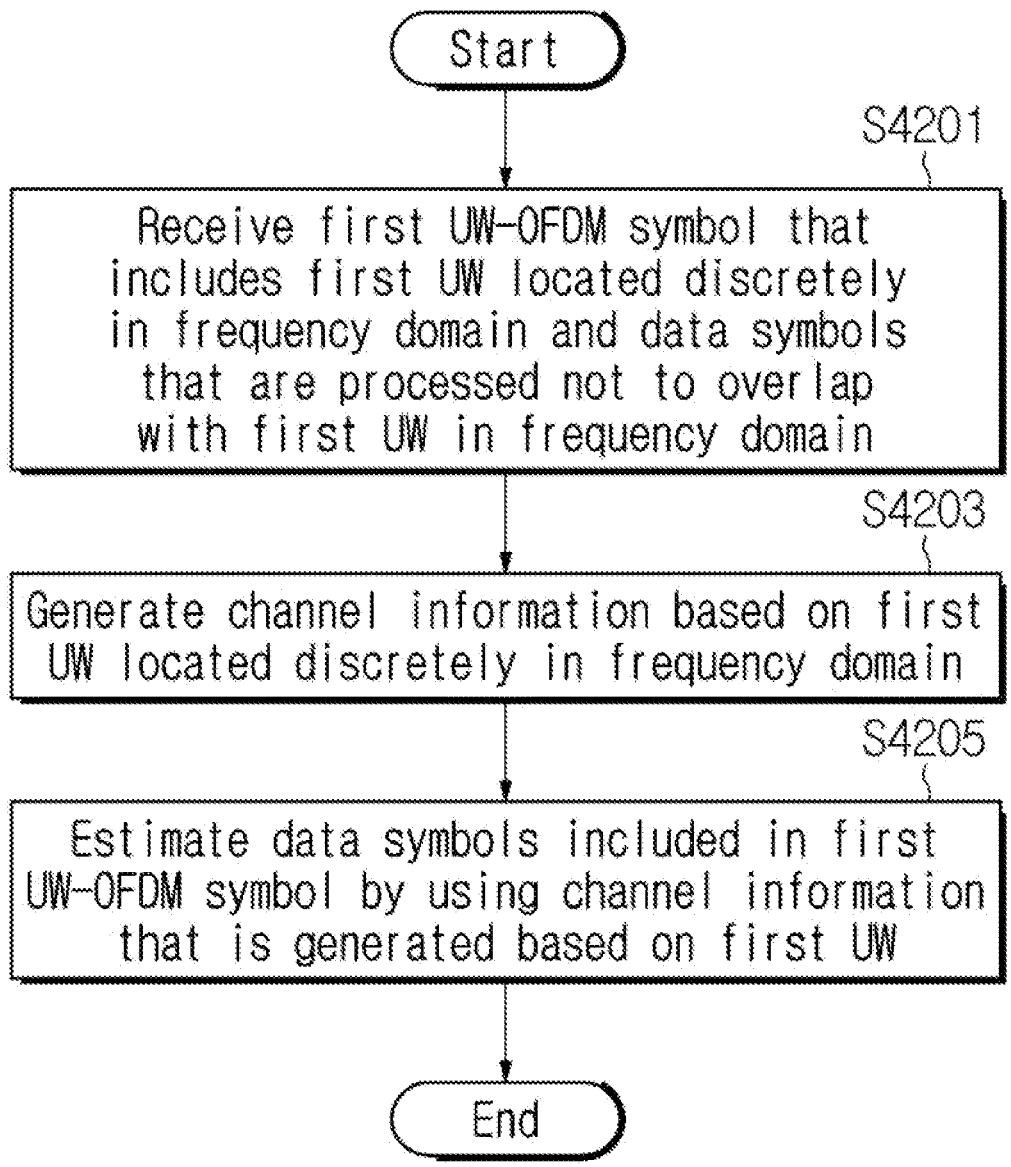
FIG. 42 is a view illustrating an embodiment of a procedure of receiving a UW-OFDM symbol in a device applicable to the present disclosure.

FIG. 42 is a view illustrating an embodiment of a procedure of receiving a UW-OFDM symbol in a device applicable to the present disclosure. FIG. 42 exemplifies a method of operating a device that receives a UW-OFDM symbol. The operating subject of a procedure illustrated in FIG. 42 may be a base station or a terminal.

At step S4201, the device receives a first UW-OFDM symbol including a first UW discretely located in frequency domain and a data symbol that is processed not to overlap with the first UW in frequency domain. According to an embodiment, the received UW-OFDM symbol may have a UW use a specific dedicated subcarrier and not mix the UW with a data subcarrier. In addition, according to an embodiment, the received UW-OFDM symbol may have a structure in which a UW is repeated to have an integer ratio between an OFDM symbol length and a sub-symbol length not only in frequency but also in time domain. In addition, according to an embodiment, there may be a further step of receiving, by the receiver, a second UW and data symbols that are processed to overlap with the second UW in frequency domain.

At step S4203, the device estimates a channel based on the first UW, which is discretely located in frequency domain, and generates channel information. According to an embodiment, in the case of a UW-OFDM symbol where a UW uses a specific dedicated subcarrier and is not mixed with a data subcarrier, the symbol may be used to estimate a direct channel and to generate channel information. According to an embodiment, channel information may be estimated based on a pilot that is a frequency-domain signal of a UW.

In addition, according to an embodiment, a UW-OFDM symbol, in which a UW is not located by using a specific dedicated subcarrier and is mixed with a data subcarrier, may use channel information of another symbol. According to an embodiment, a second UW-OFDM symbol may use channel information that is generated based on the first UW of the first UW-OFDM symbol.

At step S4205, a data symbol of the first UW-OFDM symbol is estimated by using channel information based on the first UW. According to an embodiment, at step S4203, in the case of the first UW-OFDM symbol of which the channel information is generated by estimating a direct channel, data estimation may be performed by using the channel information and a received data symbol. In addition, data estimation may also use a code generation matrix G that is used at Tx.

In addition, according to an embodiment, at step S4203, the second UW-OFDM symbol that uses channel information of another symbol without estimating a direct channel may further include a step of removing a UW from a subcarrier in which the UW and a data symbol are mixed. When removing the UW, channel information of another symbol may be used. The second UW-OFDM symbol may estimate data based on the data symbol, which is obtained by removing the UW, and the channel information of another symbol. In addition, data estimation may also use a code generation matrix G that is used at Tx.

Meanwhile, in case the received UW-OFDM symbol has a structure in which a UW is repeated to have an integer ratio between an OFDM symbol length and a sub-symbol length not only in frequency but also in time domain, the following step may further included.

In the case of a symbol where a UW is located by using a specific dedicated subcarrier and is not mixed with a data subcarrier, it is possible to further include a step of using the symbol to estimate a direct channel and thus to generate channel information and of performing equalization based on the channel information and a data symbol. By performing equalization, a signal may be restored from distortion caused by inter symbol interference (ISI) by removing or reducing channel distortion like ISI. In addition, it is possible to further include a step of estimating and compensating a phase noise between UWs that is periodically repeated in each sub-symbol in time domain based on a signal output by the equalization. Data may be estimated based on a signal that is output after phase noise estimation and compensation. In addition, data estimation may also use a code generation matrix G that is used at Tx.

A UW-OFDM symbol, in which a UW does not use a specific dedicated subcarrier and is mixed with a data subcarrier, may further include a step of equalization using channel information of another UW-OFDM symbol before removing the UW. By performing equalization, a signal may be restored from distortion caused by inter symbol interference (ISI) by removing or reducing channel distortion like ISI. Data estimation may further include a step of performing phase noise estimation and compensation in time domain based on a signal that is output after equalization. In addition, data estimation may also use a code generation matrix G that is used at Tx.

As the examples of the proposal method described above may also be included in one of the implementation methods of the present disclosure, it is an obvious fact that they may be considered as a type of proposal methods. In addition, the proposal methods described above may be implemented individually or in a combination (or merger) of some of them. A rule may be defined so that information on whether or not to apply the proposal methods (or information on the rules of the proposal methods) is notified from a base station to a terminal through a predefined signal (e.g., a physical layer signal or an upper layer signal).

The present disclosure may be embodied in other specific forms without departing from the technical ideas and essential features described in the present disclosure. Therefore, the above detailed description should not be construed as limiting in all respects and should be considered illustrative. The scope of the present disclosure should be determined by rational interpretation of the appended claims, and all changes within the equivalent scope of the present disclosure are included in the scope of the present disclosure. In addition, claims having no explicit citation relationship in the claims may be combined to form an embodiment or to be included as a new claim by amendment after filing.

INDUSTRIAL APPLICABILITY

The embodiments of the present disclosure are applicable to various radio access systems. Examples of the various radio access systems include a 3rd generation partnership project (3GPP) or 3GPP2 system.

The embodiments of the present disclosure are applicable not only to the various radio access systems but also to all technical fields, to which the various radio access systems are applied. Further, the proposed methods are applicable to mmWave and THzWave communication systems using ultrahigh frequency bands.

Additionally, the embodiments of the present disclosure are applicable to various applications such as autonomous vehicles, drones and the like.

What is claimed is:

1. A method method performed by a device and comprising:
generating at least one codeword by encoding an information block;
generating a scrambled bit sequence based on the at least one codeword;
generating data symbols based on the scrambled bit sequence;
processing the data symbols so that a first unique word (UW) discretely located in a frequency domain does not overlap with the data symbols in the frequency domain;
transmitting a first unique word (UW)-orthogonal frequency division multiplexing (OFDM) symbol that adds the data symbols, which are processed not to overlap, and the first UW discretely located in the frequency domain; and
processing the data symbols to overlap with a second UW in the frequency domain; and
transmitting a second UW-OFDM symbol that adds the data symbols processed to overlap and the second UW.

2. The method of claim 1, wherein the second UW is discretely located in the frequency domain.

3. The method of claim 2, wherein the second UW is generated by locating, in the frequency domain, a pilot dispersively in a position that a UW will occupy.

4. The method of claim 2, wherein the first UW is generated by repeating a time-domain UW in a same position of sub-symbols which is defined to have an integer ratio, in a time domain, between an OFDM symbol length and a sub-symbol length, and
wherein the sub-symbols include guard intervals with a same length.

5. The method of claim 4, wherein the second UW is generated by repeating a time-domain UW in a same position of sub-symbols which is defined to have an integer ratio, in a time domain, between an OFDM symbol length and a sub-symbol length, and
wherein the sub-symbols include guard intervals with a same length.

6. The method of claim 2, wherein the first UW is generated by repeating a time-domain UW in a same position of sub-symbols which is defined to have an integer ratio, in a time domain, between an OFDM symbol length and a sub-symbol length,
wherein, among the sub-symbols, except a sub-symbol located at an end part of the OFDM symbol, at least one sub-symbol of remaining sub-symbols includes guard intervals with a same length, and
wherein the sub-symbol located at the end part is longer than the at least one sub-symbol of remaining sub-symbols.

7. The method of claim 1, wherein the first UW is generated by locating, in the frequency domain, a pilot dispersively in a position that a UW will occupy.

8. The method of claim 1, wherein the first UW is generated by repeating a time-domain UW in a same position of sub-symbols which is defined to have an integer ratio, in a time domain, between an OFDM symbol length and a sub-symbol length, and
wherein the sub-symbols include guard intervals with a same length.

9. The method of claim 1, wherein the first UW is generated by repeating a time-domain UW in a same position of sub-symbols which is defined to have an integer ratio, in a time domain, between an OFDM symbol length and a sub-symbol length,
wherein, among the sub-symbols, except a sub-symbol located at an end part of the OFDM symbol, at least one sub-symbol of remaining sub-symbols includes guard intervals with a same length, and
wherein the sub-symbol located at the end part is longer than the at least one sub-symbol of remaining sub-symbols.

10. A method performed by a device and comprising:
receiving symbols including data symbols;
generating a frequency-domain signal by performing a discrete fourier transform (DFT) calculation on the symbols;
performing a channel estimation and generating channel information based on the frequency-domain signal; and
estimating the data symbols using the channel information;
wherein the symbols are first unique word (UW)-orthogonal frequency division multiplexing (OFDM) symbols that include a first UW discretely located in a frequency domain and data symbols that are processed not to overlap with the first UW in the frequency domain;
wherein the channel information is generated based on the first UW that is discretely located in the frequency domain; and
receiving a second UW-OFDM symbol including a second UW and data symbols that are processed to overlap with the second UW in the frequency domain.

11. The method of claim 10, further comprising:
removing the second UW from the second UW-OFDM symbol by using the channel information that is generated based on the first UW;
generating channel information for the second UW-OFDM symbol based on the channel information that is generated based on the first UW; and
estimating the data symbols included in the second UW-OFDM symbol from the second UW-OFDM symbol with the second UW being removed, based on the channel information for the second UW-OFDM symbol.

12. The method of claim 11, wherein the first UW-OFDM symbol has a structure in which a time-domain UW is repeated in a same position of sub-symbols that is defined to have an integer ratio, in a time domain, between an OFDM symbol length and a sub-symbol length, and
further comprising estimating a phase noise of the first UW-OFDM symbol based on the UW that is repeated in the time domain.

13. The method of claim 11, wherein the second UW-OFDM symbol has a structure in which a time-domain UW is repeated in a same position of sub-symbols that is defined to have an integer ratio, in a time domain, between an OFDM symbol length and a sub-symbol length, and
further comprising estimating a phase noise of the second UW-OFDM symbol based on the UW that is repeated in the time domain.

14. The method of claim 10, wherein the first UW-OFDM symbol has a structure in which a time-domain UW is repeated in a same position of sub-symbols that is defined to have an integer ratio, in a time domain, between an OFDM symbol length and a sub-symbol length, and further comprising estimating a phase noise of the first UW-OFDM symbol based on the UW that is repeated in the time domain.

\* \* \* \* \*